United States Patent
Isono et al.

(10) Patent No.: US 6,739,676 B1
(45) Date of Patent: May 25, 2004

(54) BRAKING SYSTEM HAVING VACUUM BOOSTER WHOSE BOOSTING RATIO IS LOWERED AT FIXED TRANSITION POINT AT WHICH WHEEL CYLINDER PRESSURE INCREASE IS INITIATED

(75) Inventors: Hiroshi Isono, Susono (JP); Yasuji Mizutani, Susono (JP); Yutaka Onuma, Susono (JP); Koichi Kondo, Kasugai (JP); Hirofumi Nitta, Kariya (JP); Motoshi Suzuki, Nagoya (JP)

(73) Assignees: Toyota Jidosha Kabushiki Kaisha, Toyota (JP); Aisin Seiki Kabushiki Kaisha, Kariya (JP)

( * ) Notice: Subject to any disclaimer, the term of this patent is extended or adjusted under 35 U.S.C. 154(b) by 551 days.

(21) Appl. No.: 09/233,583

(22) Filed: Jan. 19, 1999

(30) Foreign Application Priority Data

Jan. 20, 1998 (JP) .......................... 10-008383

(51) Int. Cl.⁷ ................................ B60T 8/44
(52) U.S. Cl. ................. 303/114.3; 303/115.3; 303/12; 188/356
(58) Field of Search ............... 303/114.3, 12, 303/113.3, 114.1, 115.3, 115.4, 155, 10, 11, DIG. 1; 188/356

(56) References Cited

U.S. PATENT DOCUMENTS

| | | | | |
|---|---|---|---|---|
| 3,149,539 A | * | 9/1964 | Prather | 91/369 |
| 4,630,706 A | * | 12/1986 | Takayama et al. | 180/273 |
| 4,659,153 A | * | 4/1987 | Klein | 303/114 |
| 5,518,305 A | * | 5/1996 | Jakobi et al. | 303/114.3 |
| 5,558,414 A | * | 9/1996 | Kubota | 303/122.08 |
| 5,709,438 A | * | 1/1998 | Isakson et al. | 303/113.4 |
| 5,727,852 A | * | 3/1998 | Pueschel et al. | 303/113.4 |
| 5,842,751 A | * | 12/1998 | Unterforsthuber | 303/115.3 |
| 5,845,558 A | * | 12/1998 | Tsubouchi et al. | 91/376 R |
| 5,938,297 A | * | 8/1999 | Waite et al. | 303/114.3 |
| 5,954,406 A | * | 9/1999 | Sawada | 303/122.09 |
| 6,033,038 A | * | 3/2000 | Kulkarni et al. | 303/114.3 |

FOREIGN PATENT DOCUMENTS

| | | |
|---|---|---|
| JP | 8230634 A | 9/1996 |
| JP | 930385 A | 2/1997 |

* cited by examiner

*Primary Examiner*—Jack Lavinder
*Assistant Examiner*—Bradley King
(74) *Attorney, Agent, or Firm*—Kenyon & Kenyon

(57) ABSTRACT

Vehicle braking system including a vacuum booster for transmitting a boosted brake operating force to a master cylinder such that the boosting ratio is reduced at a fixed transition point before the boosting limit point is reached, a brake having a wheel brake cylinder connected through a fluid passage to a master cylinder serving as a first hydraulic pressure source, for braking a wheel, and a pressure increasing device having a second hydraulic pressure source connected to the fluid passage, and wherein the pressure increasing device initiating a pressure increasing operation, when the brake operating force has increased to the transition point, to increase the wheel cylinder pressure to be higher than the master cylinder pressure, by using the second hydraulic pressure source.

31 Claims, 34 Drawing Sheets

[IN OFF STATE OF COIL 84]

[IN ON STATE OF COIL 84]

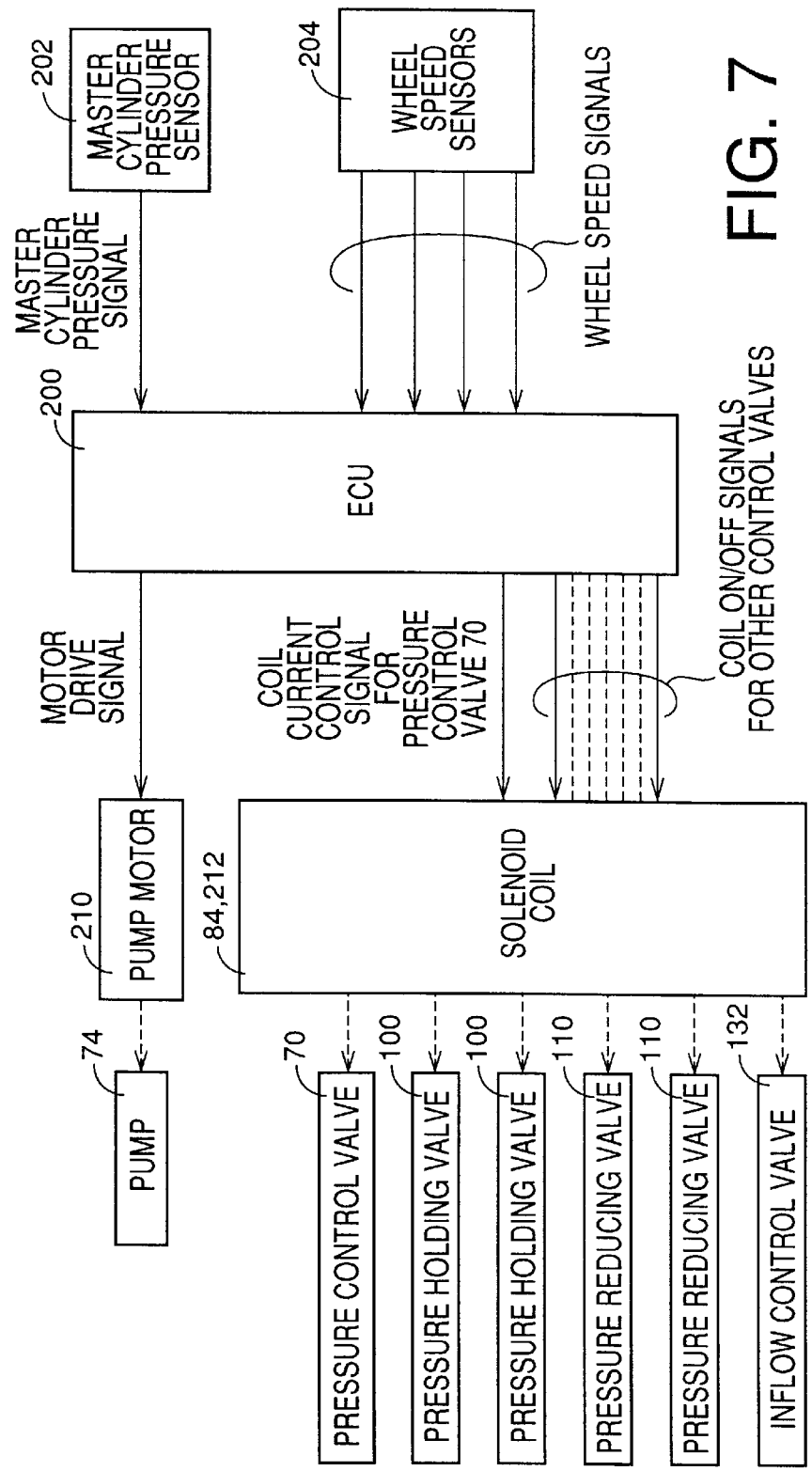

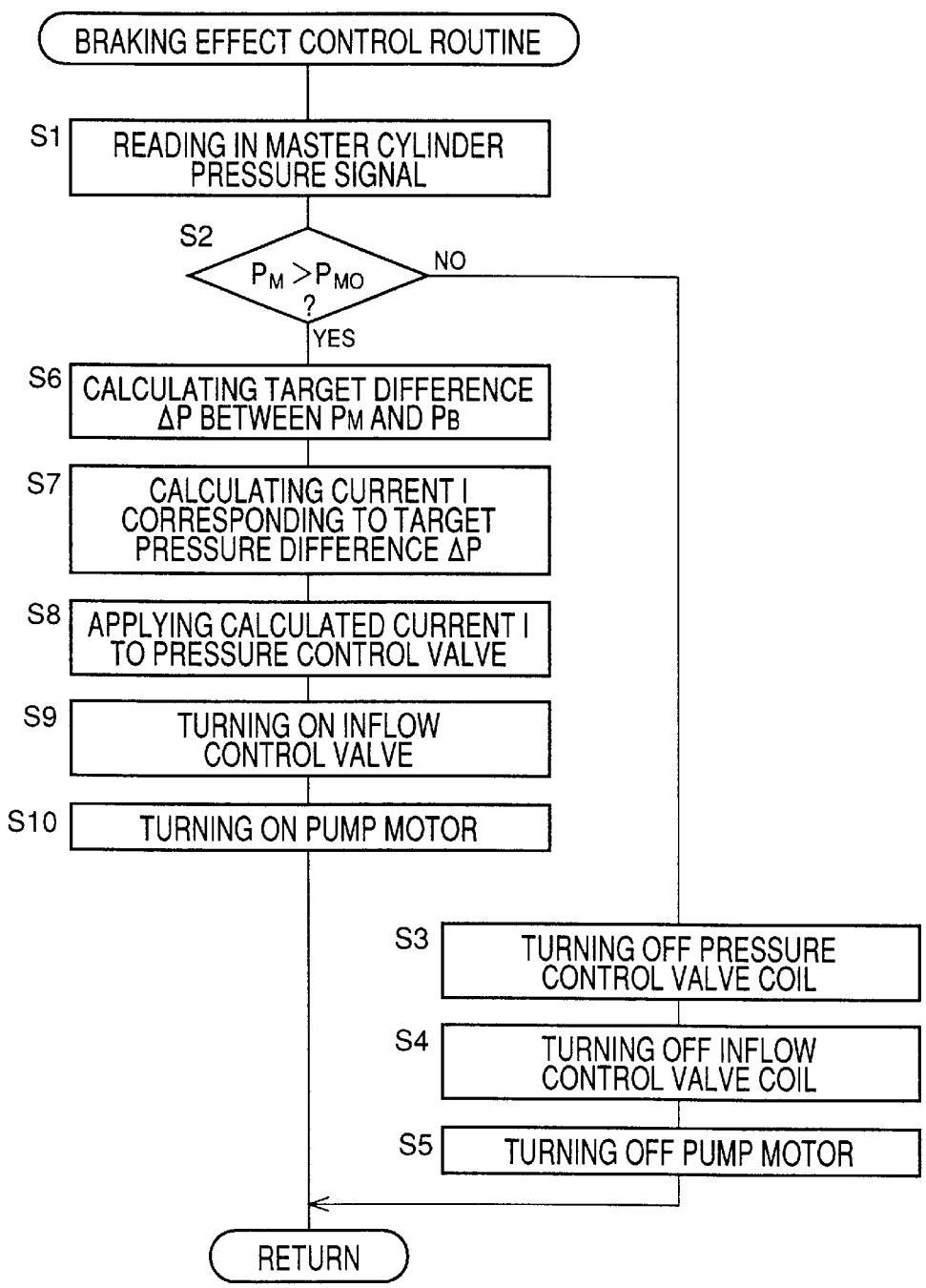

FIG. 18

| | NORMAL CONTROL MODE (NON-OPERATED STATE) | BRAKING EFFECT CHARACTERISTIC CONTROL MODE | | |
| --- | --- | --- | --- | --- |
| | | INCREASE | HOLD | REDUCE |
| PRESSURE CONTROL VALVE | OFF (OPEN) | ON (CURRENT CONTROL) | ↓ | ↓ |
| PRESSURE HOLDING VALVE | OFF | OFF | ON | ON |
| PRESSURE REDUCING VALVE | OFF | OFF | OFF | ON |
| INFLOW CONTROL VALVE | OFF | ON | ON | ON |
| PUMP MOTOR | OFF | ON | ON | ON |

FIG. 20

| | NORMAL CONTROL MODE (NON-OPERATED STATE) | ANTI-LOCK CONTROL MODE ($P_M > P_B$) | | | BRAKING EFFECT CHARACTERISTIC CONTROL MODE ($P_M < P_B$) | | |
|---|---|---|---|---|---|---|---|
| | | INCREASE | HOLD | REDUCE | INCREASE | HOLD | REDUCE |
| PRESSURE CONTROL VALVE | OFF | OFF | ON | ON | ON | ON | ON |
| PRESSURE REDUCING VALVE | OFF | OFF | OFF | ON | OFF | OFF | OFF |
| INFLOW CONTROL VALVE | OFF | OFF | OFF | OFF | ON | OFF | OFF |
| PUMP MOTOR | OFF | ON | OFF | ON OR OFF | ON | OFF | ON OR OFF |

FIG. 23

| | NORMAL CONTROL MODE (NON-OPERATED STATE) | ANTI-LOCK CONTROL MODE ($P_M > P_B$) | | | BRAKING EFFECT CHARACTERISTIC CONTROL MODE ($P_M < P_B$) | | |
|---|---|---|---|---|---|---|---|
| | | INCREASE | HOLD | REDUCE | INCREASE | HOLD | REDUCE |
| PRESSURE CONTROL VALVE | OFF | OFF | ON | ON | ON | ON | ON |
| PRESSURE REDUCING VALVE | OFF | OFF | ON | ON | OFF | ON | OFF |
| INFLOW CONTROL VALVE | OFF | OFF | OFF | OFF | ON | ON OR OFF | OFF |
| PUMP MOTOR | OFF | ON | ON | ON OR OFF | ON | ON | ON OR OFF |

FIG. 27

|  | NORMAL CONTROL MODE (NON-OPERATED STATE) | ANTI-LOCK CONTROL MODE ($P_M > P_B$) | | | BRAKING EFFECT CHARACTERISTIC CONTROL MODE ($P_M < P_B$) | | |
|---|---|---|---|---|---|---|---|
|  |  | INCREASE | HOLD | REDUCE | INCREASE | HOLD | REDUCE |
| PRESSURE CONTROL VALVE | OFF | OFF | ON | ON | ON | ON | ON |
| PRESSURE REDUCING VALVE | OFF | OFF | ON | ON | OFF | ON | OFF |
| INFLOW CONTROL VALVE | OFF | OFF | OFF | OFF | ON | ON OR OFF | OFF |
| PUMP MOTOR | OFF | ON | ON | ON OR OFF | ON | ON | ON OR OFF |

BRAKING SYSTEM HAVING VACUUM BOOSTER WHOSE BOOSTING RATIO IS LOWERED AT FIXED TRANSITION POINT AT WHICH WHEEL CYLINDER PRESSURE INCREASE IS INITIATED

This application is based on Japanese Patent Application No. 10-8383 filed Jan. 20, 1998, the content of which is incorporated hereinto by reference.

BACKGROUND OF THE INVENTION

1. Field of the Invention

The present invention relates in general to a braking system for an automotive vehicle, which is equipped with a vacuum booster, and more particularly to a vehicle braking system capable of preventing a reduction in braking effect due to reduction in the boosting function of the vacuum booster.

2. Discussion of the Related Art

One example of a known braking system of the type indicated above is disclosed in JP-A-9-30385. This braking system includes (a) a brake operating member, (b) a master cylinder, (c) a vacuum booster for boosting a brake operating force acting on the brake operating member, on the basis of a pressure difference between a pressure in a negative-pressure chamber communicating with a negative-pressure source, and a pressure in a variable-pressure chamber selectively communicating with the negative-pressure chamber and an atmosphere, so that the boosted force is applied to the master cylinder, (d) a wheel brake cylinder connected to the master cylinder through a fluid passage and actuated by a hydraulic pressure applied thereto through the fluid passage, for braking a wheel of an automotive vehicle, and (e) a pressure increasing device actuated when a predetermined condition is satisfied during an operation of the brake operating member, to initiate a pressure increasing operation of increasing a hydraulic pressure in the wheel brake cylinder, with a hydraulic pressure source other than the master cylinder, such that the increased wheel brake cylinder pressure is higher than a hydraulic pressure generated by the master cylinder. The brake operating force or other quantity relating to this force, at which the predetermined condition is satisfied, is referred to as "pressure increase initiating point".

The known braking system indicated above is adapted such that the brake operating force acting on the brake operating member is boosted by the vacuum booster at a predetermined boosting ratio, until a boosting limit of the vacuum booster is reached, and such that the pressure increasing device initiates the pressure increasing operation when the boosting limit is reached, namely, when the brake operating force or other quantity has increased to the pressure increase initiating point, which is reached when the boosting limit is reached.

In this known braking system, a fact that the boosting limit of the vacuum booster is reached is detected when one of the following three conditions is satisfied: (1) the condition that a pressure switch has detected that the pressure in the variable-pressure chamber has been raised to the atmospheric pressure; (2) the condition that a switch has detected that an input rod of the vacuum booster which is operatively connected to the brake operating member has been brought into abutting contact with an output rod of the vacuum booster which is operatively connected to the master cylinder; and (3) the condition that the actual wheel brake cylinder pressure detected by a pressure sensor has become lower than a nominal value corresponding to the brake operating force detected by a pressure sensor. In the braking system described above wherein the moment at which the boosting limit of the vacuum booster is reached changes with a change in the pressure in the negative-pressure chamber, the pressure increase initiating point changes depending upon the pressure in the negative-pressure chamber. Theoretically, therefore, a change in the pressure in the negative-pressure chamber does not have influences on the braking effect provided by the wheel brake cylinder and on the operating feel of the brake operating member as given to the vehicle operator.

Actually, however, it is difficult to accurately detect that the boosting limit of the vacuum booster has been reached. Accordingly, the known braking system inevitably suffers from a problem that the braking effect and the brake operating feel are influenced by a change in the negative-pressure chamber of the vacuum booster.

SUMMARY OF THE INVENTION

It is therefore an object of this invention to provide a braking system adapted to reduce or prevent influences of a change in the pressure in the negative-pressure chamber of the vacuum booster, on the braking effect and the brake operating feel.

The above object may be achieved according to any one of the following modes of the present invention, each of which is numbered like the appended claims and refers to or depends from the other mode or modes, where appropriate, so as to indicate possible combinations of elements or features in preferred forms of the invention.

(1) A braking system for braking a wheel of an automotive vehicle, comprising:

a brake operating member;

a master cylinder functioning as a first hydraulic pressure source for generating a hydraulic pressure based on an input force;

a vacuum booster having a negative-pressure chamber connected to a negative pressure source, and a variable-pressure chamber selectively connected to the negative-pressure chamber and an atmosphere, the vacuum booster boosting an operating force of the brake operating member on the basis of a difference between pressures in the negative-pressure and variable-pressure chambers, and transmitted the boosted operating force to the master cylinder, the vacuum booster having a transition point at which a boosting ratio of said vacuum booster is reduced during an increase of the brake operating force before a boosting limit point at which the booster has become inoperable to perform its boosting function is reached, the transition point being kept unchanged irrespective of a change in the pressure in the negative-pressure chamber;

a brake including a wheel brake cylinder which is connected to the master cylinder through a fluid passage and which is activated by a hydraulic pressure supplied thereto through the fluid passage, for braking the wheel; and a pressure increasing device including a second hydraulic pressure source connected to the fluid passage, the pressure increasing device performing a pressure increasing operation of increasing a hydraulic pressure in the wheel brake cylinder, by using the second hydraulic pressure source, such that the increased hydraulic pressure in the wheel brake cylinder is higher than that generated by the master cylinder, the pressure increasing device initiating the pressure increasing operation when the brake operating force has increased to the transition point.

In the braking system of the present invention constructed as described above, the transition point at which the boosting ratio of the vacuum booster is reduced during an increase of the brake operating force does not change with a change in the pressure in the negative-pressure chamber, while the boosting limit point changes with the pressure in the negative-pressure chamber. When the brake operating force has increased to the transition point, the pressure increasing device initiates its pressure increasing operation. Accordingly, the moment at which the pressure increasing operation of the pressure increasing device is initiated is stabilized. That is, the pressure increase initiating point of the pressure increasing device is stabilized, assuring increased stability of the braking effect and operating feel of the brake operating member.

(2) A braking system according to the above mode (1), wherein the vacuum booster is constructed such that an output of the vacuum booster corresponding to the transition point is smaller than that corresponding to the boosting limit point when the pressure in the negative-pressure chamber is equal to a lower limit of an expected range of variation of the pressure in the negative-pressure chamber.

In the braking system according to the above mode (2) of the invention, the vacuum booster is so constructed that the transition point of the vacuum booster is necessarily reached before the boosting limit point is reached, even if the pressure in the negative-pressure chamber is lowered to the expected lower limit. Accordingly, the pressure increasing device necessarily initiates its pressure increasing operation when the brake operating force has increased to the fixed transition point, irrespective of a variation in the pressure in the negative-pressure chamber.

(3) A braking system according to the above mode (1) or (2), which is arranged so as to brake the automotive vehicle at a deceleration value not lower than a maximum deceleration value during a normal operation of the brake operating member, if the boosting limit point of the vacuum booster is reached during the pressure increasing operation when the pressure in the negative-pressure chamber is equal to a lower limit of an expected range of variation of the pressure in the negative-pressure chamber.

In the braking system according to the above mode (3), the boosting limit point of the vacuum booster is not reached during a normal operation of the brake operating member even if the pressure in the negative-pressure chamber is lowered to the expected lowest value. Accordingly, during the normal braking operation, the present braking system does not suffer from a change in the braking effect and the brake operating feel, which would take place if the boosting limit point of the vacuum booster were reached.

The normal operation of the brake operating member is interpreted to mean an operation of the brake operating member while the vehicle is running on a normal or ordinary road surface.

The maximum deceleration value of the automotive vehicle is generally considered to fall within a range of 0.8 G–1.2 G, typically, about 1.0 G.

(4) A braking system according to any one of the above modes (1)–(3), wherein the pressure increasing device includes (a) an operating-force-related-quantity sensor for detecting an operating-force-related quantity relating to the brake operating force, and (b) pressure increase initiating means for commanding the pressure increasing device to initiate the pressure increasing operation when the operating-force-related quantity detected by the operating-force-related-quantity sensor has increased to a value corresponding to the transition point of said vacuum booster.

The operating-force-related-quantity sensor may be a sensor for detecting the brake operating force per se, a sensor for detecting an operating stroke of the brake operating member, a sensor for detecting the pressure in the master cylinder, or a sensor for detecting the deceleration value of the automotive vehicle.

(5) A braking system according to any one of the above modes (1)–(4), wherein the vacuum booster has a first boosting ratio at which the operating force of the brake operating member is boosted until the operating force has increased to the transition point, and a second boosting ratio which is lower than the first boosting ratio and at which the operating force is boosted while the operating force increases from the transition point up to the boosting limit point.

(6) A braking system according to the above mode (5), wherein the vacuum booster includes:

a housing;

an input rod operatively connected to the brake operating member;

a power piston axially movably disposed within the housing and cooperating with the housing to device the negative-pressure chamber and the variable-pressure chamber, the power piston being axially moved by the difference between the pressures in the negative-pressure and variable-pressure chambers;

a valve mechanism for selectively connecting the variable-pressure chamber to the negative-pressure chamber and the atmosphere, on the basis of a relative axial movement of the power piston and the input rod;

an output rod for transmitting an operating force of the power piston to a pressurizing piston of the master cylinder; and an elastic reaction disc disposed such that the power piston and the input rod contact the reaction disc in one of opposite axial directions of the vacuum booster while the output rod contacts the reaction disc in the other axial direction, and wherein one of opposite end portions of the input rod at which the input rod contacts the reaction disc consists of two sections one of which is located adjacent to the reaction disc and has a first transverse cross sectional area, and the other of which is remote from the reaction disc and has a second transverse cross sectional area larger than the first transverse cross sectional area.

(7) A braking system according to any one of the above modes (1)–(4), wherein the boosting ratio of the vacuum booster is continuously reduced as the operating force of the brake operating member increases, and the transition point is reached when the boosting ratio has been reduced to a value which is not zero.

(8) A braking system according to the above mode (7), wherein the vacuum booster includes:

a housing;

an input rod operatively connected to the brake operating member;

a power piston axially movably disposed within the housing and cooperating with the housing to device the negative-pressure chamber and the variable-pressure chamber, the power piston being axially moved by the difference between the pressures in the negative-pressure and variable-pressure chambers;

a valve mechanism for selectively connecting the variable-pressure chamber to the negative-pressure chamber and the atmosphere, on the basis of a relative axial movement of the power piston and the input rod;

an output rod for transmitting an operating force of the power piston to a pressurizing piston of the master cylinder; and an elastic reaction disc disposed such that the power piston and the input rod contact the reaction disc in one of opposite axial directions of the vacuum booster while the output rod contacts the reaction disc in the other axial direction, and wherein one of opposite end portions of the input rod at which the input rod contacts the reaction disc has a transverse cross sectional area which continuously increases in an axial direction of the input rod from the one of the opposite end portions toward the other end portion.

(9) A braking system according to any one of the above modes (1)–(8), wherein the pressure increasing device is a pump type pressure increasing device including a fluid flow control valve provided in the fluid passage, and a pump functioning as the second hydraulic pressure source and having a delivery end connected to a portion of the fluid passage between the fluid flow control valve and the wheel brake cylinder, the pump being operated to increase the pressure in the wheel brake cylinder to a level higher than the pressure in the master cylinder, while the fluid flow control valve inhibits a flow of a working fluid at least in a direction from the wheel brake cylinder toward the master cylinder.

(10) A braking system according to the above mode (9), further comprising a flow restrictor which by-passes the fluid flow control valve.

In the braking system according to the above mode (10), the flow restrictor permits application of a hydraulic pressure corresponding to the pressure of the wheel brake cylinder to the master cylinder, so that the vehicle operator can feel an increase of the wheel brake cylinder pressure by operation of the pump.

The braking system may have the feature of the above mode (10), without the feature according to the above mode (1) that the pressure increasing operation is initiated when the brake operating force has increased to the transition point of the vacuum booster.

(11) A braking system according to the above mode (10), wherein the fluid flow control valve includes a solenoid-operated two-position valve having an open position and a closed position.

(12) A braking system according to the above mode (11), wherein the pump type pressure increasing device further includes two-position valve control means for normally holding the two-position valve in the open position, switching the two-position valve from the open position to the closed position when the pressure increasing operation is initiated by the pump type pressure increasing device, and switching the two-position valve from the closed position to the open position when the pressure increasing operation is terminated.

(13) A braking system according to the above mode (10), wherein the fluid flow control valve includes a solenoid-operated two-position valve having an open position and a closed position, and the pump type pressure including device includes (a) two-position valve control means for normally holding the two-position valve in the open position, switching the two-position valve from the open position to the closed position when the pressure increasing operation is initiated by the pump type pressure increasing device, and switching the two-position valve from the closed position to the open position when the pressure increasing operation is terminated, and (b) pump delivery control means for controlling a delivery amount of the pump to control a rate of flow of the working fluid through the flow restrictor, for thereby variably controlling a difference between the pressures in the master cylinder and the wheel brake cylinder.

In the braking system according to the above mode (13), the solenoid-operated two-position valve is used as the fluid flow control valve, but the pressure increasing operation can be achieved with a high degree of control freedom, by changing the difference between the pressure of the master cylinder and the pressure of the wheel brake cylinder, by effectively utilizing the flow restrictor which by-passes the two-position valve.

(14) A braking system according to any one of the above modes (1)–(13), wherein the pressure increasing device is a pump type pressure increasing device comprising a pressure control valve which is provided in the fluid passage and which includes (a) a valve member and a valve seat which are spaced apart from each other, so as to permit a flow of a working fluid from the wheel brake cylinder toward the master cylinder, when a pressure difference which is the pressure in the wheel brake cylinder minus the pressure in the master cylinder is larger than a predetermined threshold, the valve member and the valve seat fluid-tightly contacting each other, so as to inhibit the flow of the working fluid, when the difference is not larger than the predetermined threshold, and (b) a pressure difference controlling device for generating a magnetic force for biasing the valve member and the valve seat toward each other, and continuously controlling the magnetic force to continuously change the pressure difference which is established when the valve member and the valve seat initiates a fluid-tight contact therebetween, and wherein the pump type pressure increasing device further comprises a pump functioning as the second hydraulic pressure source and having a delivery end connected to a portion of the fluid passage between the pressure control device and the wheel brake cylinder.

In the braking system according to the above mode (14), the pressure difference of the master cylinder and the wheel brake cylinder can be continuously changed, so that the pressure of the wheel brake cylinder can be increased with improved accuracy.

Further, the pressure of the wheel brake cylinder can be changed following the master cylinder pressure, by a mechanical operation of the pressure control device. Accordingly, the present arrangement wherein the wheel brake cylinder pressure mechanically follows the master cylinder pressure permits reduced complexity of electric control of the pressure difference controlling device, whereby the accuracy of control of the wheel brake cylinder pressure by the pressure increasing device can be further improved.

(15) A braking system according to the above mode (14), wherein the pressure control valve further includes a disabling device for preventing the valve member and the valve seat from fluid-tightly contacting each other to thereby disable the pressure control device, when the pump type pressure increasing device is not required to be operated to perform the pressure increasing operation.

In the braking system according to the above mode (15), the disabling device mechanically disables the pressure control valve when the pressure increasing operation is not necessary, so that the pressure control valve does not disturb an operation of the braking system when the pressure increasing operation of the pressure increasing device is not necessary.

(16) A braking system according to the above mode (15), wherein the pressure difference controlling device includes a solenoid coil, and the disabling device includes an elastic member for biasing the valve member and the valve seat away from each other.

(17) A braking system according to any one of the above modes (1)–(16), wherein the pressure increasing device comprises (a) electrically operated pressure control device for controlling the pressure in the wheel brake cylinder, and (b) a pseudo pressure holding means operated when the pressure in the wheel brake cylinder is required to be held at a presently established level, for electrically controlling the electrically operated pressure control device, so as to hold the pressure in the wheel brake cylinder, without using a pressure holding valve which disconnects the wheel brake cylinder from the master cylinder and the electrically operated pressure control device.

The braking system according to the above mode (17) does not necessarily require an exclusive pressure holding valve for holding the pressure of the wheel brake cylinder, since the electrically operated pressure control device for controlling the pressure of the wheel brake cylinder can be controlled by the pseudo pressure holding means so as to hold the wheel brake cylinder pressure. Accordingly, the braking system can be simplified in construction and is available at an accordingly reduced cost.

The braking system may have the feature of the above mode (17), without the feature according to the above mode (1) that the pressure increasing operation is initiated when the brake operating force has increased to the transition point of the vacuum booster. Further, the feature of the present mode (17) may be effective not only in increasing the wheel brake cylinder pressure so as to be higher than the master cylinder pressure, for thereby compensating for reduction of the boosting function of the vacuum booster, but also for any other purpose in controlling the wheel brake cylinder pressure. For example, this feature may be effective in controlling the wheel brake cylinder pressure in an anti-lock control fashion so as to prevent an excessive locking tendency of the vehicle wheel.

(18) A braking system according to the above mode (17), wherein the pressure increasing device is a pump type pressure increasing device including a fluid flow control valve provided in the fluid passage, and a pump functioning as the second hydraulic pressure source and having a delivery end connected to a portion of the fluid passage between the fluid flow control valve and the wheel brake cylinder, the pump being operated to increase the pressure in the wheel brake cylinder to a level higher than the pressure in the master cylinder, while the fluid flow control valve inhibits a flow of a working fluid at least in a direction from the wheel brake cylinder toward the master cylinder, and wherein the electrically operated pressure control device includes the fluid flow control valve and the pump, and the pseudo pressure holding means controls at least one of the fluid flow control valve and the pump, to hold the pressure in the wheel brake cylinder.

In the braking system according to the above mode (18), the pressure in the wheel brake cylinder can be held at the present level, by utilizing at least one of the fluid flow control valve and the pump which are provided for increasing the wheel brake cylinder pressure. Accordingly, the present braking system does not require an exclusive pressure holding valve, making it possible to simplify the construction of the braking system and reduce the cost of manufacture.

(19) A braking system according to the above mode (18), wherein the pseudo pressure holding means holds the pressure in the wheel brake cylinder, by controlling the fluid flow control valve so as to disconnect the wheel brake cylinder from the master cylinder, and by holding the pump in a non-operated state.

(20) A braking system according to the above mode (18), wherein the pseudo pressure holding means holds the pressure in the wheel brake cylinder, by holding the pump in an operated state and controlling the fluid flow control valve such that the working fluid delivered from the pump leaks into the master cylinder through the fluid flow control valve.

(21) A braking system according to any one of the above modes (17)–(20), wherein the pressure increasing device is a pump type pressure increasing device including a fluid flow control valve provided in the fluid passage, and a pump functioning as the second hydraulic pressure source and having a delivery end connected to a portion of the fluid passage between the fluid flow control valve and the wheel brake cylinder, the pump being operated to increase the pressure in the wheel brake cylinder to a level higher than the pressure in the master cylinder, while the fluid flow control valve inhibits a flow of a working fluid at least in a direction from the wheel brake cylinder toward the master cylinder, the braking system further comprising:

a reservoir connected to the wheel brake cylinder;

a pressure reducing valve disposed between the reservoir and the wheel brake cylinder, and having a closed state inhibiting a flow of the working fluid from the wheel brake cylinder toward the reservoir, and an open state for permitting the flow of the working fluid, and wherein the electrically operated pressure control device includes the pressure reducing valve, the fluid flow control valve and the pump, and the pseudo pressure holding means holds the pressure in the wheel brake cylinder, by electrically controlling at least one of the pressure reducing valve, the fluid flow control valve and the pump.

(22) A braking system according to the above mode (21), wherein the pseudo pressure holding means includes means for controlling the fluid flow control valve so as to disconnect the wheel brake cylinder from the master cylinder, for holding the pump in an operated state, and for opening the pressure reducing valve.

(23) A braking system according to any one of the above modes (17)–(22), wherein the pressure increasing device is a pump type pressure increasing device including a fluid flow control valve provided in the fluid passage, and a pump functioning as the second hydraulic pressure source and having a delivery end connected to a portion of the fluid passage between the fluid flow control valve and the wheel brake cylinder, the pump being operated to increase the pressure in the wheel brake cylinder to a level higher than the pressure in the master cylinder, while the fluid flow control valve inhibits a flow of a working fluid at least in a direction from the wheel brake cylinder toward the master cylinder, the braking system further comprising:

an inflow control valve connected to a suction side of the pump, and having a closed state for inhibiting a flow of the working fluid toward the suction side of the pump, and an open state for permitting the flow of the working fluid toward the suction side to thereby permit the pump to deliver the working fluid, and wherein the electrically operated pressure control device includes the inflow control valve, the fluid flow control valve and the pump, and the pseudo pressure holding means holds the pressure in the wheel brake cylinder, by electrically controlling at least one of the inflow control valve, the fluid flow control valve and the pump.

(24) A braking system according to the above mode (23), wherein the pseudo pressure holding means includes means for controlling the fluid flow control valve so as to disconnect the wheel brake cylinder from the master cylinder, for holding the pump in an operated state thereof, and for closing the inflow control valve.

(25) A braking system according to any one of the above modes (17)–(24), further comprising an anti-lock braking pressure control device for controlling the pressure in the wheel brake cylinder so as to prevent an excessive locking tendency of the wheel during an operation of the brake operating member, and wherein the anti-lock braking pressure control device commands the pseudo pressure holding means for holding the pressure in the wheel brake cylinder, during an operation of the anti-lock braking pressure control device.

(26) A braking system according to any one of the above modes (1)–(25), wherein the pressure increasing device is a pump type pressure increasing device including a fluid flow control valve provided in the fluid passage, and a pump functioning as the second hydraulic pressure source and having a delivery end connected to a portion of the fluid passage between the fluid flow control valve and the wheel brake cylinder, the pump being operated to increase the pressure in the wheel brake cylinder to a level higher than the pressure in the master cylinder, while the fluid flow control valve inhibits a flow of a working fluid at least in a direction from the wheel brake cylinder toward the master cylinder, and wherein a plurality of wheel brake cylinders are connected through the fluid passage to a pressurizing chamber of the master cylinder, and the fluid flow control valve and the pump are provided for each of the plurality of wheel brake cylinders, such that the fluid flow control valve and the pump for each one of the plurality of wheel brake cylinders are controllable independently of the fluid flow control valve and the pump for another of the plurality of wheel brake cylinders.

In the braking system according to the above mode (26), the operations to increase the pressures in the wheel brake cylinders connected to the same pressurizing chamber of the master cylinder are controlled independently of each other, by the corresponding set of fluid flow control valve and pump, such that the pressure in each of those wheel brake cylinders is not influenced by the pressure in the other wheel brake cylinder or cylinders, unlike the wheel brake cylinder pressures in the case where these wheel brake cylinders pressures are all controlled by only one set of fluid flow control valve and pump. Accordingly, the accuracy of control to increase the pressure in each wheel brake cylinder is improved.

The braking system may have the feature of the above mode (26), without the feature according to the above mode (1) that the pressure increasing operation is initiated when the brake operating force has increased to the transition point of the vacuum booster. Further, the feature of the present mode (26) may be effective not only for increasing the wheel brake cylinder pressure so as to be higher than the master cylinder pressure, for thereby compensating for reduction of the boosting effect of the vacuum booster, but also for any other purpose in controlling the wheel brake cylinder pressure.

(27) A braking system according to any one of the above modes (1)–(26), wherein the pressure increasing device is a pump type pressure increasing device including a fluid flow control valve provided in the fluid passage, and a pump functioning as the second hydraulic pressure source and having a delivery end connected to a portion of the fluid passage between the fluid flow control valve and the wheel brake cylinder, the pump being operated to increase the pressure in the wheel brake cylinder to a level higher than the pressure in the master cylinder, while the fluid flow control valve inhibits a flow of a working fluid at least in a direction from the wheel brake cylinder toward the master cylinder, and wherein the automotive vehicle has a front wheel and a rear wheel, and a front wheel brake cylinder and a rear wheel brake cylinder are provided for braking the front and rear wheels, respectively, the front wheel brake cylinder having a larger volume than the rear wheel brake cylinder, the fluid flow control valve and the pump are provided for each of the front and rear wheel brake cylinders, such that the fluid flow control valve and the pump for each of the front and rear wheel brake cylinders are controllable independently of the fluid flow control valve and the pump for the other of the front and rear wheel brake cylinders, the pump type pressure increasing device including pressure increasing rate control means for controlling a rate of increase of the pressure in the each of the front and rear wheel brake cylinders such that the rates of increase of the pressures in the front and rear wheel brake cylinders are equal to each other, irrespective of a difference between the volumes of the front and rear wheel brake cylinders.

In the braking system according to the above mode (27), the fluid flow control valve and the pump are provided for each of the front and rear wheel brake cylinders, such that the two sets of the fluid flow control valve and pump for the respective front and rear wheel brake cylinders are controllable independently of each other. Further, the rates of increase of the pressures in the front and rear wheel brake cylinders are controlled by the pressure increasing rate control means such that these rates are equal to each other, irrespective of the volume difference of the front and rear wheel brake cylinders.

The braking system may have the feature of the above mode (27), without the feature according to the above mode (1) that the transition point of the vacuum booster is kept unchanged irrespective of a change in the pressure in the negative-pressure chamber. Further, the feature of the present mode (27) may be effective not only for increasing the wheel brake cylinder pressure so as to be higher than the master cylinder pressure, after reduction of the boosting ratio of the vacuum booster, but also for any other purpose in controlling the wheel brake cylinder pressure.

(28) A braking system according to the above mode (27), wherein a plurality of solenoid-operated flow control valves are connected to suction sides of the pumps for the front and rear wheel brake cylinders, independently of each other, and the pressure increasing rate control means electrically controls the plurality of solenoid-operated flow control valves such that a rate of flow of the working fluid into the pump for the front wheel brake cylinder is higher than a rate of flow of the working fluid into the pump for the rear wheel brake cylinder.

(29) A braking system according to the above mode (27), wherein the pressure increasing rate control means electrically controls the pumps for the respective front and rear wheel brake cylinders such that a delivery amount of the pump for the front wheel brake cylinder is larger than a delivery amount of the pump for the rear wheel brake cylinder.

(30) A braking system according to the above mode (27), wherein the pressure increasing rate control means electrically controls the fluid flow control valves for the front and rear wheel brake cylinders, such that a rate of flow of the working fluid from the pump for the front wheel brake cylinder into the master cylinder through the fluid flow control valve for the front wheel brake cylinder is lower than a rate of flow of the working fluid from the pump for the rear wheel brake cylinder into the master cylinder through the fluid flow control valve for the rear wheel brake cylinder.

(31) A braking system according to the above mode (27), wherein the pressure increasing rate control means includes the pumps for the front and rear wheel brake cylinders, the pump for the front wheel brake cylinder having a larger delivery amount than the pump for the rear wheel brake cylinder when the pumps are held operated at a same speed.

According to the present invention, there are also provided the following braking systems:

(32) A braking system for braking a wheel of an automotive vehicle, comprising:

a brake operating member;

a master cylinder functioning as a first hydraulic pressure source for generating a hydraulic pressure based on an input force;

a brake including a wheel brake cylinder which is connected to the master cylinder through a fluid passage and which is activated by a hydraulic pressure supplied thereto through the fluid passage, for braking the wheel; and a pressure increasing device including a second hydraulic pressure source connected to the fluid passage, the pressure increasing device increasing a hydraulic pressure in the wheel brake cylinder, by using the second hydraulic pressure source, such that the increased hydraulic pressure in the wheel brake cylinder is higher than that generated by the master cylinder, and wherein the pressure increasing device is a pump type pressure increasing device including a fluid flow control valve provided in the fluid passage, and a pump functioning as the second hydraulic pressure source and having a delivery end connected to a portion of the fluid passage between the fluid flow control valve and the wheel brake cylinder, the pump being operated to increase the pressure in the wheel brake cylinder to a level higher than the pressure in the master cylinder, while the fluid flow control valve inhibits a flow of a working fluid at least in a direction from the wheel brake cylinder toward the master cylinder, the pump type pressure increasing device further including (a) target pressure increase amount determining means for determining, on the basis of a braking effect desired by an operator of the automotive vehicle, a target pressure increase amount by which the pressure in the wheel brake cylinder is controlled to be higher than the pressure in the master cylinder, and (b) duty control means for controlling a duty ratio of the pump, on the basis of a rate of change of the braking effect desired by the operator.

(33) A braking system according to the above mode (32), wherein the braking effect desired by the operator of the automotive vehicle is represented by a quantity relating to the pressure in the master cylinder during an operation of the brake operating member.

The quantity relating to the pressure in the master cylinder may be the master cylinder pressure per se, or any other physical quantity which changes with the master cylinder pressure, such as an operating force or stroke of the brake operating member, and a deceleration value of the automotive vehicle.

(34) A braking system according to the above mode (32) or (33), wherein the rate of change of the braking effect desired by the operator is represented by a rate of change of a quantity relating to the pressure in the master cylinder during an operation of the brake operating member.

(35) A braking system according to any one of the above modes (32)–(34), wherein the duty ratio control means includes means for determining the duty ratio of the pump such that a delivery amount of the pump increases with an increase in the rate of change of the braking effect desired by the operator.

BRIEF DESCRIPTION OF THE DRAWINGS

The above and optional objects, features, advantages and technical and industrial significance of this invention will be better understood by reading the following detailed description of presently preferred embodiments of the invention, when considered in connection with the accompanying drawings, in which:

FIG. 7 is a block diagram showing a software arrangement of the braking system of FIG. 1;

FIG. 8 is a flow chart illustrating a braking effect characteristic control routine executed according to a program stored in a ROM of an electronic control unit shown in FIG. 7;

FIG. 18 is a view in a tabular form showing operating states of a pressure control valve, a pressure holding valve, a pressure reducing valve, an inflow control valve and a pump motor in different control modes of the braking system of FIG. 17;

FIG. 20 is a view in a tabular form showing operating states of a pressure control valve, a pressure reducing valve, an inflow control valve and a pump motor in different control modes of the braking system of FIG. 19;

FIG. 23 is a view in a tabular form showing operating states of a pressure control valve, a pressure reducing valve, an inflow control valve and a pump motor in different control modes of a braking system according to a fourth embodiment of the invention;

FIG. 27 is a view in a tabular form showing operating states of a two-position valve, a pressure reducing valve, an inflow control valve and a pump motor in different operating states of the braking system of FIG. 24;

DETAILED DESCRIPTION OF THE PREFERRED EMBODIMENTS

Figure 1:
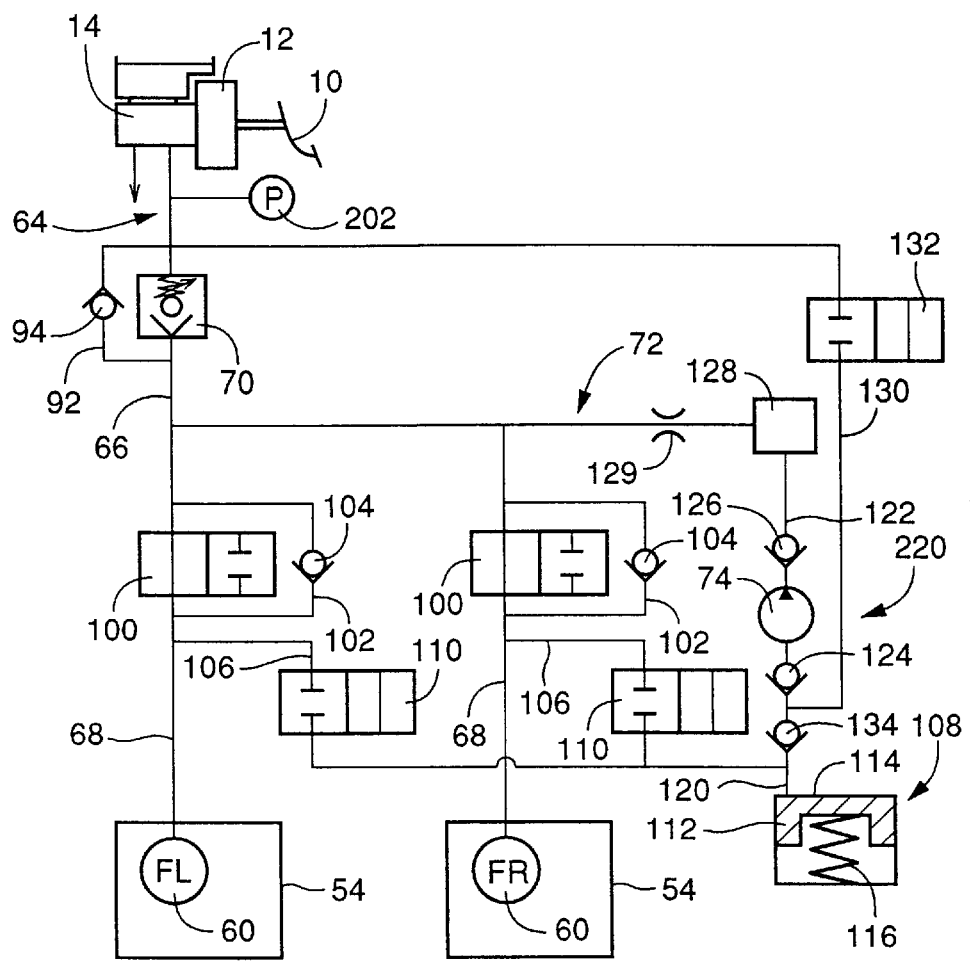
FIG. 1 is a schematic view showing a hardware arrangement of a braking system constructed according to one embodiment of this invention.

Referring first to FIG. 1, there is shown a braking system of an automotive vehicle, which is constructed according to a first embodiment of the present invention. The braking system is provided with a brake operating member in the form of a brake pedal 10, which is operatively connected to a master cylinder 14 through a vacuum booster 12. The master cylinder 14, which functions as a first hydraulic pressure source, is of a tandem type including two pressurizing pistons disposed in series with each other in a housing such that the pistons are slidable within the housing. The two pressurizing pistons cooperate with the housing to define two mutually independent pressurizing chambers in front of the respective pistons. The master cylinder 14 is a mechanism for pressurizing a fluid in the two pressurizing chambers to generate the same levels of hydraulic pressure corresponding to a brake operating force which acts on the brake pedal 10.

Figure 2:
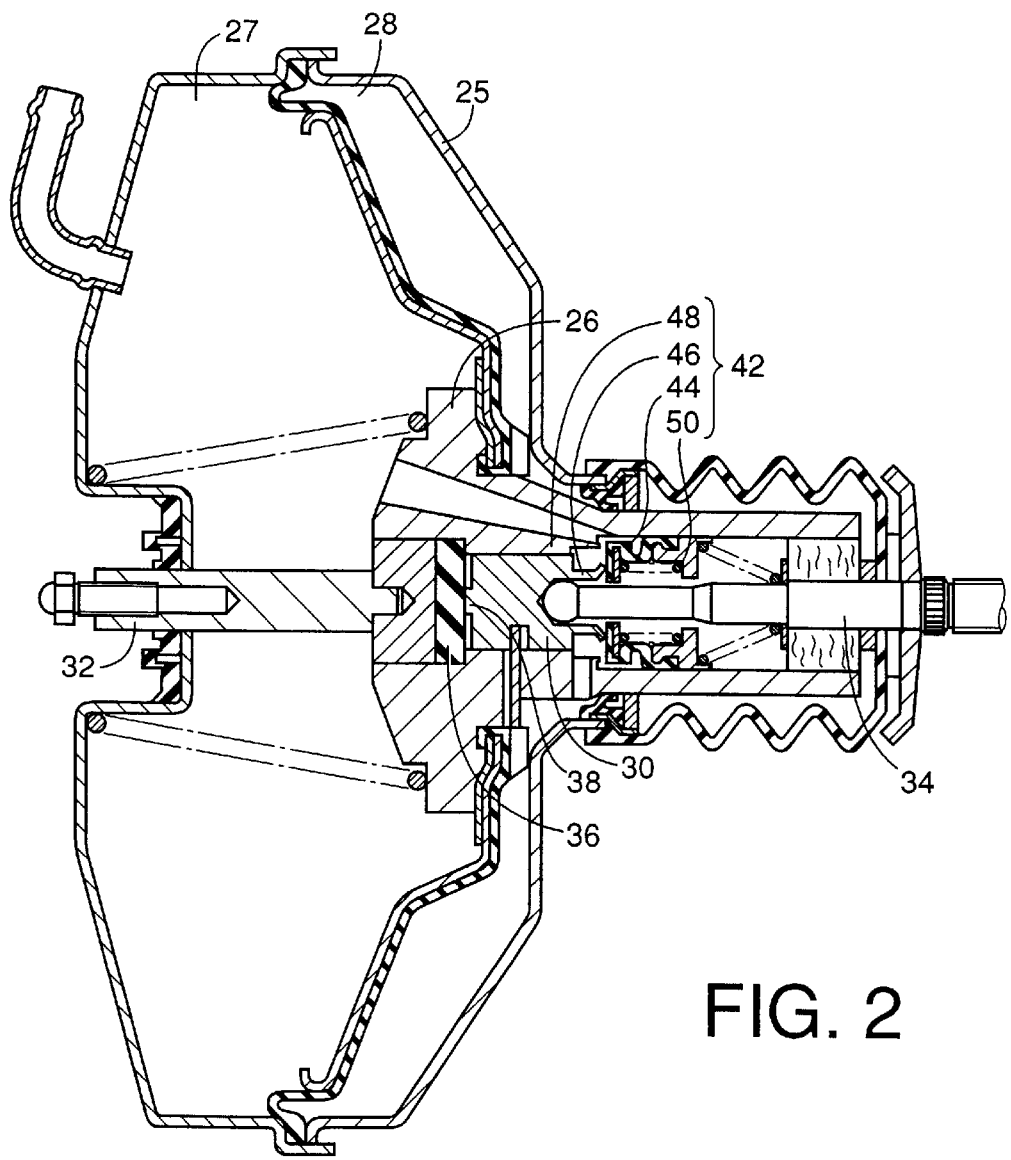
FIG. 2 is an enlarged side elevational view in cross section of a vacuum booster in the braking system of FIG. 1.

Referring to FIG. 2, there is shown the vacuum booster 12 in enlargement. The vacuum booster 12 has a hollow housing 25, and includes a power piston equipped with a diaphragm disposed within the housing 25 so as to divide the interior space of the housing 25 into a negative-pressure chamber 27 on the side of the master cylinder 14, and a variable-pressure chamber 28 on the side of the brake pedal 10. The negative-pressure chamber 27 is held in communication with a negative pressure source in the form of an intake pipe of an engine of the vehicle. The variable-pressure chamber 28 is selectively communicated with the negative-pressure chamber 27 and the atmosphere, through a valve mechanism which will be described.

The power piston 26 is associated with a valve plunger 30 disposed on the side of the brake pedal 10, and a booster piston rod 32 disposed on the side of the master cylinder 14. A valve operating rod 34 is coaxially connected at one end thereof to the valve plunger 30 such that the valve operating rod 34 is movable with the valve plunger 30, and at the other end to the brake pedal 10 so that the brake pedal 10 is connected to the valve plunger 30 through the valve operating rod 34. It will be understood that the mutually connected valve plunger 30 and operating rod 34 cooperate to function as an input rod of the vacuum booster 12. The booster piston rod 32 is associated with one of the two pressurizing pistons of the master cylinder 14, which is located on the side of the vacuum booster 12. The booster piston rod 32 functions to transmit an output of the vacuum booster 12 to the master cylinder 14. It will therefore be understood that the booster piston rod 34 functions as an output rod of the vacuum booster 12.

The power piston 26 accommodates a reaction disc 36 made of a rubber material, such that the power piston 26 and the valve plunger 30 contact the reaction disc 36 in one of the opposite axial directions of the vacuum booster 12, while the booster piston rod 32 contacts the reaction disc 36 in the other axial direction. In this arrangement, the reaction disc 36 has a function of transmitting an operating force of the power piston 26 to the booster piston rod 32, and a function of transmitting a reaction force of the booster piston rod 32 to the valve plunger 30.

In the present embodiment, the valve plunger 30 has a projection 38 formed on its end face which faces the reaction disc 36. The projection 38 has a diameter smaller than the diameter of the other portion of the valve plunger 30. When the valve plunger 30 is moved toward the reaction disc 36, only the projection 38 is initially brought into contact with the reaction disc 36, and then the valve plunger 30 contacts the reaction disc 36 over the entire area of the end face of the valve plunger 30. In this arrangement, the reaction force which the valve plunger 30 receives from the booster piston rod 32 is smaller when the brake operating force acting on the brake pedal 10 is relatively small, than when the brake operating force is relatively large. This means that the boosting ratio of the vacuum booster 12 is relatively high when the brake operating force is relatively small, while the boosting ratio is relatively low when the brake operating force is relatively large.

Figure 40:
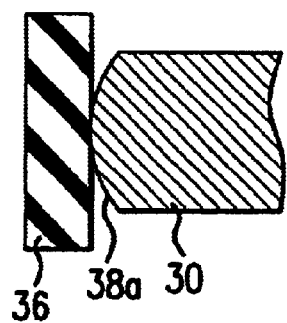
FIG. 40 shows a relationship between a reaction disc and a value plunger according to an embodiment of the present invention.

It will be understood that the end portion of the valve plunger 30 at which the valve plunger 30 contacts the reaction disc 36 consists of two sections one of which is the projection 38 having a relatively small transverse cross sectional area and the other of which has a transverse cross sectional area larger than that of the projection 38. The valve plunger 30 may be modified to include an end portion having a convex end face 38a for abutting contact with the reaction disc 38, in place of the end portion having the projection 38, as shown in FIG. 40. The end portion having the convex end face 38a has a transverse cross sectional area which continuously increases in the axial direction of the valve plunger 30 from the convex end face 38a toward the other end portion on the side of the booster piston rod 34.

As indicated above, there is provided a valve mechanism 42 associated with the negative-pressure chamber 27, the variable-pressure chamber 28 and the ambient atmosphere. The valve mechanism 42 is operated according to a relative axial position of the valve operating rod 34 and the power piston 26, and includes a control valve 44, an air valve 46, a vacuum valve 48 and a control valve spring 50. The air valve 46 cooperates with the control valve 44 to selectively connect and disconnect the variable-pressure chamber 28 to and from the ambient atmosphere. The air valve 46 is disposed such that the air valve 46 is movable with the valve plunger 30. The control valve 44 is attached to the valve operating rod 34 such that the control valve 44 is biased so as to be seated on the air valve 46, under a biasing force of the control valve spring 50 fixed to the valve operating rod 34. The vacuum valve 48 cooperates with the control valve 44 to selectively connect and disconnect the variable-pressure chamber 28 to and from the negative-pressure chamber 27. The vacuum valve 48 is disposed such that the vacuum valve 48 is movable with the power piston 26.

In a non-operated state of the vacuum booster 12 constructed as described above, the control valve 44 is seated on the air valve 46, and at the same time spaced apart from the vacuum valve 48, so that the variable-pressure chamber 28 is disconnected from the atmosphere and is connected or communicated with the negative-pressure chamber 27. In this non-operated state, the pressure in the variable-pressure chamber 28 is equal to that in the negative-pressure chamber 27, namely, is a negative or sub-atmospheric pressure (lower than the atmospheric pressure). In an operated state of the vacuum booster 12, the valve operating rod 34 is moved toward the power piston 26, and the control valve 44 is eventually seated on the vacuum valve 48, so that the variable-chamber 28 is disconnected from the negative-pressure chamber 27. When the valve operating rod 34 is further moved toward the power piston 26, the air valve 46 is spaced apart from the control valve 44, so that the variable-pressure chamber 28 is brought into communication with the atmosphere. In this operated state, the pressure in the variable-pressure chamber 28 is raised to the atmospheric pressure, causing a difference between the pressures in the negative-pressure and variable-pressure chambers 27, 28, so that the power piston 26 is moved toward the negative-pressure chamber 27, whereby the brake operating force acting on the brake pedal 10 is boosted by the vacuum booster 12, and the boosted force is transmitted to the master cylinder 14.

The pressure difference of the negative- and variable-pressure chambers 27, 28 will not increase after the pressure in the variable-pressure chamber 28 has been raised to the atmospheric pressure, even if the brake pedal 10 is depressed with an increased force. Thus, the vacuum booster 12 has a boosting limit, at which the vacuum booster 12 has become inoperable to perform its boosting function.

Figure 3:
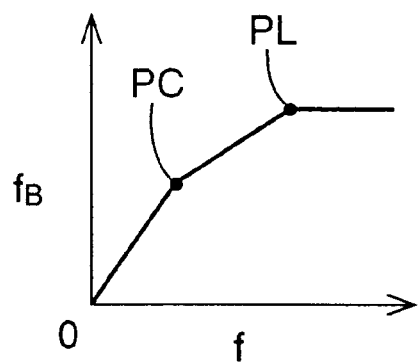
FIG. 3 is a graph showing an input-output characteristic of the vacuum booster.

The graph of FIG. 3 indicates an input-output characteristic of the vacuum booster 12. In this graph, the brake operating force f acting on the brake pedal 10 (input force) is taken along the abscissa, while an output force $f_B$ of the booster piston rod 32 is taken along the ordinate. A relationship between the brake operating force f and the output force $f_B$ is represented by a bent line in the graph. The bent line has two bending points PL, PC (intersection points of adjacent straight segments of the bent line), such that the rate of increase of the output force $f_B$ with an increase of the brake operating force f decreases in steps. Described more specifically, the bending point PL at which the output force $f_B$ is larger than at the other bending point PC is referred to as a boosting limit point at which the pressure in the variable-pressure chamber 28 has been raised to the atmospheric pressure, namely at which the boosting limit of the vacuum booster 12 is reached. The bending point PC is referred to as a transition point at which the boosting ratio of the vacuum booster 12 changes from a relatively high value to a relatively low value, due to the transition of contact between the valve plunger 30 and the reaction disc 36, from the partial contact of the valve plunger 30 at its projection 38 to the full contact over the entire area of the appropriate end face of the valve plunger 30.

The boosting limit point PL depends upon the difference between the pressure in the negative-pressure chamber 27, namely, the negative pressure in the intake pipe of the vehicle engine and the atmospheric pressure. Since the negative pressure in the intake pipe varies, the boosting limit point PL varies with the negative pressure in the intake pipe. On the other hand, the transition point PC of the boosting ratio does not vary with the intake pipe pressure.

As described above, the vacuum booster 12 is adapted such that its boosting ratio changes (decreases) depending upon the brake operating force f. Described more specifically, the boosting ratio is relatively high while the brake operating force f is smaller than a value corresponding to the transition point PC, and relatively low while the brake operating force f is between the values corresponding to the transition point PC and the boosting limit point PL. The brake operating force f is not boosted by the vacuum booster 12 after the boosting limit point PL is reached.

Figure 4:
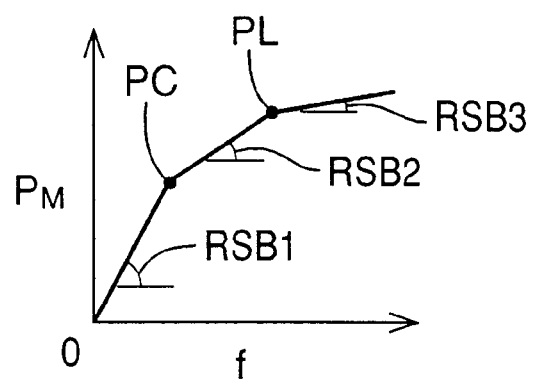
FIG. 4 is a graph indicating a relationship between a brake operating force f and a master cylinder pressure $P_M$ in the braking system of FIG. 1.

The graph of FIG. 4 indicates a relationship between the brake operating force f taken along the abscissa and the pressure $P_M$ in the master cylinder 14 taken along the ordinate. This relationship represents an input-output characteristic of a boosting device consisting of the vacuum booster 12 and the master cylinder 14. The brake operating force f smaller than the value corresponding to the transition point PC is boosted by this boosting device at a highest boosting ratio RSB1. While the brake operating force f is between the values corresponding to the transition point PC and the boosting limit point PL, the force f is boosted by the boosting device at a boosting ratio RSB2 which is lower than the boosting ration RSB1. The force f larger than the value corresponding to the boosting limit point PL is boosted at a lowest boosting ratio RSB3.

The present braking system has two sub-systems, one for front left and right wheels FL, FR as shown in FIG. 1, and the other for rear left and right wheels (not shown). The sub-system for the front wheels FL, FR includes two brakes 54 having respective wheel brake cylinders 60 for braking the respective front left and right wheels FL, FR. The wheel brake cylinders 60 are connected to one of the two pressurizing chambers of the master cylinder 14. The other sub-system for the rear wheels includes two brakes having respective wheel brake cylinders connected to the other pressurizing chamber, for braking the respective rear left and right wheels. Since these two sub-systems are basically identical in construction with each other, only the sub-system for the front wheels FL, FR will be described by reference to FIG. 1, by way of example.

The master cylinder 14 is connected through a main fluid passage 64 to the wheel brake cylinders 60 for the front left and right wheels FL, FR. The main fluid passage 64 has a common passage 66 extending from the master cylinder 14, and two branch passages 68 each of which is connected at its end to the common passage 66. A pressure control valve 70 is provided in the common passage 60. Each branch passage 68 is connected at the other end to the wheel brake cylinder 60. To a portion of the main fluid passage 64 between the pressure control valve 64 and the wheel brake cylinders 60, there is connected a pump passage 72 to which is connected a pump 74 which functions as a second hydraulic pressure source.

Figure 5A:
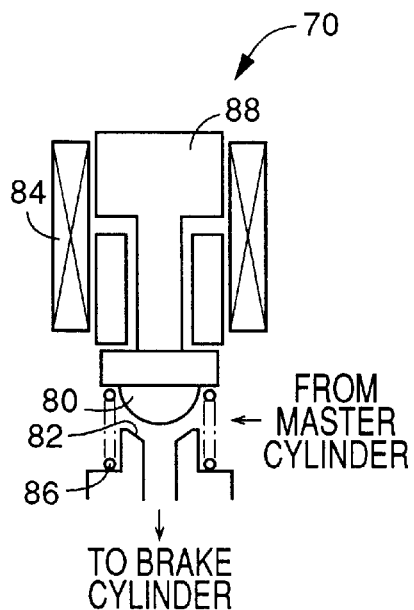
FIGS. 5(a) and 5(b) are front elevational views in cross section for explaining the construction and operation of a pressure control valve in the braking system of FIG. 1.
Figure 5B:
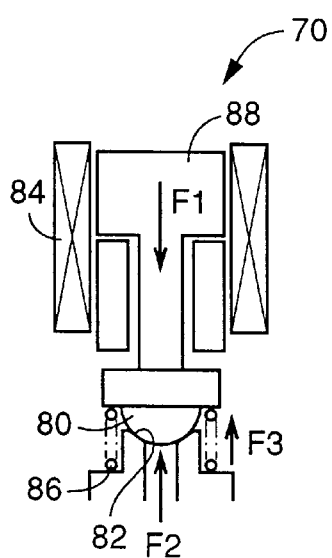

FIGS. 5(a) and 5(b) show the pressure control valve 70 in enlargement. The pressure control valve 70 is adapted to electromagnetically control a difference between the hydraulic pressure in the master cylinder 14 and the hydraulic pressure in the wheel brake cylinders 60. The pressure control valve 70 includes a housing, and a valve member 80 and a valve seat 82 which cooperate with each other to control fluid communication between the portions of the main fluid passage 64 on the opposite sides of the valve 70. The valve 70 further includes a solenoid coil 84 which is energized to generate a magnetic force for controlling a relative movement of the valve member 80 and the valve seat 82.

While the solenoid coil 84 of this pressure control valve 70 is in a non-energized or OFF state as shown in FIG. 5(a), the valve member 80 is held apart from the valve seat 82 under a biasing force of a spring 86, so that the working fluid is permitted to flow through the main fluid passage 64 in the opposite directions. When the brake pedal 10 is operated in this OFF state, the pressure in the wheel brake cylinders 60 changes with the pressure in the master cylinder 14 (master cylinder pressure $P_M$). During an operation of the brake pedal 10, a force acts on the valve member 80 so as to move the valve member 80 away from the valve seat 82, so that the valve member 80 is prevented from being seated on the valve seat 82, even when the master cylinder pressure $P_M$ and the pressure in the wheel brake cylinders 70 are increased, provided that the solenoid coil 84 is kept in the OFF or non-energized state. Thus, the pressure control valve 70 is a normally open solenoid-operated valve.

In an energized or ON state of the solenoid coil 84 as shown in FIG. 5(b), a magnetic force generated by the coil 84 moves an armature 88 toward the valve seat 82 so that the valve member 80 serving as a movable member movable with the armature 88 is moved so as to be seated on the valve seat 82 which serves as a stationary member. At this time, the magnetic force $F_1$ acts on the valve member 80 in the direction toward the valve seat 82, while a sum of a force $F_2$ based on the difference between the pressures in the master cylinder pressure 14 and the wheel brake cylinders 60 and a biasing force $F_3$ of the spring 86 acts on the valve member 80 in the opposite direction away from the valve seat 82. The force $F_2$ is equal to a product of the above-indicated pressure difference (of the master cylinder 14 and the wheel brake cylinders 60) and an effective pressure-receiving surface of the valve member 80 which receives the wheel brake cylinder pressure.

While the solenoid coil 84 is energized and while the operating condition of the braking system satisfies an equation $F_2 \leq_{F1} -F_3$ with the delivery pressure of the pump 74 being relatively low (with the wheel brake cylinder pressure being relatively low), the valve member 80 is held seated on the valve seat 82, and the fluid delivered from the pump 74 is prevented from flowing to the master cylinder 14, so that the delivery pressure of the pump 74 is increased, and the pressure in the wheel brake cylinders 60 is raised to a level higher than the pressure $P_M$ in the master cylinder 14.

While the operating condition of the braking system satisfies an equation $F_2 > F_1 - F_3$ with the delivery pressure of the pump 74 being increased (with the wheel brake cylinder pressure being increased), the valve member 80 is moved away from the valve seat 82, and the fluid delivered from the pump 74 is permitted to flow to the master cylinder 14, thereby preventing a further rise in the delivery pressure of the pump 74, namely, a further increase in the pressure of the wheel brake cylinders 60. Thus, the pressure in the wheel brake cylinders 60 is controlled by the pressure control valve 70 such that the pressure in the wheel brake cylinders 60 is higher than that in the master cylinder 14 by an amount corresponding to the magnetic force $F_1$ generated by the solenoid coil 84, if the biasing force $F_3$ is ignored.

Figure 6:
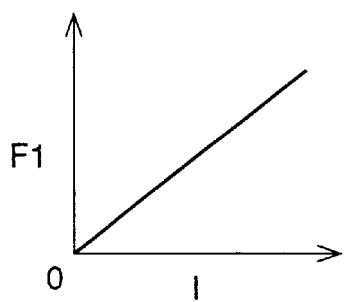
FIG. 6 is a graph indicating a relationship between a solenoid coil current I of the pressure control valve and a magnetic force $F_1$ generated by the valve.

The pressure control valve 70 is designed such that the magnetic force $F_1$ generated by the coil 84 changes linearly with an energization current I applied to the coil 84, as indicated in the graph of FIG. 6.

A by-pass passage 92 is provided so as to by-pass the pressure control valve 70, as shown in FIG. 1. A by-pass valve 94, which is a check valve, is provided in the by-pass passage 92, so as to permit a flow of the fluid from the master cylinder 14 toward the wheel brake cylinders 20, even in the event of closure of the pressure control valve 70 due to mechanical locking or sticking of a movable member of the valve 70 or for any other reason, during an operation of the brake pedal 10.

In a portion of each branch passage 68 between the wheel brake cylinder 60 and a point of connection thereof to the pump passage 72, there is provided a pressure holding valve 100, which is a normally open solenoid-operated shut-off valve. When the solenoid coil of this pressure holding valve 100 is energized, the valve 100 is closed, preventing flows of the fluid from the wheel brake cylinder 60 toward the master cylinder 14 and the pump 74, to thereby hold the pressure of the wheel brake cylinder 60 at the present level. A by-pass passage 102 is provided so as to by-pass the pressure holding valve 100 in each branch passage 68, and a by-pass valve 102 which is a check valve is provided in the by-pass passage 102.

Each branch passage 68 is connected to a reservoir 108 through a reservoir passage 106. This reservoir passage 106 is connected to a portion of each branch passage 68 between the pressure holding valve 100 and the wheel brake cylinder 60. A pressure reducing valve 110 which is a normally closed solenoid-operated shut-off valve is provided in the reservoir passage 106. When the solenoid coil of this pressure reducing valve 110 is energized, the valve 110 is opened, to permit a flow of the fluid from the wheel brake cylinder 60 toward the reservoir 108, thereby reducing the pressure in the wheel brake cylinder 60.

As shown in FIG. 1, the reservoir 108 includes a reservoir piston 112 slidably and substantially fluid-tightly received in a housing, which cooperates with the reservoir piston 112 to define a reservoir chamber 114 for storing the fluid under pressure with the reservoir piston 112 held biased by biasing means in the form of a spring 116. The reservoir chamber 114 is connected to the main fluid passage 64 through the pump passage 72.

The pump passage 72 is divided by the pump 74 into a suction passage 120 on the side of the reservoir 108 and a delivery passage 122 on the side of the main fluid passage 66. A suction valve 124 and a delivery valve 126, which are check valves, are provided in the suction and delivery passages 120, 122, respectively. Further, a damper chamber 128 and an orifice or flow restrictor 129 are provided in series in the delivery passage 122, for the purpose of reducing pulsation of the fluid delivered from the pump 74.

A fluid supply passage 130 is connected at its one end to a portion of the suction passage 120 between the suction valve 124 and the reservoir 108, and at the other end to a portion of the main fluid passage 64 between the master cylinder 14 and the pressure control valve 70. An inflow control valve 132 which is a normally closed solenoid-operated shut-off valve is provided in the fluid supply passage 130. This inflow control valve 132 is controlled by an electronic control unit (ECU) 200 which will be described, such that the valve 132 is closed when the pump 74 is required to be operated to pump up the fluid from the reservoir 108 and is not desired to pump up the fluid from the master cylinder 14, and is opened when the pump 74 is required to be operated to pump up the fluid from the master cylinder 14. A check valve 134 is provided in a portion of the suction passage 120 between the reservoir 108 and a point of connection thereof to the fluid supply passage 130. The check valve 134 functions to inhibit a flow of the fluid from the master cylinder 14 into the reservoir 108 while the inflow control valve 132 is open. This check valve 134 assures that the fluid pressurized by the master cylinder 14 is supplied to the pump 74 without a drop of the fluid pressure. In this respect, it is noted that the reservoir passage 106 is connected to a portion of the suction passage 120 between the check valve 134 and the reservoir 108.

While the hardware arrangement of the braking system of the present first embodiment has been described, a software arrangement of the braking system will be described by reference to FIG. 7, which shows only the sub-system for the front wheels FL, FR.

As indicated above, the present braking system includes the electronic control unit (abbreviated as "ECU" in FIG. 7) 200, which is principally constituted by a computer incorporating a central processing unit (CPU), a read-only memory (ROM) and a random-access memory (RAM). The electronic control unit 200 is adapted such that the CPU executes a braking effect characteristic control routine and an anti-lock braking pressure control routine, according to control programs stored in the ROM, while utilizing a temporary data storage function of the RAM. The term "braking effect characteristic control" is interpreted to mean controlling of a braking effect characteristic of the braking system as represented by a relationship between the braking operating force f and a deceleration value G of the automotive vehicle, so that the deceleration value G increased with the brake operating force f at a predetermined rate, even when the boosting function of the vacuum booster 12 is lowered. As well known in the art, the term "anti-lock braking pressure control" is interpreted to mean controlling of the fluid pressure in the wheel brake cylinder 60 for each wheel, so as to prevent an excessive locking tendency of the wheel during brake application to the vehicle. In the present embodiment, the working fluid is recirculated through the braking circuit, by operation of the pump 74 while the braking system is operated in an anti-lock braking pressure control mode. The braking system is adapted to effect the braking effect characteristic control by utilizing the pump 74, during an operation of the brake pedal 10. That is, the present embodiment utilizes the pump 74 for not only the braking effect characteristic control but also the anti-lock braking pressure control.

To the input side of the electronic control unit 200, there are connected a master cylinder pressure sensor 202 and wheel speed sensors 204. The master cylinder pressure sensor 202 is provided to detect the pressure in the master cylinder 14 or any other portion of the braking system at which the pressure is substantially equal to the pressure in the master cylinder 14. The sensor 202 generates an output signal indicative of the pressure in the master cylinder 14. The wheel speed sensors 204 are provided for detecting the rotating speeds of the respective four wheels of the automotive vehicle. Each sensor 204 generates an output signal indicative of the rotating speed of the corresponding wheel.

To the output side of the electronic control unit 200, there is connected an electric motor 210 for driving the pump 74. The driver circuit of the pump motor 210 receives a motor drive signal from the electronic control unit 200. To the output side of the electronic control unit 200, there are also connected the solenoid coil 84 of the pressure control valve 70, and solenoid coils 212 of the pressure holding valve 100, pressure reducing valve 110 and inflow control valve 132. The solenoid coil 84 receives a current control signal from the electronic control unit 200 so that the magnetic force generated by the coil 84 is linearly proportional with the amount of current applied thereof. The solenoid coils 212 of the valves 100, 110, 132 receive solenoid ON/OFF signals from the electric control unit 200 so as to open and close these valves.

The braking effect characteristic control routine is illustrated in the flow chart of FIG. 8. Before explaining this routine by reference to the flow chart, the concept of the routine will be first described briefly.

Figure 9A:
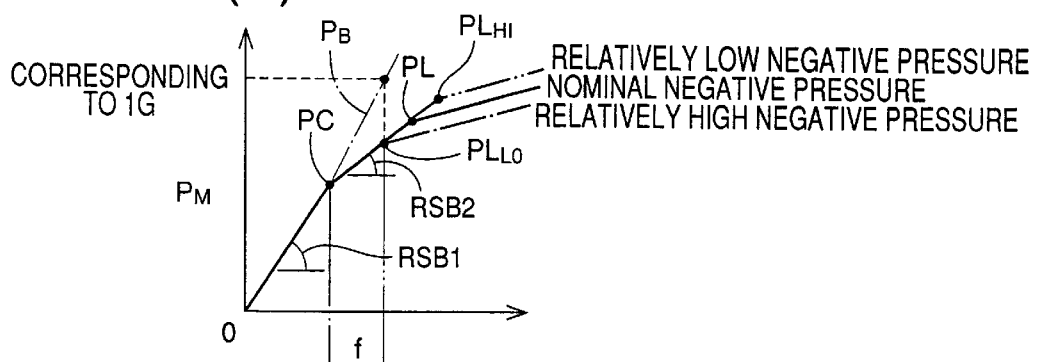
FIGS. 9(a), 9(b) and 9(c) are graphs for explaining the braking effect characteristic control routine of FIG. 8.

The graph in FIG. 9(a) indicates a relationship between the brake operating force f and the master cylinder pressure $P_M$. More specifically, the graph indicates a change in the boosting limit point PL depending upon a change in the negative pressure in the negative-pressure chamber 27, that is, in the negative pressure of the engine (its suction pipe). The boosting limit point PL is shifted in the upward direction (in the direction of increase of the master cylinder pressure $P_M$) as the negative pressure of the engine is lowered from a nominal level away from the atmospheric level, and is shifted in the downward direction (in the direction of decrease of the master cylinder pressure $P_M$) as the negative pressure of the engine is increased from the nominal level toward the atmospheric level. In the graph of FIG. 9(a), $PL_{HI}$ represents a highest boosting limit point of the vacuum booster 12 when the negative pressure of the engine is at its lowest level, while $PL_{LO}$ represents a lowest boosting limit point of the vacuum booster 12 when the negative pressure of the engine is at its highest level (nearest to the atmospheric pressure). In the present embodiment, the vacuum booster 12 is arranged such that the lowest boosting limit point $PL_{LO}$ is located above the transition point PC of the boosting ratio.

Figure 9B:
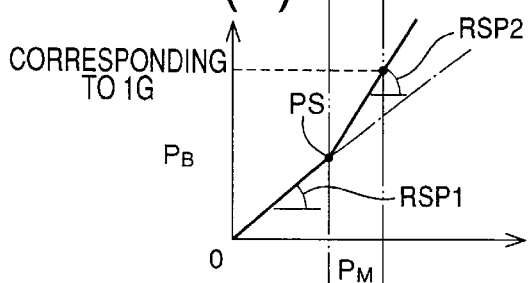

The graph in FIG. 9(b) indicates a relationship between the pressure $P_M$ in the master cylinder 14 and the pressure $P_B$ in the wheel brake cylinder 60. More specifically, the graph shows a change in a pressure increasing ratio of a pressure increasing device 220 (FIG. 1) consisting of the pump 74, pressure control valve 70 and electronic control unit 200. That is, the braking system is adapted to increase the wheel brake cylinder pressure $P_B$ with respect to the master cylinder pressure $P_M$, at a relatively low increasing ratio RSP1 while the brake operating force f is smaller than a value corresponding to a pressure increase initiating point PS which corresponds to the transition point PC, and at a relatively high increasing ratio RSP2 while the brake operating force f is larger than the value corresponding to the pressure increase initiating point PS.

In the present embodiment, the operation to increase the wheel brake cylinder pressure $P_B$ by the pump 74 is initiated when the transition point PC of the vacuum booster 12 is reached, that is, when the pressure increase initiating point PS is reached. It is noted that the ratio of the wheel brake cylinder pressure $P_B$ to the brake operating force f is equal to a product of the boosting ratio of the vacuum booster 12 and the pressure increasing ratio of the pressure increasing device 200. This ratio or product represents the braking effect of the braking system.

Figure 9C:
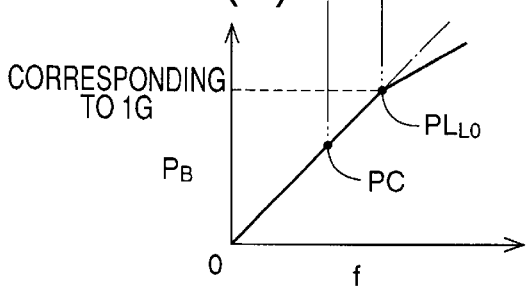

The present embodiment is further adapted such that the product of the boosting ratio RSB1 and the pressure increasing ratio RSP1 is equal to the product of the boosting ratio RSB2 and the pressure increasing ratio RSP2. Accordingly, the braking effect is kept constant before and after the transition point PC of the boosting ratio is reached, that is, remains unchanged even after the transition point PC is reached, as indicated in the graph of FIG. 9(c). Thus, the braking effect is kept constant even after the boosting ratio of the vacuum booster 12 is lowered at the transition point PC. It is also noted that since the transition point PC does not change with a change in the negative pressure of the engine (negative pressure in the negative-pressure chamber 27), the moment at which the operation to increase the wheel brake cylinder pressure $P_B$ by the pump 74 is initiated does not vary depending upon a change in the negative pressure of the engine.

The present braking system is further adapted such that the wheel brake cylinder pressure $P_B$ corresponding to the lowest boosting limit point $PL_{LO}$ corresponds to a deceleration value 1G of the vehicle body. Thus, the boosting limit point PL of the vacuum booster will not exceed the lowest boosting limit point $PL_{LO}$ irrespective of a change in the negative pressure of the engine, as long as the braking system is operated under an ordinary road surface condition. In the present braking system, therefore, the boosting limit of the vacuum booster 12 will not be reached after the operation of the pressure increasing device 220 to increase the wheel brake cylinder pressure $P_B$ by the pump 74 is initiated. Thus, the present braking system does not suffer from a reduction in the braking effect which would take place when the boosting limit is reached.

The braking effect characteristic control routine will then be described in detail by reference to the flow chart of FIG. 8.

This routine is repeatedly executed after an ignition switch of the vehicle is turned on by the vehicle operator. Each cycle of execution of the routine is initiated with step S1 to read in the output signal of the master cylinder pressure sensor 202. Then, the control flow goes to step S2 to determine whether the master cylinder pressure $P_M$ represented by the output signal of the sensor 202 is higher than a reference value $P_{M0}$ which is the master cylinder pressure $P_M$ at which the braking effect characteristic control routine is initiated. That is, the reference value $P_{M0}$ is the master cylinder pressure $P_M$ at which the transition point PC of the vacuum booster 12 is reached. If a negative decision (NO) is obtained in step S2, the control flow goes to step S3 to generate a signal for de-energizing or turning OFF the solenoid coil 84 of the pressure control valve 70. Step S3 is followed by step S4 to generate a signal for de-energizing or turning OFF the solenoid coil 212 of the inflow control valve 132, and step S5 to generate a signal for de-energizing or turning OFF the pump motor 210. Thus, one cycle of execution of the routine of FIG. 1 is terminated.

Figure 10:
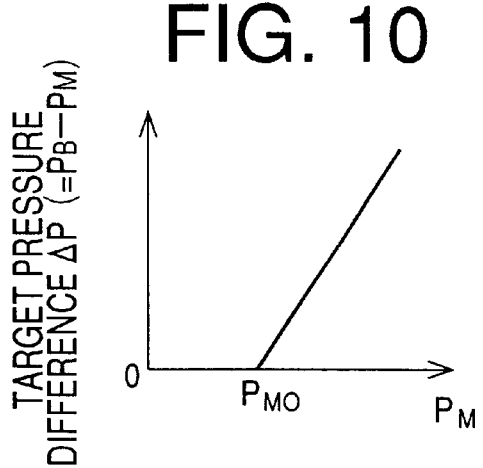
FIG. 10 is another graph for explaining the braking effect characteristic control routine.

If an affirmative decision (YES) is obtained in step S2, that is, if the master cylinder pressure $P_M$ is higher than the reference value $P_{M0}$, the control flow goes to step S6 to calculate a target pressure difference $\Delta P$ by which the wheel brake cylinder pressure $P_B$ is increased with respect to the master cylinder pressure $P_M$. This target pressure difference $\Delta P$, which corresponds to the pressure increasing ratio RSP2 indicated above, is calculated on the basis of the presently detected master cylinder pressure $P_M$ and according to a predetermined relationship between $P_M$ and $\Delta P$ stored in the ROM of the electronic control unit 200. An example of this relationship is indicated in the graph of FIG. 10.

Figure 11:
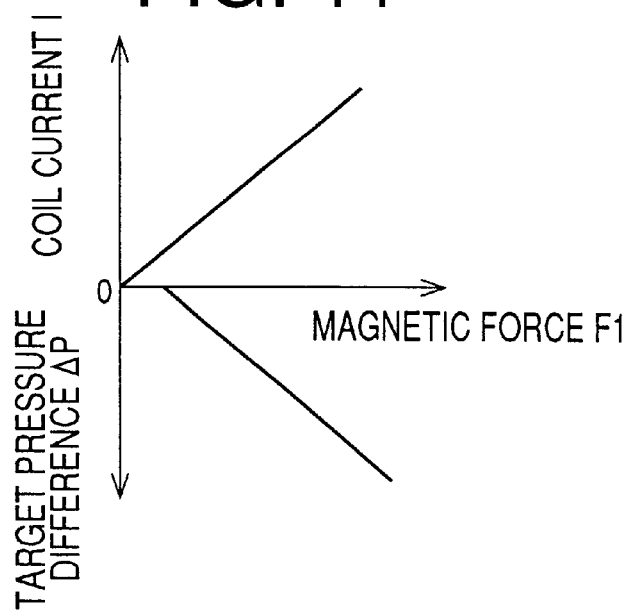
FIG. 11 is a further graph for explaining the braking effect characteristic control routine.

Step S6 is followed by step S7 in which an electric current I to be applied to the solenoid coil 84 of the pressure control valve 70 is calculated on the basis of the calculated target pressure difference $\Delta P$ and according to a predetermined relationship between $\Delta P$ and I stored in the ROM. The graph of FIG. 11 indicates a relationship between the target pressure difference $\Delta P$ and the magnetic force F1, and a relationship between the magnetic force F1 and the coil current I. Thus, the graph of FIG. 11 indicates an example of the relationship between $\Delta P$ and I via the magnetic force F1 serving as an interrelating medium.

Then, the control flow goes to step S8 in which the electric current I calculated is applied to the solenoid coil 84 of the pressure control valve 70. Step S8 is followed by step S9 to generate a signal for energizing or turning ON the solenoid coil 212 of the inflow control valve 132. Step S9 is followed by step S10 to generate a signal for energizing or turning ON the pump motor 210. With steps S8–S10 being implemented, the working fluid received from the master cylinder 14 is pressurized by the pump 74, and the fluid thus pressurized by the pump 74 is delivered to each wheel brake cylinder 60, so that the wheel brake cylinder pressure $P_B$ is raised by the calculated target pressure difference $\Delta P$ which corresponds to the present master cylinder pressure $P_M$. Thus, one cycle of execution of the routine is terminated.

While the braking effect characteristic control routine has been described by reference to the drawings, the anti-lock braking pressure control routine executed by the electronic control unit 200 will be described next.

The anti-lock braking pressure control routine is formulated to selectively place the braking system in a pressure increasing state, a pressure holding state and a pressure reducing state, so as to prevent locking of each wheel during brake application to the vehicle, while monitoring the rotating speed of the wheel detected by the wheel speed sensor 204 and the vehicle running speed. In the pressure increasing state, the pressure holding valve 100 is placed in an open state thereof while the pressure reducing valve 110 is placed in a closed state thereof. In the pressure holding state, the pressure holding valve 100 and the pressure reducing valve 110 are both placed in their closed states. In the pressure reducing state, the pressure holding valve 100 is placed in the closed state while the pressure reducing valve 110 is placed in the open state. During the anti-lock braking pressure control, the pressure control valve 70 is held in the OFF state and in the open state. The anti-lock braking pressure control routine is further formulated to activate the pump motor 210 so that the fluid is returned from the reservoir 108 to the main fluid passage 64 by operation of the pump 74.

As described above, the present braking system is arranged such that the pressure increasing device 220 is activated when the pressure increase initiating point PS is reached, that is, when the transition point PC of the boosting ratio of the vacuum booster 12 is reached. Since the transition point PC is not influenced by a change in the negative pressure of the engine (negative pressure in the negative-pressure chamber 27), the moment at which the pressure increasing device 220 is activated to initiate the operation to increase the wheel brake cylinder $P_B$ with respect to the master cylinder pressure $P_M$ is stabilized irrespective of a change in the negative pressure of the engine.

For stabilizing the braking effect before and after the boosting limit of the vacuum booster is reached in the conventional braking system, it is necessary to use an exclusive sensor or switch for detecting that the boosting limit of the vacuum booster is actually reached, in order to accurately detect the pressure increase initiating point. Furhter, the braking effect may be stabilized, without using such a sensor or switch, by detecting the wheel braking force or the deceleration value of the vehicle body, and controlling the wheel brake cylinder pressure in a feedback manner on the basis of the detected wheel braking force or vehicle deceleration value. However, this arrangement tends to require a considerably complicated software arrangement for effecting the braking effect characteristic control.

To the contrary, the present braking system uses the master cylinder pressure sensor 202 which is comparatively inexpensive and highly reliable and which permits an open loop control or non-feedback control of the braking effect characteristic. Thus, the present braking system does not suffer from a significant increase in the cost of manufacture due to the use of an expensive sensor or switch, and is free from complexity in the software arrangement for effecting the braking effect characteristic control.

Further, the present braking system is designed such that the boosting limit of the vacuum booster 12 is not reached during a normal braking operation, irrespective of a change in the negative pressure of the vehicle engine, so that the braking effect is stabilized according to the braking effect characteristic control routine, irrespective of a change in the negative pressure of the engine.

Moreover, the present braking system is arranged such that the transition point PC of the vacuum booster 12 is lower than the lowest boosting limit point $PL_{LO}$ corresponding to the expected maximum decrease of the negative pressure of the engine. Accordingly, the transition point PC which is determined by the design of the projection 38 is necessarily reached before the lowest boosting limit point $PL_{LO}$ is reached, so that the pressure increase initiating point PS corresponding to the predetermined transition point PC is stabilized, irrespective of a drop of the negative pressure of the engine from the nominal value.

It will be understood from the foregoing description of the present first embodiment of the braking system of this invention that the pressure increasing device 220 constitutes a pump type pressure increasing device, and the pump 74 constitutes the second hydraulic pressure source in addition to the first hydraulic pressure source in the form of the master cylinder 14, and that the pressure control valve 70 constitutes a fluid flow control device, and the solenoid coil 84 constitutes a device for continuously controlling the pressure difference $\Delta P$, while the spring 86 constitutes a disabling device for disabling the pressure control valve 70.

Figure 12:
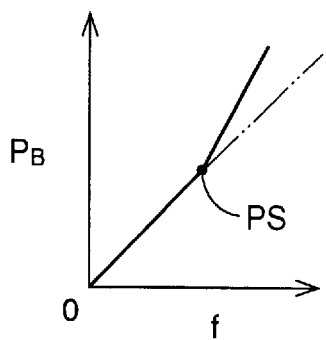
FIG. 12 is a graph for explaining one modification of the braking system of FIG. 1.
Figure 13:
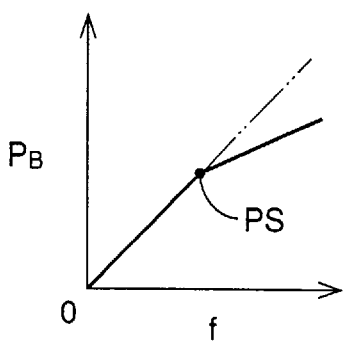
FIG. 13 is a graph for explaining another modification of the braking system of FIG. 1.
Figure 14:
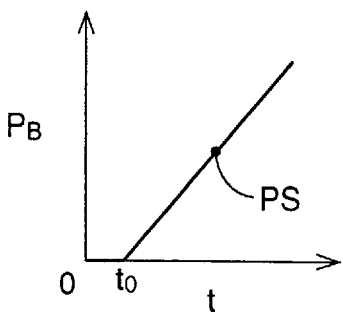
FIG. 14 is a graph for explaining a further modification of the braking system of FIG. 1.
Figure 15:
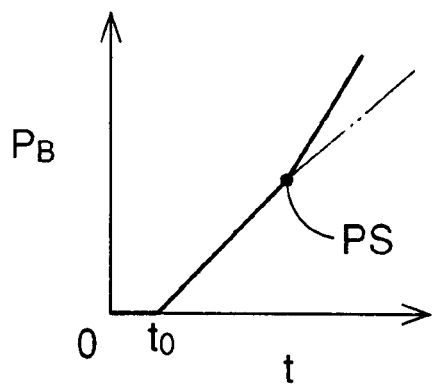
FIG. 15 is a graph for explaining a still further modification of the braking system of FIG. 1.
Figure 16:
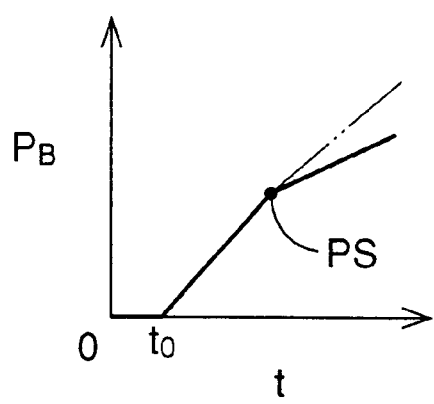
FIG. 16 is a graph for explaining a yet further modification of the braking system of FIG. 1.

The braking system according to the first embodiment may be modified in various manners. For instance, the braking effect characteristic control routine may be formulated such that the braking effect is increased after the pressure increase initiating point PS is reached, as indicated in the graph of FIG. 12, contrary to the constant braking effect as indicated in the graph of FIG. 9(c). Alternatively, the braking effect may be decreased after the pressure increase initiating point PS is reached, as indicated in the graph of FIG. 13, contrary to the increased braking effect indicated in the graph of FIG. 12. Further, the braking effect characteristic control routine may be formulated to control the braking effect in relation to the time t, rather than the brake operating force f (corresponding to the master cylinder pressure $P_M$). In this case, the braking effect characteristic control routine may be formulated such that the braking effect remains unchanged as indicated in the graph of FIG. 14, or is either increased as indicated in the graph of FIG. 15 or reduced as indicated in the graph of FIG. 16, after the pressure increase initiating point PS is reached.

There will next be described a braking system according to a second embodiment of this invention, which is identical with the first embodiment in many aspects. The same reference signs as used in the first embodiment will be used in the second embodiment to the functionally corresponding elements, and only the elements characteristic of the second embodiments will be described in the interest of simplification of the description.

Figure 17:
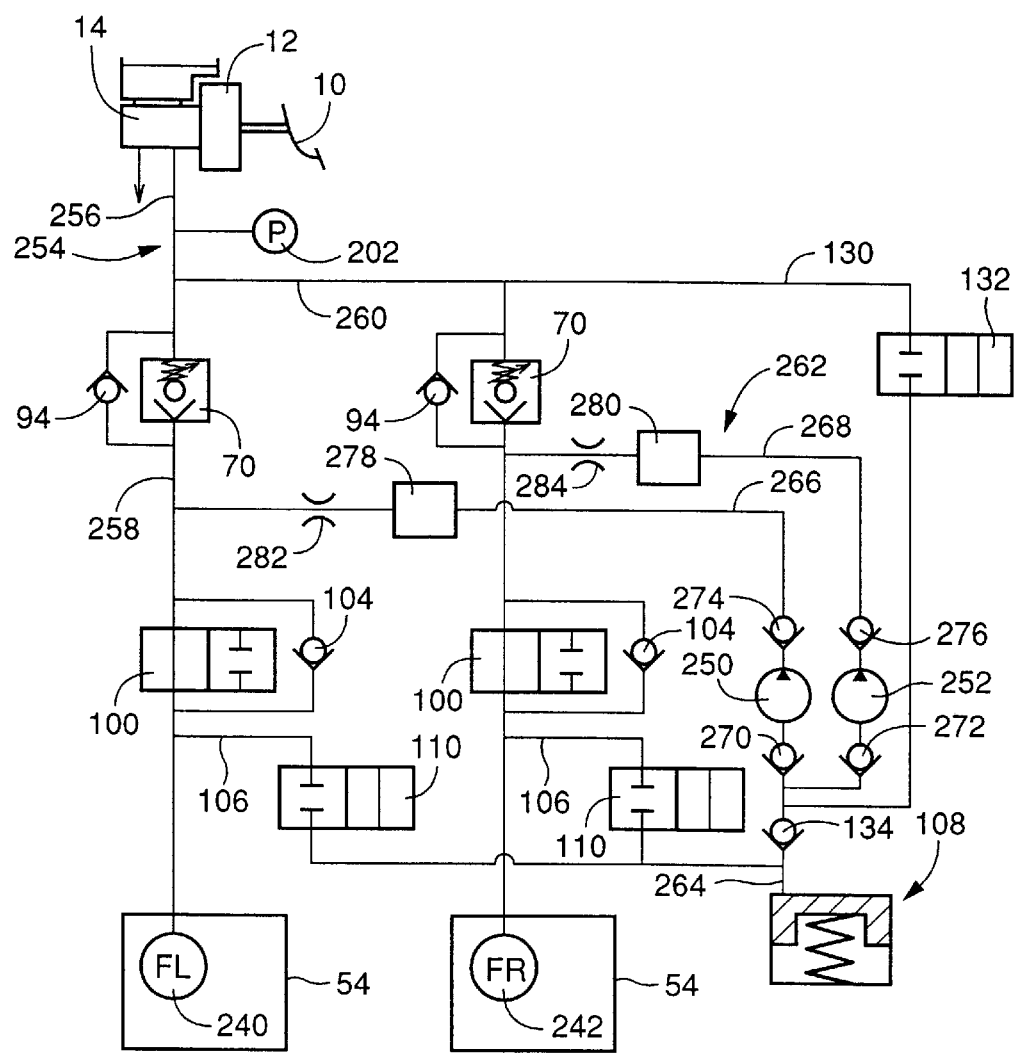
FIG. 17 is a schematic view showing a hardware arrangement of a braking system according to a second embodiment of this invention.

In the first embodiment, the same pump 74 are used for the two wheel brake cylinders 60 in the same sub-system. In the present second embodiment, however, the pressures in two wheel brake cylinders 240, 242 for the respective front left and right wheels FL, FR are increased by respective two pumps 250, 252, as shown in FIG. 17.

One of the two pressurizing chambers of the master cylinder 14 is connected to the two wheel brake cylinders 240, 242 through a main fluid passage 254, which consists of a common passage 256 and two branch passages 258, 260 connected to the common passage 256. In each of the two branch passages 258, 260, there are provided the pressure control valve 70 and the pressure holding valve 100. The branch lines 258, 260 are connected to the respective pressure reducing valves 110 through the reservoir passage 106.

The two branch passages 258, 260 of the main fluid passage 254 are connected to the reservoir 108 through a pump passage 262, which consists of a common passage 264 connected to the reservoir 108 and two branch passages 266, 268 connected to the common passage 264. Each of the two branch passages 266, 268 is connected, at its end remote from the common passage 264, to a portion of the corresponding branch passage 258, 260 of the main fluid passage 254 between the pressure control valve 70 and the pressure holding valve 100. To the common passage 264 of the pump passage 262, there are connected the check valve 134, the fluid supply passage 130 and the reservoir passage 106. To each of the branch passages 266, 268, there are connected the pump 250, 252, a suction valve 270, 272, a delivery valve 274, 276, a damper chamber 278, 280 and an orifice 282, 284.

The sub-system for the rear left and right wheels is identical in construction with the sub-system for the front left and right wheels FL, FR, which has been described above. In the present braking system, therefore, the pressures in the four wheel brake cylinders are increased by the respective four pumps, independently of each other.

It is noted that the two pumps 250, 252 in the front wheel sub-system may be driven by the single pump motor 210, or by respective two pump motors independently of each other. Similarly, the two pumps in the rear wheel sub-system may be driven by the single pump motor 210, or by respective two pump motors. Where the four pumps are driven by respective four pump motors independently of each other, the pressures in the four wheel brake cylinders can be controlled by the respective four pumps independently of each other.

The table of FIG. 18 indicates the operating states of the pressure control valve 70, pressure holding valve 100, pressure reducing valve 110, inflow control valve 132 and pump motor 210, in different control modes of the braking system. The following description by reference to this table relates to only one of the two wheel brake cylinders 240, 242 of the front wheel sub-system, by way of example.

In a normal control mode (without the braking effect characteristic control or anti-lock braking pressure control) for the appropriate wheel brake cylinder 240, 242, the pressure control valve 70, pressure holding valve 100, pressure reducing valve 110, inflow control valve 132 and pump motor 210 are all placed in the OFF states.

In the braking effect characteristic control mode, the pressure in the wheel brake cylinders 240, 242 is increased as needed, by turning ON the pressure control valve 70, inflow control valve 132 and pump motor 210, while turning OFF the pressure holding valve 100 and pressure reducing valve 110. In this case, the fluid received from the master cylinder 14 through the inflow control valve 132 is pressurized by the pump 250, 252, and the pressurized fluid is delivered to the wheel brake cylinder 240, 242 in question. At this time, the electric current I to be applied to the pressure control valve 70 is determined in the same manner as in the first embodiment.

When it is required to hold the pressure in the wheel brake cylinder 240, 242, the pressure control valve 70, pressure holding valve 100, inflow control valve 132 and pump motor 210 are turned ON while the pressure reducing valve 110 is turned OFF. In this case, the fluid delivered from the pump 250, 252 is not permitted to be supplied to the wheel brake cylinder 240, 242, while the fluid in the wheel brake cylinder 240, 242 is not permitted to be discharged to the reservoir 108.

When it is required to reduce the pressure in the wheel brake cylinder 240, 242, the pressure control valve 70, pressure holding valve 100, pressure reducing valve 110, inflow control valve 132 and pump motor 210 are all turned ON, so that the fluid is discharged from the wheel brake cylinder 240, 242 to the reservoir 108, while the fluid delivered from the pump 250, 252 is not permitted to be supplied to the wheel brake cylinder 240, 242.

In the present braking system, too, the pressure control valve 70 is capable of continuously changing the difference between the pressures $P_M$ and $P_B$ of the master cylinder 14 and the wheel brake cylinder 240, 242. Generally, the braking effect characteristic control can be effected by changing the wheel brake cylinder pressure $P_B$ following a change in the master cylinder pressure $P_M$. In other words, the wheel brake cylinder pressure $P_B$ can be suitably controlled by controlling the electric current I to be applied to the solenoid coil 84 of the pressure control valve 70. Accordingly, the braking effect characteristic control requires only the pressure increasing mode, and the pressure holding and reducing modes are not essential, for controlling the wheel brake cylinder pressure $P_B$. Thus, the braking effect characteristic control according to the present second embodiment as shown in FIG. 18 has optional control features, permitting the braking effect characteristic control in a special manner by using the pressure holding and reducing modes.

It is also noted that the braking effect characteristic control according to the present second embodiment is adapted to open the pressure reducing valve 110 when it is required to reduce the wheel brake cylinder pressure $P_B$. Therefore, the wheel brake cylinder pressure $P_B$ can be reduced to a level lower than the master cylinder pressure $P_M$. Where it is sufficient to reduce the wheel brake cylinder pressure $P_B$ to the level of the master cylinder pressure $P_M$, this reduction of the wheel brake cylinder pressure $P_B$ can be achieved by turning OFF the pressure control valve 70, pressure holding valve 100 and pressure reducing valve 110, for opening the pressure control valve 70 and pressure holding valve 100 while closing the pressure reducing valve 100, so that the fluid in the wheel brake cylinder 240, 242 is permitted to be discharged to the master cylinder 14.

A third embodiment of the present invention will be described. This embodiment is identical with the second embodiment in many aspects. The same reference signs as used in the second embodiment will be used in the third embodiment to identify the functionally corresponding elements, and only the elements characteristic of the third embodiments will be described in the interest of simplification of the description.

Figure 19:
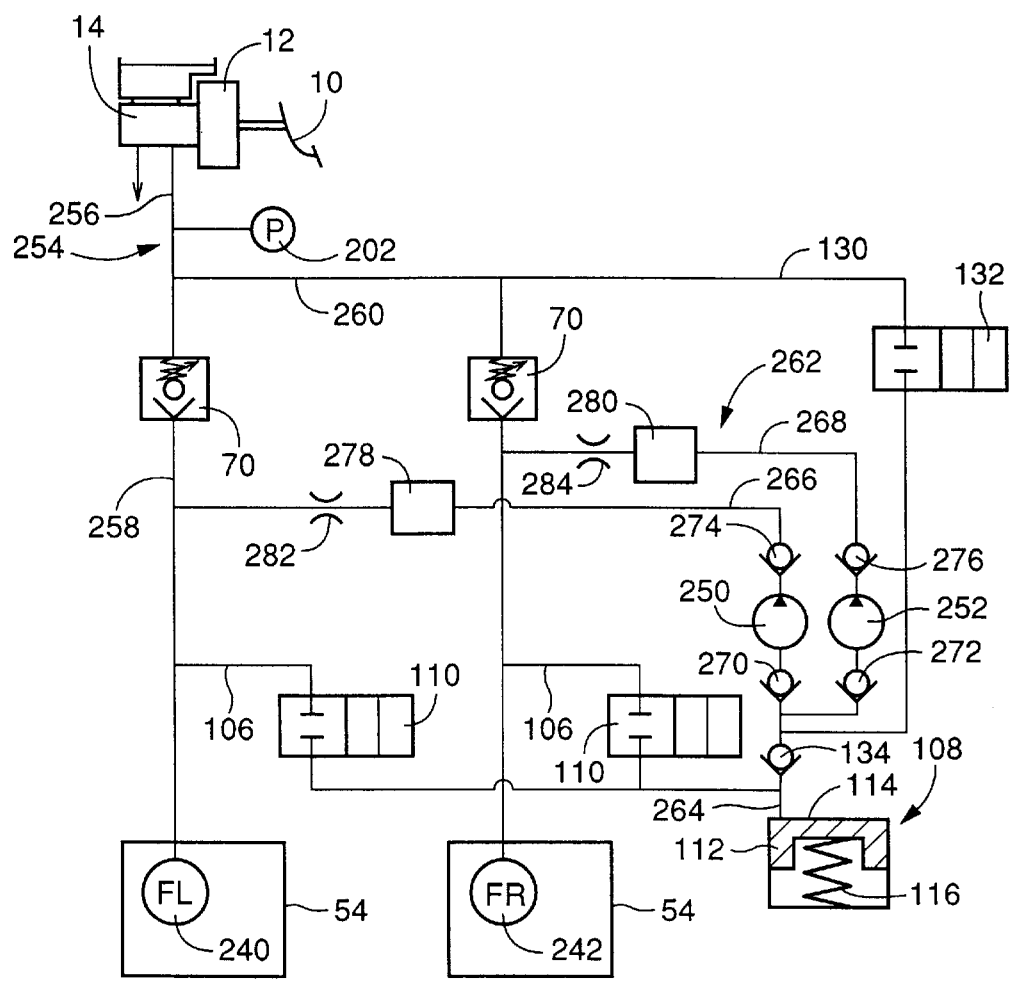
FIG. 19 is a schematic view showing a hardware arrangement of a braking system according to a third embodiment of this invention.

In the second embodiment, the pressure holding valve 100 is provided for each of the wheel brake cylinders 240, 242 of each sub-system, for holding the pressures $P_B$ in the two wheel brake cylinders 240, 242 independently of each other. However, the present third embodiment is adapted to hold the pressures $P_B$ in the two wheel brake cylinders 240, 242 independently of each other, without using the pressure holding valves 100. That is, the sub-system for the front wheels FL, FR does not use the pressure holding valves 100 (provided in the second embodiment of FIG. 17), as shown in FIG. 19. Further, the sub-system of FIG. 19 does not include the by-pass valves 94 which by-pass the pressure control valves 70. If the by-pass valves 94 were provided in the absence of the pressure holding valves 100, the fluid would flow from the master cylinder 14 toward the wheel brake cylinders 240, 242, in the anti-lock braking pressure control mode, causing inadequate reduction of the wheel brake cylinder pressures $P_B$.

Referring to FIG. 20, there are shown the operating states of the pressure control valve 70, pressure reducing valve 110, inflow control valve 132 and pump motor 210 in the normal control mode, anti-lock braking pressure control mode and braking effect characteristic control mode. The operations in these control modes will be explained by reference to FIG. 20, with respect to one of the wheel brake cylinders 240, 242 in the sub-system for the front wheels FL, FR, by way of example.

In the normal control mode, the pressure control valve 70, pressure reducing valve 110, inflow control valve 132 and pump motor 210 are all placed in the OFF states.

In the anti-lock braking pressure control mode, the pressure control valve 70, pressure reducing valve 110 and inflow control valve 132 are turned OFF while the pump motor 210 is turned ON, when it is required to increase the pressure in the wheel brake cylinder 240, 242. In this case, the fluid is pumped up by the pump 250, 252 from the reservoir 108, and is returned to the branch passage 266, 268. When it is required to hold the pressure in the wheel brake cylinder 240, 242, the pressure control valve 70 is turned ON while the pressure reducing valve 110, inflow control valve 132 and pump motor 210 are turned OFF, so that the fluid is neither pumped up by the pump 250, 252 from the reservoir 108, nor delivered from the pump 250, 252 to the master cylinder 14. Therefore, the pressure in the wheel brake cylinder 240, 242 can be held at the present level, even in the absence of the pressure holding valve 100. Thus, the pressure control valve 70 and the delivery valve 274, 276 cooperate to function as the pressure holding valve. When it is required to reduce the pressure in the wheel brake cylinder 240, 242, the pressure control valve 70 and pressure reducing valve 110 are turned ON while the inflow control valve is turned OFF, with the pump motor 210 being either ON or OFF, so that the fluid is discharged from the wheel brake cylinder 240, 242 to the reservoir 108, while the wheel brake cylinder 240, 242 is disconnected from the master cylinder 14.

In the braking effect characteristic control mode, the pressure control valve 70, inflow control valve 132 and pump motor 210 are turned ON while the pressure reducing valve is turned OFF, when it is required to increase the pressure in the wheel brake cylinder 240, 242. In this case, the fluid received from the master cylinder 14 is pressurized by the pump 250, 252, and delivered to the wheel brake cylinder 240, 242. When it is required to hold the pressure in the wheel brake cylinder 240, 242, the pressure control valve 70 is turned ON while the pressure reducing valve 110, inflow control valve 132 and pump motor 210 are turned OFF, so that the fluid is neither delivered from the pump 250, 252 to the master cylinder 14, nor pumped up by the pump 250, 252 from the master cylinder 14. Thus, the pressure in the wheel brake cylinder 240, 242 can be held even in the absence of the pressure holding valve 100. When it is required to reduce the pressure in the wheel brake cylinder 240, 242, the pressure control valve 70 is turned ON while the pressure reducing valve 110 and inflow control valve 132 are turned OFF, with the pump motor 210 being either ON or OFF, so that the inflow control valve 132 prevents the pump 250, 252 from receiving the fluid from the master cylinder 14, while the pressure control valve 70 permits the fluid to be discharged from the wheel brake cylinder 240, 242 to the master cylinder 14, under the control of the electric current I to be applied to the pressure control valve 70.

Figure 21:
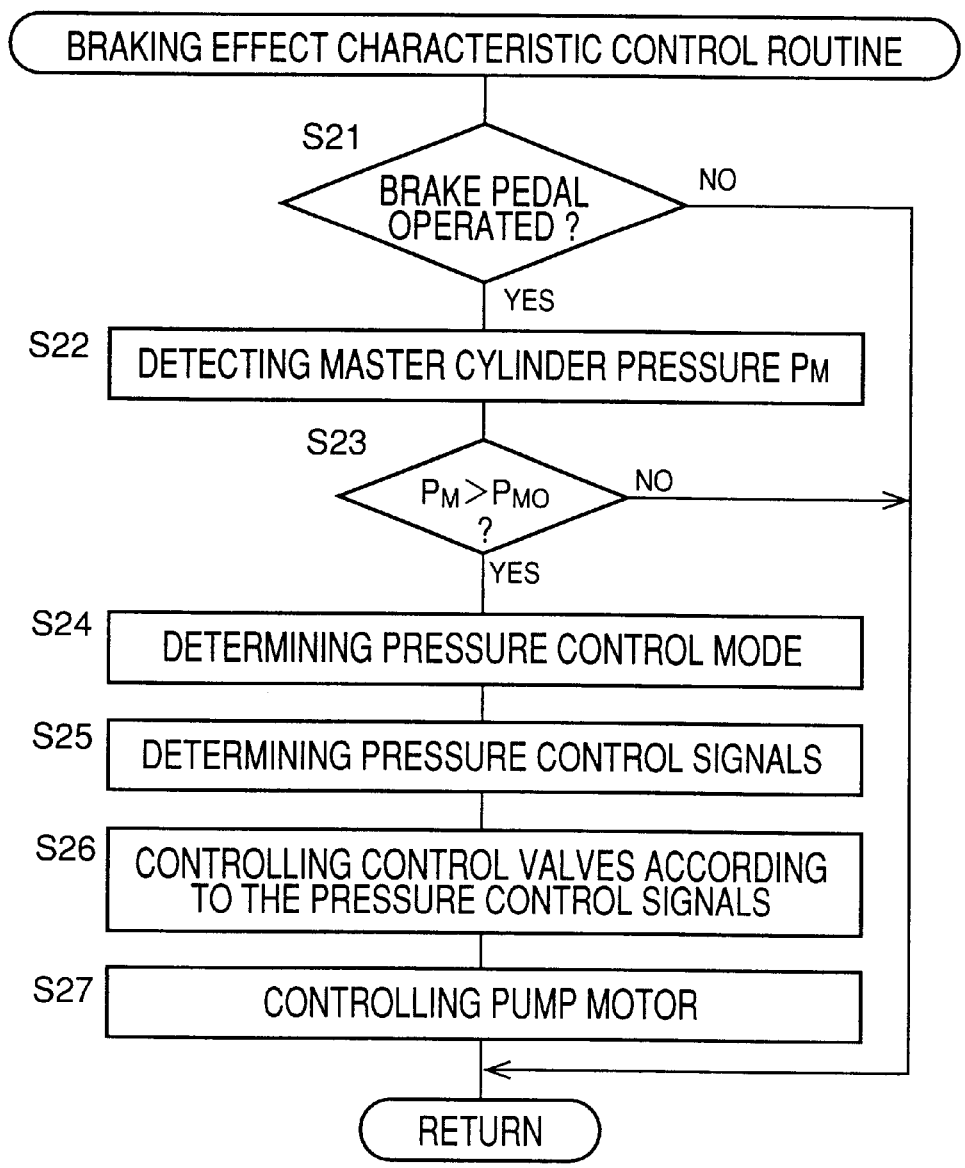
FIG. 21 is a flow chart illustrating a braking effect characteristic control routine in the braking system of FIG. 19.

The braking effect characteristic control routine in the present third embodiment is illustrated in the flow chart of FIG. 21. This routine is also repeatedly executed. Each cycle of execution of the routine is initiated with step S21 to determine whether the brake pedal 10 has been depressed. This determination may be made on the basis of the output signal of the master cylinder pressure sensor 202 or the output signal of a brake switch which is provided to detect an operation of the brake pedal 10. If a negative decision (NO) is obtained in step S21, one cycle of execution of the routine of FIG. 21 is terminated. If an affirmative decision (YES) is obtained in step S21, the control flow goes to step S22 to detect the master cylinder pressure $P_M$ on the basis of the output signal of the master cylinder pressure sensor 202.

Step S22 is followed by step S23 to determine whether the detected master cylinder pressure $P_M$ is higher than the reference value $P_{M0}$ indicated above. If a negative decision (NO) is obtained in step S23, one cycle of execution of the routine is terminated. If an affirmative decision (YES) is obtained in step S23, the control flow goes to step S24 to determine the pressure control mode, namely, to select one of the pressure increasing, holding and reducing modes. This determination is effected on the basis of the detected master cylinder pressure $P_M$ and a target wheel brake cylinder pressure $P_B*$ which corresponds to the detected master cylinder pressure $P_M$, so that the actual wheel brake cylinder pressure $P_B$ approaches the target value $P_B*$. The target wheel brake cylinder pressure $P_B*$ is determined so as to provide the braking effect (f–$P_B$ relationship) as indicated in the graph of FIG. 9(c).

Then, step S25 is implemented to determine the pressure control signals for suitably turning ON or OFF the pressure control valve 70, pressure reducing and inflow control valves 110, 132 and pump motor 210, depending upon the determined pressure control mode, as indicated in FIG. 20. Step S25 is followed by step S26 in which the determined control signals are applied to the solenoid coils 212 of the valves 70, 110 and 132. Then, step S27 is implemented to control the pump motor 210 depending upon the determined pressure control mode. Thus, one cycle of execution of the routine is terminated.

Figure 22:
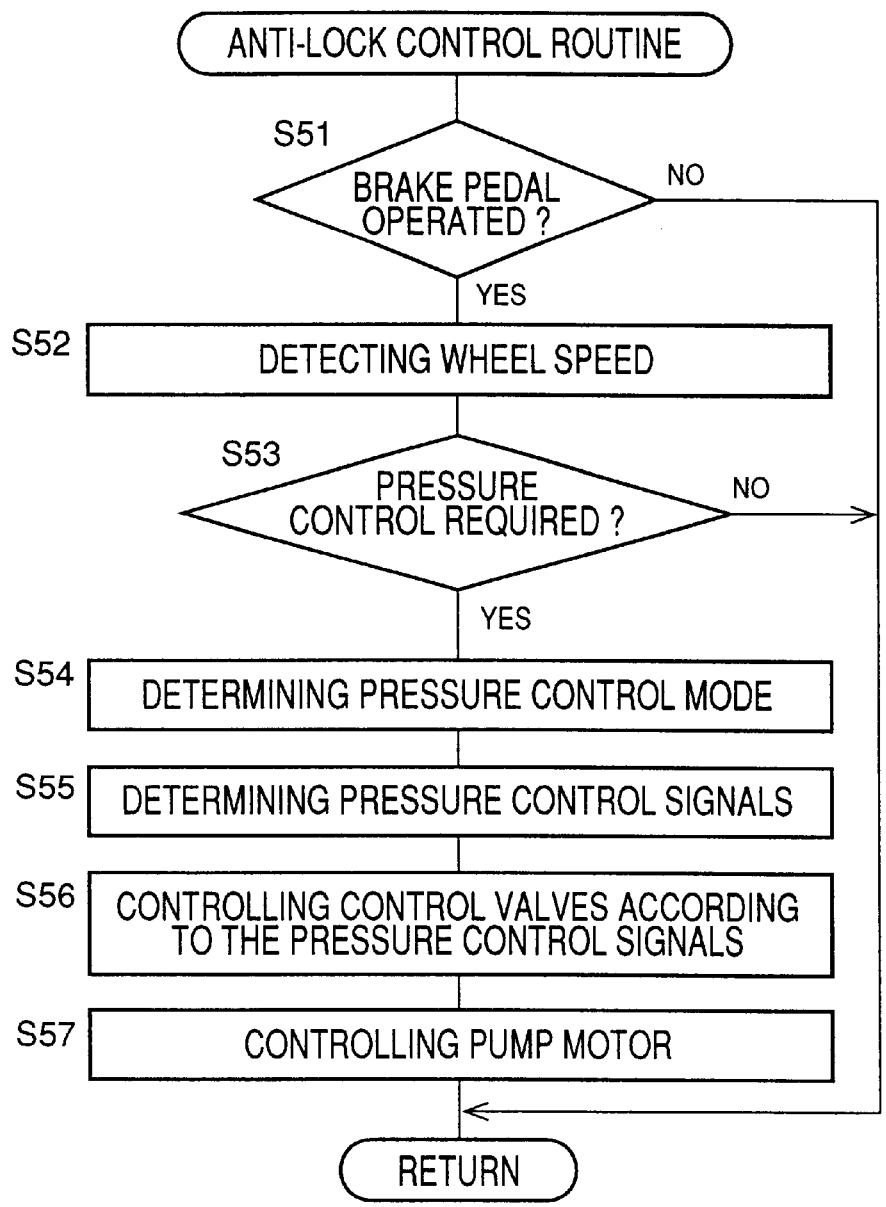
FIG. 22 is a flow chart illustrating an anti-lock braking pressure control routine in the braking system of FIG. 19.

The anti-lock braking pressure control routine in the third embodiment is illustrated in the flow chart of FIG. 22. This routine is also repeatedly implemented. Each cycle of execution of this routine is initiated with step S51 to determine whether the brake pedal 10 has been depressed. This determination may be effected in the same manner as described above with respect to step S21. If a negative decision (NO) is obtained in step S51, one cycle of execution of the routine is terminated. If an affirmative decision (YES) is obtained in step S51, the control flow goes to step S52 to detect the rotating speed of the wheel in question on the basis of the output signal of the corresponding wheel speed sensor 204. Then, step S53 is implemented to determine whether the anti-lock braking pressure control operation should be initiated, namely, whether the wheel has an excessive amount of slip on the road surface. This determination is based on the detected wheel speed. If a negative decision (NO) is obtained in step S53, one cycle of execution of the routine is terminated. If an affirmative decision (YES) is obtained in step S53, the control flow goes to step S54.

In step S54, the appropriate pressure control mode (one of the pressure increasing, holding and reducing modes) is determined or selected, on the basis of the detected wheel speed and a deceleration value of the wheel which may be a time derivative of the detected wheel speed, so that the corresponding wheel brake cylinder pressure $P_B$ is controlled so as to maintain the slip ratio of the wheel within a predetermined optimum range. Then, the control flow goes to step S55 to determine the pressure control signals for suitably turning ON or OFF the valves 70, 110, 132 and pump motor 210, depending upon the determined pressure control mode, as indicated in FIG. 20. Step S55 is followed by step S56 in which the determined control signals are applied to the solenoid coils 212 of the valves 70, 110 and 132. Then, step S57 is implemented to control the pump motor 210 depending upon the determined pressure control mode. Thus, one cycle of execution of the routine is terminated.

It is noted that the number of the solenoid-operated valves used in the present third embodiment is smaller by four than that in the second embodiment, owing to the elimination of the two pressure holding valves 100 from each of the front and rear sub-systems. Accordingly, the braking system according to this embodiment is simplified in construction and is available at an accordingly reduced cost.

It will be understood from the foregoing description of the third embodiment that the pumps 250, 252, pressure control valves 70, pressure reducing valves 110 and inflow control valves 132 cooperate to constitute an electrically operated pressure control device, while a portion of the electronic control unit 200 assigned to implement steps S25–S27 of FIG. 21 constitutes pseudo pressure holding means.

There will next be described a fourth embodiment of this invention, which is identical in the hardware arrangement with the third embodiment. Only the software arrangement of this fourth embodiment will be described, in particular, in connection with the operating states of the valves 70, 110, 132 and pump motor 210 in the anti-lock braking pressure control mode and the braking effect characteristic control mode.

FIG. 23 shows the operating states of the pressure control valve 70, pressure reducing valve 110, inflow control valve 132 and pump motor 210 in the normal control mode, anti-lock braking pressure control mode and braking effect characteristic control mode. The operations in these control modes will be explained by reference to FIG. 23, with respect to one of the wheel brake cylinders 240, 242 in the sub-system for the front wheels FL, FR, by way of example.

The present fourth embodiment is different from the third embodiment, only with respect to the operating states in the pressure holding modes in the anti-lock braking pressure control mode and braking effect characteristic control mode. These pressure holding modes will be described.

In the pressure holding mode in the anti-lock braking pressure control mode, the pressure control valve 70, pressure reducing valve 110 and pump motor 210 are turned ON while the inflow control valve 132 is turned OFF, so that the fluid pumped up by the pump 250, 252 from the reservoir 108 is delivered toward the wheel brake cylinder 240, 242, but the delivered fluid is returned to the reservoir 108 through the pressure reducing valve 110 which is open. As a result, the pressure in the wheel brake cylinder 240, 242 is maintained.

In the pressure holding mode in the braking effect characteristic control mode, the pressure control valve 70, pressure reducing valve 110 and pump motor 210 are turned ON while the inflow control valve 132 is turned either ON or OFF. When the inflow control valve 132 is turned ON, the fluid is pumped up by the pump 250, 252 from the master cylinder 14, but the increase in the pressure of the wheel brake cylinder 240, 242 is restrained since the pressure reducing valve 110 is open. When the inflow control valve 132 is turned OFF, the pump 250, 252 does not receive the fluid from the master cylinder 14, and the fluid discharged from the wheel brake cylinder 240, 242 into the reservoir 108 is returned by the pump 250, 252 back to the wheel brake cylinder 240, 242, so that the fluid pressure in the wheel brake cylinder 240, 242 is maintained.

While the third embodiment requires the pump 250, 252 to be turned OFF to hold the pressure in the wheel brake cylinder 240, 242, the present fourth embodiment does not require the pump 250, 252 to be turned OFF to hold the wheel brake cylinder pressure. Accordingly, the fourth embodiment is effective to prevent frequent ON and OFF operations of the pump 250, 252 in the anti-lock braking pressure control mode and the braking effect characteristic control mode.

Then, a fifth embodiment of this invention will be described. This fifth embodiment is identical with the first embodiment in many aspects. The same reference signs as used in the first embodiment will be used in the fifth embodiment to identify the corresponding element. Only the elements characteristic of the fifth embodiment will be described.

Figure 24:
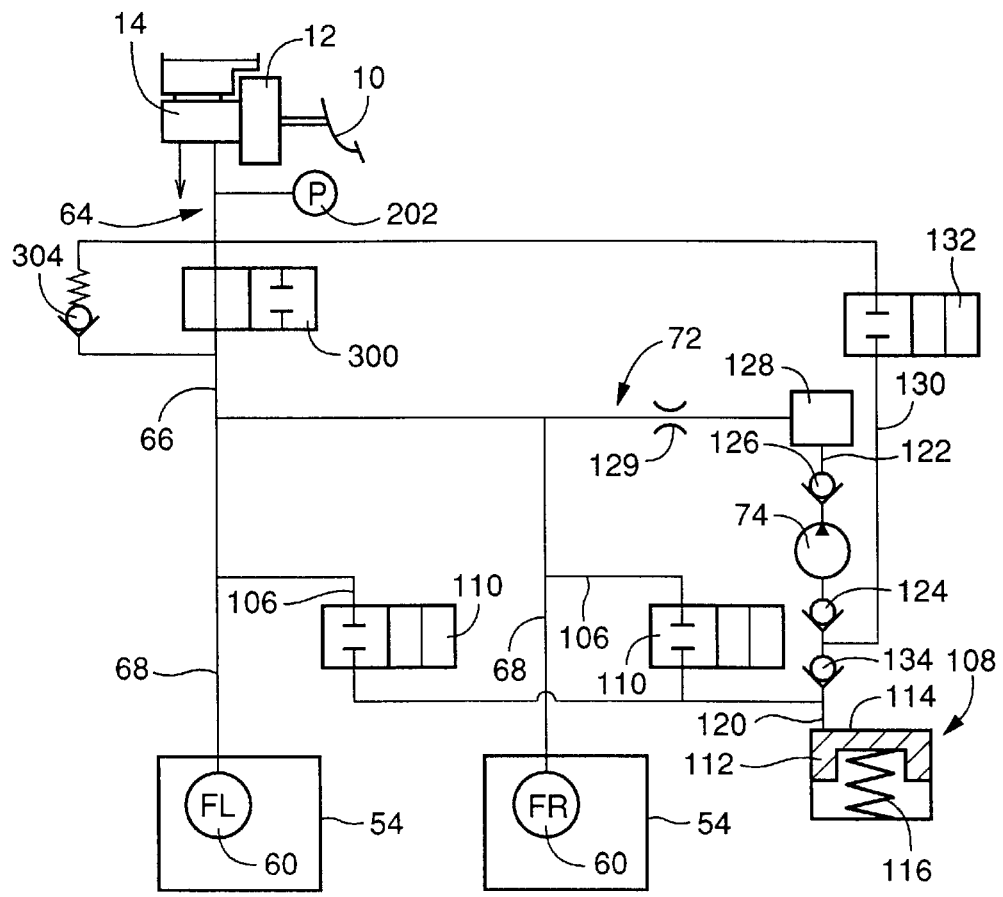
FIG. 24 is a schematic view showing a hardware arrangement of a braking system according to a fifth embodiment of the invention.
Figure 25:
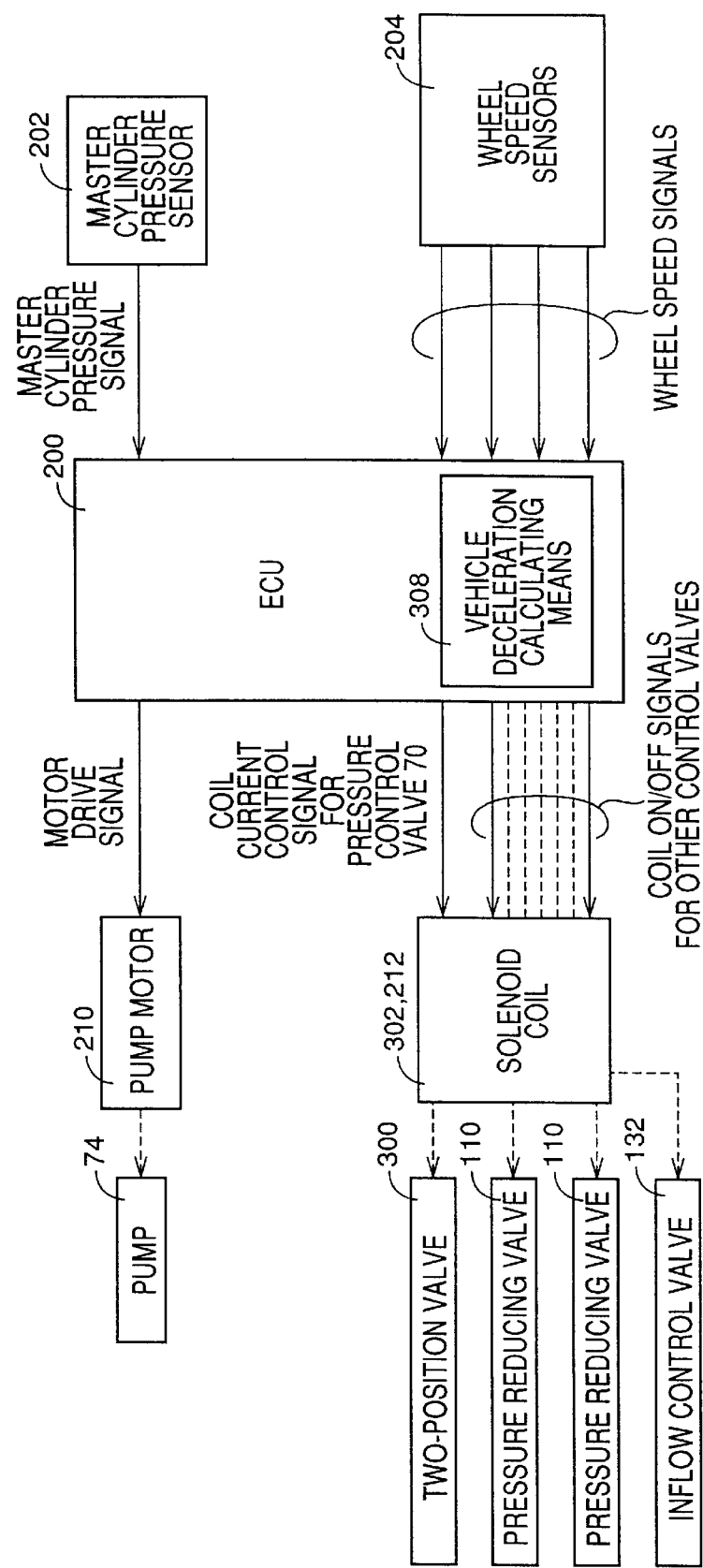
FIG. 25 is a block diagram showing a software arrangement of the braking system of FIG. 24.

As shown in FIGS. 24 and 25, the pressure control valve 70 used in the first embodiment is replaced by a normally open two-position valve 300 which has a solenoid coil 302 (FIG. 25). The two-position valve 300 is open in a de-energized state of the solenoid coil 302, and closed in an energized state of the solenoid coil 302. A pressure relief valve 304 is provided so as to by-pass the two-position valve 300, for preventing an excessive rise of the delivery pressure of the pump 74. As in the third and fourth embodiments, the pressure holding valve 100 and the by-pass valve 90 are not provided in the present fifth embodiment.

As shown in FIG. 25, the electronic control unit 200 incorporates vehicle deceleration calculating means 308 for calculating the deceleration value G of the vehicle body on the basis of the wheel speed sensors 204. Described more specifically, the vehicle deceleration calculating means 308 first estimates the vehicle running speed based on a fact that the highest one of the rotating speeds of the four wheels is closest to the actual running speed of the vehicle. Then, the vehicle deceleration calculating means 308 obtains a time derivative of the estimated vehicle running speed, as the deceleration value G of the vehicle body.

While the present fifth embodiment is similar to the third and fourth embodiments in that the pressure holding valve 100 is not provided, the fifth embodiment is different from the third and fourth embodiments in that only one pressure control valve 300 is provided for the two wheel brake cylinders 60 in the fifth embodiment while the two pressure control valves 70 and the pumps 250, 252 are provided for each of the wheel brake cylinders 240, 242 in the third and fourth embodiments. That is, the fifth embodiment is not capable of controlling the pressures in the two wheel brake cylinders 60 independently of each other. However, the fifth embodiment is similar to the fourth embodiment in that the pressures $P_B$ in the two wheel brake cylinders 60 can be held independently of each other, without using the pressure holding valve 100, by utilizing the pressure reducing valves 110 which can be controlled independently of each other for reducing the pressures $P_B$ in the two wheel brake cylinders 60.

Figure 26:
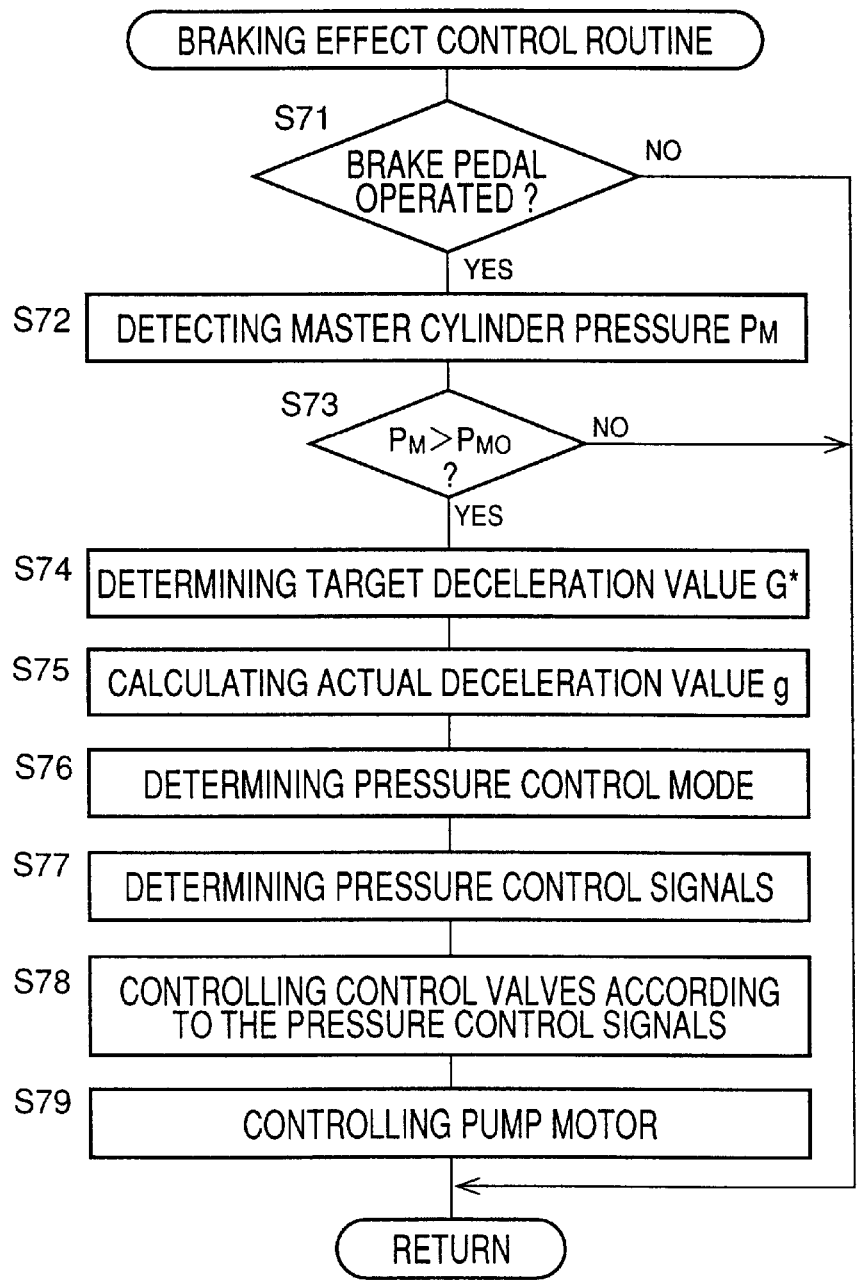
FIG. 26 is a flow chart illustrating a braking effect characteristic control routine in the braking system of FIG. 24.

The braking effect characteristic control routine according to the fifth embodiment is illustrated in the flow chart of FIG. 26. Some of the steps of this routine are similar to those of the routine of FIG. 21. Only the steps characteristic of the routine of FIG. 26 will be described in detail.

The routine of FIG. 26 is initiated with step S71 to determine whether the brake pedal 10 has been depressed. If an affirmative decision (YES) is obtained in step S71, the control flow goes to step S72 to detect the master cylinder pressure $P_M$ on the basis of the output signal of the master cylinder pressure sensor 202. Then, step S73 is implemented to determine whether the detected master cylinder pressure $P_M$ is higher than the reference value $P_{M0}$. If an affirmative decision (YES) is obtained in step S73, the control flow goes to step S74 to determine a target vehicle deceleration value G* corresponding to the detected master cylinder pressure $P_M$. The target value G* of the vehicle deceleration G is determined so as to achieve the braking effect characteristic as represented by the graph of FIG. 9(c). Then, the control flow goes to step S75 in which the vehicle deceleration calculating means 308 calculates the actual vehicle deceleration value G. Step S75 is followed by step S76 to determine the pressure control mode (select one of the pressure increasing, holding and reducing modes), on the basis of the determined target deceleration value G* and the calculated actual deceleration value G, so that the actual deceleration value G approaches the target value G*.

Then, the control flow goes to step S77 to determine the pressure control signals for turning ON or OFF the two-position valve 300, pressure reducing valve 110, inflow control valve 132 and pump motor 210, depending upon the determined pressure control mode, as indicated in FIG. 27. Since the operating states indicated in FIG. 27 are the same as those in FIG. 23, no detailed explanation of these operating states is deemed necessary. The control flow then goes to step S78 to apply the determined pressure control signals to the solenoid coils of the valves 300, 110, 132, and step S79 to control the pump motor 210 depending upon the determined pressure control mode. Thus, one cycle of execution of the routine of FIG. 26 is terminated.

Figure 28:
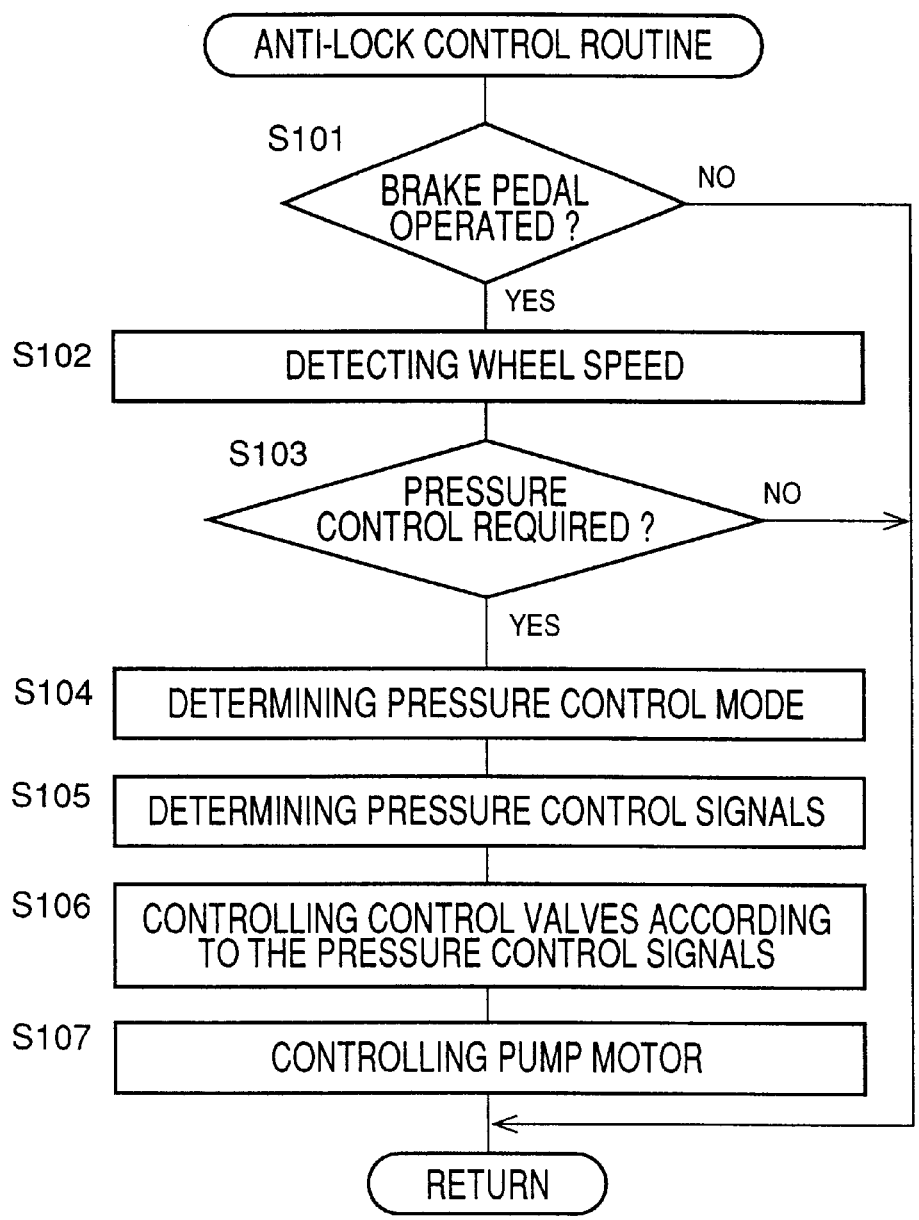
FIG. 28 is a flow chart illustrating an anti-lock braking pressure control routine in the braking system of FIG. 24.

The anti-lock braking pressure control routine is illustrated in the flow chart of FIG. 28. This routine is similar to that of FIG. 22, and no redundant description thereof is deemed necessary.

It will be understood from the foregoing description of the fifth embodiment that the pump 74, two-position valve 300, pressure reducing valve 110 and inflow control valve 132 constitute an electrically controlled pressure control device, while a portion of the electronic control unit 200 assigned to implement steps S105–S107 constitutes pseudo pressure holding means.

When the braking effect characteristic control is terminated, it is desirable not to suddenly switch the two-position valve 300 from the closed state to the open state, but to slowly open the valve 300 by gradually changing the duty ratio of the solenoid coil 302, in order to prevent an abrupt change of the operating feel of the brake pedal 10 as given to the vehicle operator.

Figure 29:
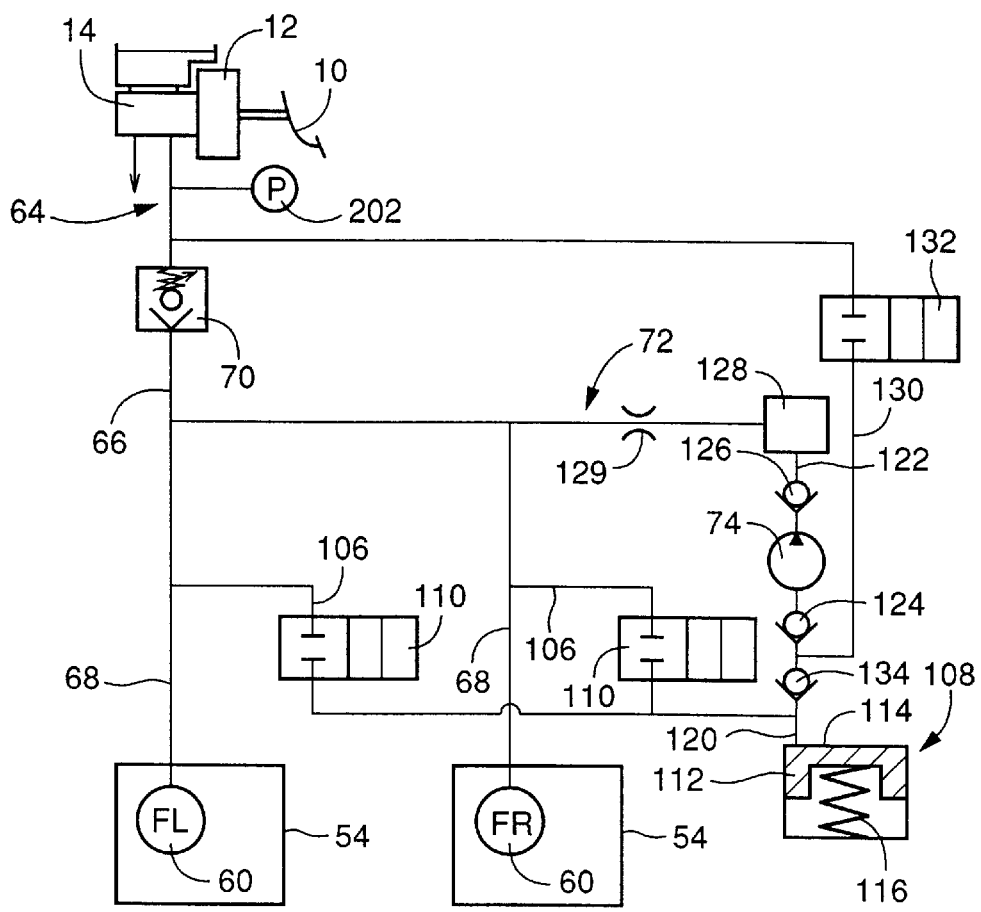
FIG. 29 is a schematic view showing a hardware arrangement of a braking system according to a sixth embodiment of this invention.

A sixth embodiment of this invention will be described next, by reference to FIG. 29.

The hardware arrangement of this sixth embodiment is different from the fifth embodiment in that the two-position valve 300 used in the fifth embodiment is replaced by the pressure control valve 70, and the pressure relief valve 304 is not provided, in the sixth embodiment. In the other aspects, the sixth embodiment is identical with the fifth embodiment. The software arrangement of the sixth embodiment is identical with that of the fifth embodiment.

There will next be described a seventh embodiment of this invention.

Figure 30:
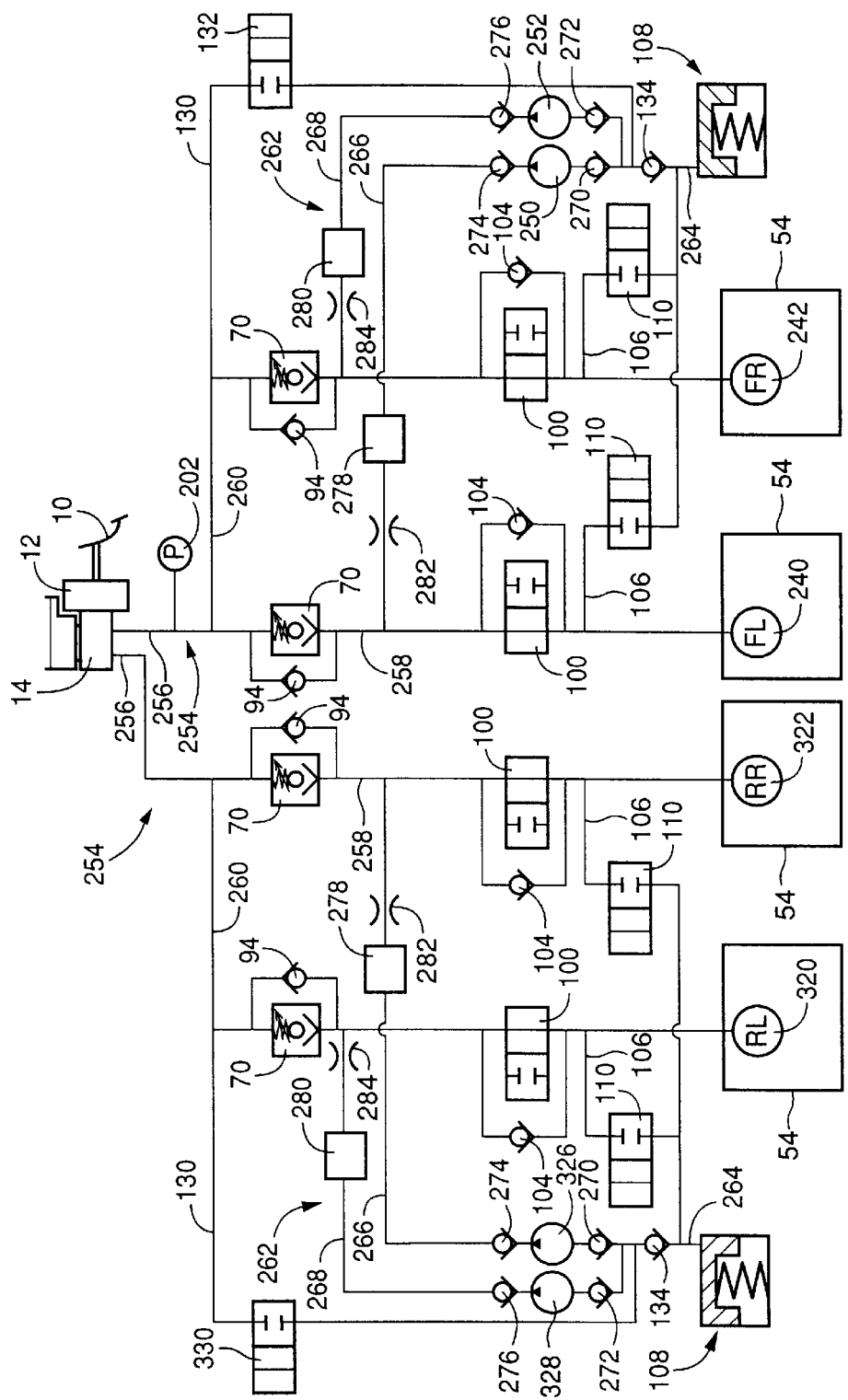
FIG. 30 is a schematic view showing a hardware arrangement of a braking system according to a seventh embodiment of this invention.

The braking system according to the seventh embodiment is shown in FIG. 30. This seventh embodiment is identical in hardware arrangement with the second embodiment of FIG. 17. However, the schematic view of FIG. 30 shows not only the sub-system including the front wheel brake cylinders 240, 242, but also the sub-system including rear wheel brake cylinders 320, 322 for respective rear left and right wheels RL, RR.

It is noted that the volume of the fluid required to activate each front wheel brake cylinder 240, 242 is generally larger than that required to activate each rear wheel brake cylinder 320, 322. If the delivery amount of the pumps 250, 252 for the front wheel brake cylinders 240, 242 is equal to that of pumps 326, 328 for the rear wheel brake cylinders 320, 322, the rate at which the pressure in each front wheel brake cylinder 240, 242 is increased is undesirably lower than the rate at which the pressure in each rear wheel brake cylinder 320, 322 is increased.

In the light of the above fact, the present seventh embodiment is adapted such that the duty ratio of the inflow control valve 132 in the front sub-system is higher than that of the inflow control valve 330 in the rear sub-system, for minimizing a difference between the rate of increase of the pressures of the front wheel brake cylinders 240, 242 and that of the rear wheel brake cylinders 320, 322, even with the different volumetric capacities of the front and rear wheel brake cylinders.

Figure 31:
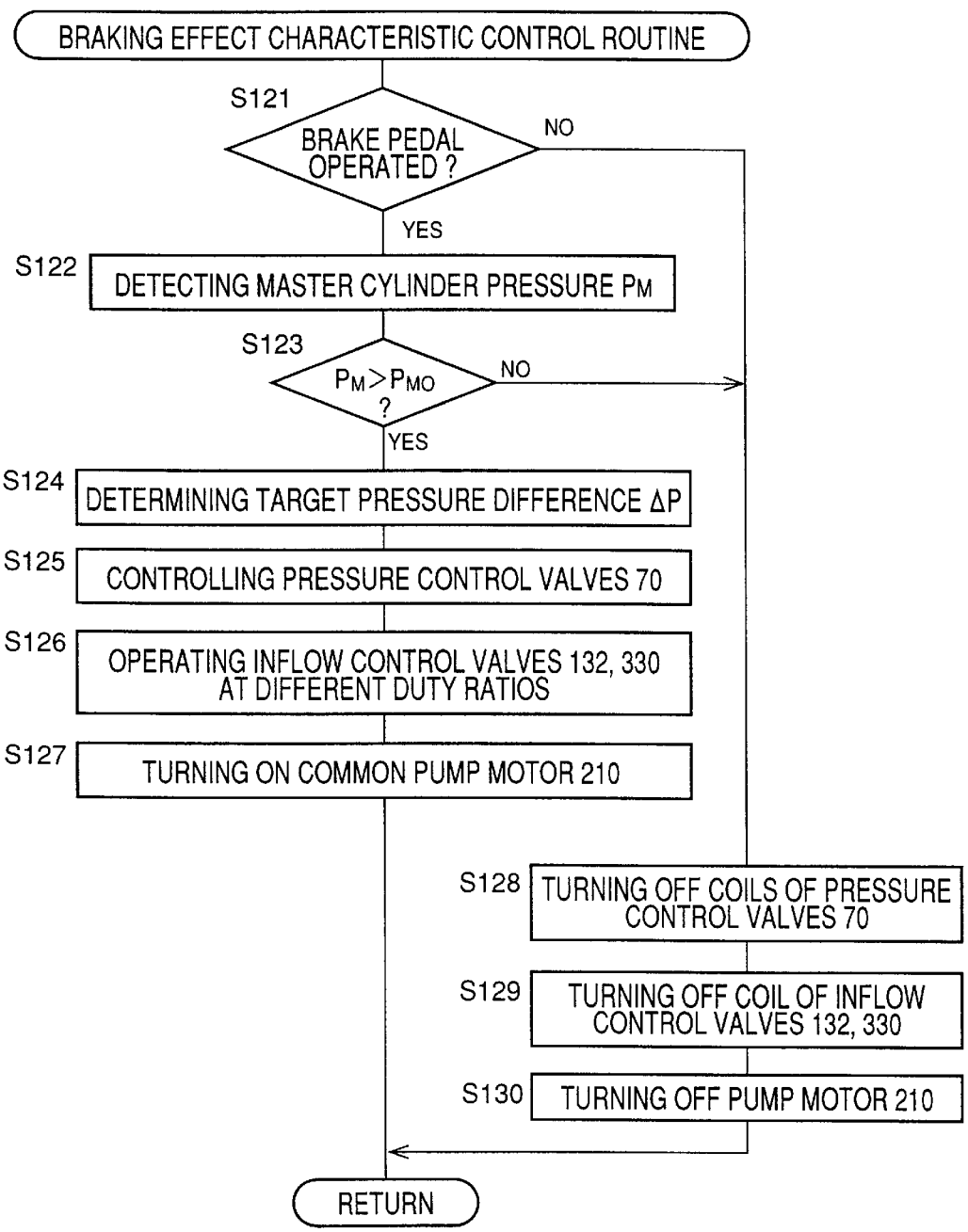
FIG. 31 is a flow chart illustrating a braking effect characteristic control routine in the braking system of FIG. 30.

The braking effect characteristic control routine according to the seventh embodiment is illustrated in the flow chart of FIG. 31.

The routine of FIG. 31 is initiated with step S121 to determine whether the brake pedal 10 has been depressed. If an affirmative decision (YES) is obtained in step S121, the control flow goes to step S122 to detect the master cylinder pressure $P_M$ on the basis of the output signal of the master cylinder pressure sensor 202. Step S122 is followed by step S123 to determine whether the detected master cylinder pressure $P_M$ is higher than the reference value $P_{M0}$. If an affirmative decision (YES) is obtained in step S123, the control flow goes to step S124 to determine the target pressure difference ΔP on the basis of the detected master cylinder pressure $P_M$. Then, step S125 is implemented to control the pressure control valve 70, so as to establish the determined target pressure difference ΔP. Step S125 is followed by step S126 in which the inflow control valve 132 for the front wheel brake cylinders 240, 242 and the inflow control valve 330 for the rear wheel brake cylinders 320, 322 are operated at respective predetermined different duty ratios, so that the inflow control valve 132 is held open for a longer period of time than the inflow control valve 330, whereby the amount of the fluid received by the pumps 250, 252 from the master cylinder 14 through the inflow control valve 132 is made larger than that received by the pumps 326, 328 through the inflow control valve 330. Then, step S127 is implemented to turn ON the pump motor 210, which is used commonly for the front and rear sub-systems to drive the four pumps 250, 252, 326, 328. Thus, one cycle of execution of the routine of FIG. 31 is terminated.

If a negative decision (NO) is obtained in step S121 or step S123, the control flow goes to step S128 to turn off the solenoid coils 84 of the pressure control valves 70. Step S128 is followed by step S129 to turn off the solenoid coils 212 of the inflow control valves 132, 330. Then, step S130 is implemented to turn OFF the pump motor 210. Thus, one cycle of execution of the routine of FIG. 31 is terminated.

It will be understood that a portion of the electronic control unit 200 assigned to implement step S126 of FIG. 31 constitutes pressure increasing rate control means.

The present seventh embodiment is adapted to permit the pressures in the front wheel brake cylinders 240, 242 and the pressures in the rear wheel brake cylinders 320, 322 to be increased at substantially the same rate, by controlling the amounts of the fluid received by the pumps 250, 252, 326, 328 such that the amounts of the fluid received by the pumps 250, 252 for the front sub-system are larger than those received by the pumps 326, 328 for the rear sub-system. However, this arrangement may be modified. For instance, the inflow control valves 132, 330 are replaced by respective two flow control valves whose rates of flow of the fluid change linearly with the electric current applied to their solenoid coils. In this case, the amounts of the electric currents applied to these flow control valves are controlled such that a ratio of the fluid flow rate of the flow control valve for the front wheel brake cylinders 240, 242 to that of the flow control valve for the rear wheel brake cylinders 320, 322 corresponds to a ratio of the fluid volume required to activate the front wheel brake cylinders to that required to activate the rear wheel brake cylinders.

Further, the pressure increasing rate of the front wheel brake cylinders 240, 242 can be made equal to that of the rear wheel brake cylinders 320, 322, by arranging the pressure control valves 70 such that the amounts of the fluid which are delivered from the pumps 250, 252 and which leak into the master cylinder 14 through the pressure control valves 70 for the front sub-system are made smaller than the amounts of the fluid which are delivered from the pumps 326, 328 and which leak into the master cylinder 14 through the pressure control valves 70 for the rear sub-system.

Described more specifically, the rates of leakage flow of the fluid through the pressure control valves 70 are determined such that a ratio of the leakage flow rate of each pressure control valve 70 for the front sub-system to that of each pressure control valve 70 for the rear sub-system corresponds to a reciprocal of a ratio of the fluid amount of each front wheel brake cylinder 240, 242 to that of each rear wheel brake cylinder 320, 322.

Alternatively, each pressure control valve 70 is replaced by a two-position valve having an open position and a closed position which are selectively established by turning on and off a solenoid coil, and the duty ratios of these four two-position valves are controlled such that a ratio of the duty ratio of each two-position valve for the front sub-system to that for the rear sub-system corresponds to a reciprocal of the ratio of the fluid volumes of the front and rear wheel brake cylinders.

Further, the pressure increasing rates of the front and rear wheel brake cylinders 240, 242, 320, 322 can be made substantially equal to each other by determining the delivery amounts of the pumps 250, 252, 326, 328 (when the inflow control valves 132, 330 are fully open) such that the delivery amount of the pumps 250, 252 is different from that of the pumps 326, 328.

Described more specifically, piston type pumps are used as the pumps 250, 252, 326, 328, and the operating strokes or cross sectional areas of the pumps are determined such that a ratio of the operating stroke or cross sectional area of the pumps 250, 252 to that of the pumps 326, 328 corresponds to the ratio of the fluid volumes of the front and rear wheel brake cylinders.

Alternatively, the front and rear wheel brake cylinder pressures can be increased at substantially the same rate, by using two pump motors 210 one for driving the pumps 250, 252 for the front sub-system and the other for driving the pumps 326, 328 for the rear sub-system, and operating these two pump motors at different speeds whose ratio corresponds to the ratio of the fluid volumes of the front and rear wheel brake cylinders. In this respect, the operating speeds of the pump motors 210 can be controlled by controlling the amplitude of the motor drive signal (voltage value) or the PWM duty ratio of the motors.

Then, an eighth embodiment of this invention will be described.

Figure 32:
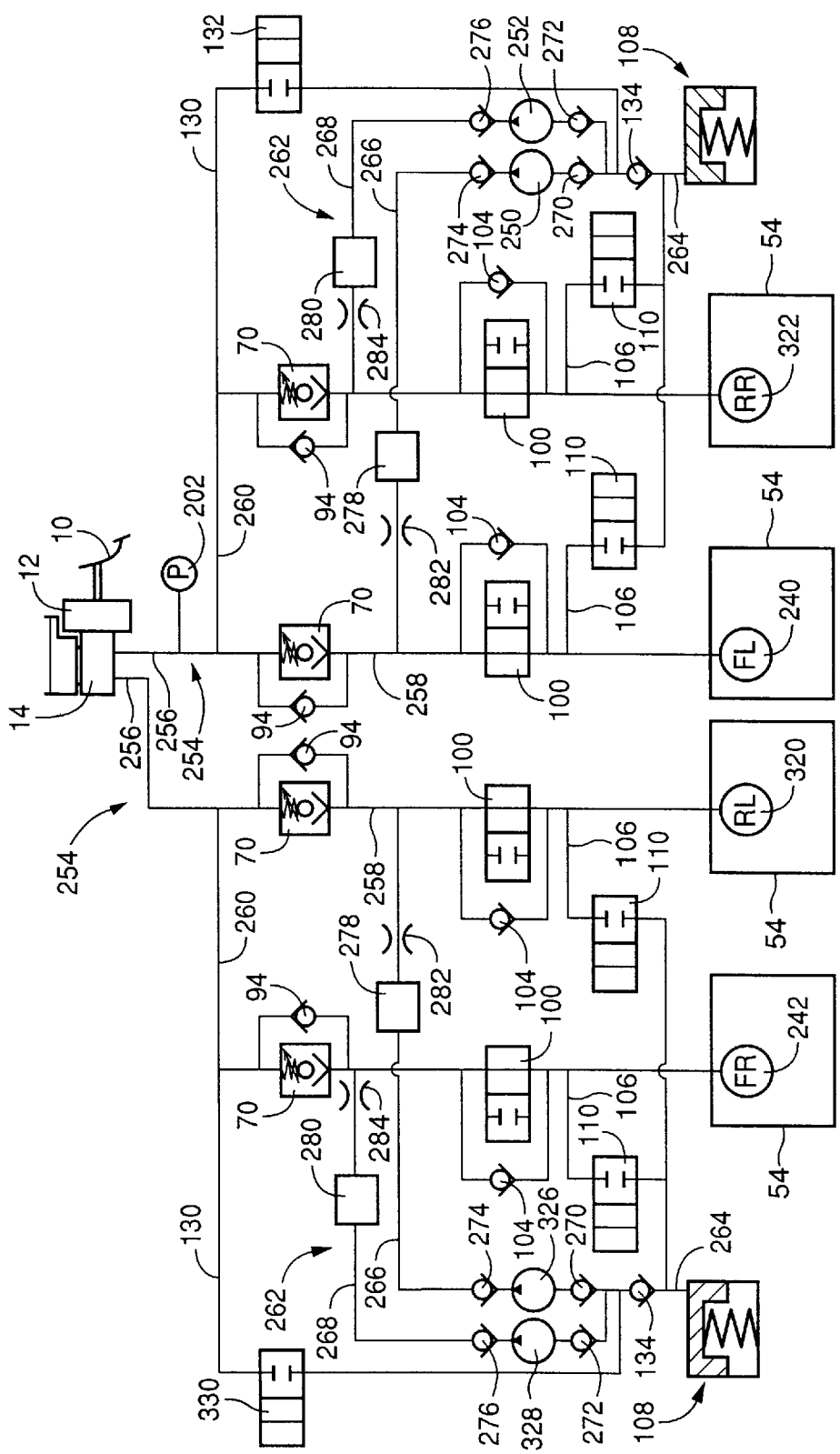
FIG. 32 is a schematic view showing a hardware arrangement of a braking system according to a eighth embodiment of the present invention.

The hardware arrangement of this eighth embodiment is shown in FIG. 32. The braking system of the eighth embodiment is a diagonal type consisting of a first sub-system including the wheel brake cylinders 240, 322 for the front left and rear right wheels FL, RR, and a second sub-system including the wheel brake cylinders 242, 320 for the front right and rear left wheels FR, RL, contrary to the front-rear type of the seventh embodiment of FIG. 30 consisting of the front sub-system including the two front wheel brake cylinders 240, 242 and the rear sub-system including the two rear wheel brake cylinders 320, 322.

The software arrangement of the eighth embodiment is similar to that of the seventh embodiment, and no description thereof is deemed necessary.

A ninth embodiment of the invention will then be described.

Figure 33:
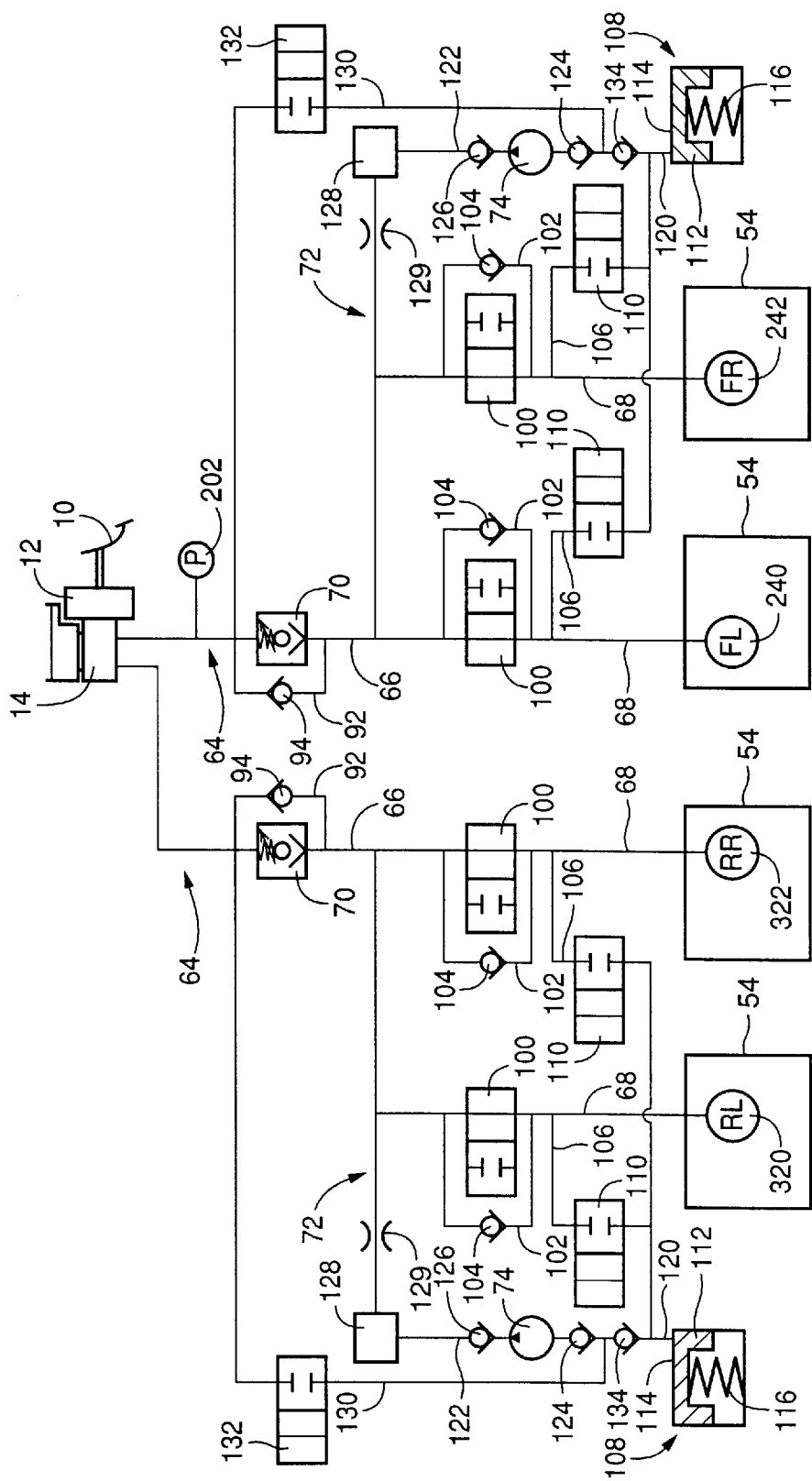
FIG. 33 is a schematic view showing a hardware arrangement of a braking system according to a ninth embodiment of this invention.

The hardware arrangement of this ninth embodiment, which is shown in FIG. 33, is similar to that of the seventh embodiment of FIG. 30, in that the braking system consists of the front and rear sub-systems. However, the ninth embodiment is different from the seventh embodiment in that only one pressure control valve 70 and only one pump 74 are used for each sub-system.

The software arrangement of the ninth embodiment is similar to that of the seventh embodiment, and no description thereof is deemed necessary.

A tenth embodiment of this invention will be described.

Figure 34:
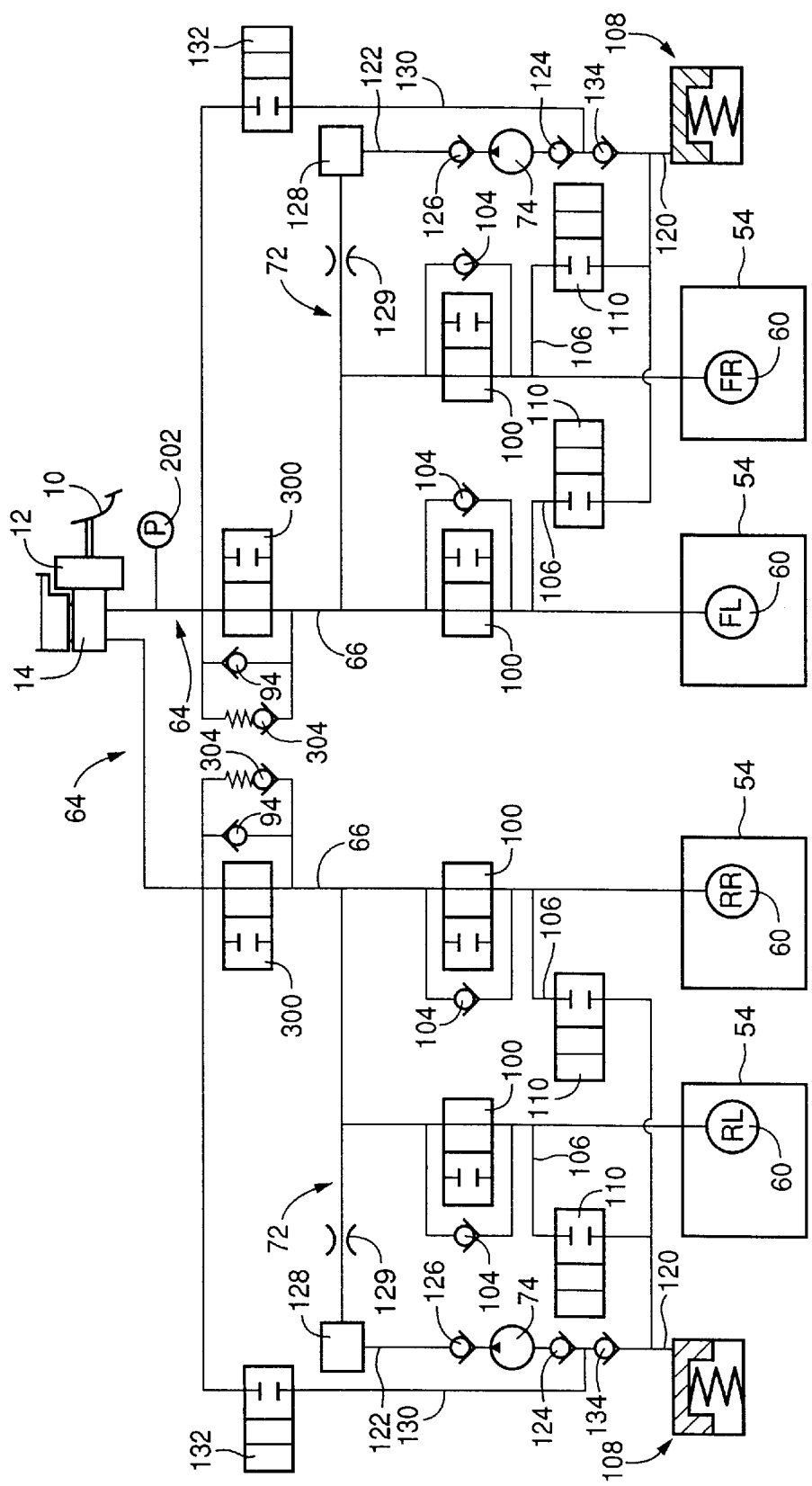
FIG. 34 is a schematic view showing a hardware arrangement of a braking system according to a tenth embodiment of this invention.

The hardware arrangement of this tenth embodiment, which is shown in FIG. 34, is similar to that of the seventh embodiment of FIG. 30, in that the braking system consists of the front and rear sub-systems. However, the tenth embodiment is different from the seventh embodiment in that only one pump 74 is used for each sub-system, and in that the two-position valves 300 and the pressure relief valves 304 are used as the flow control valves, as in the fifth embodiment.

The software arrangement of the tenth embodiment is similar to that of the seventh embodiment, and no description thereof is deemed necessary.

There will be described an eleventh embodiment of this invention, which is identical with the first embodiment in many aspects. The same reference signs as used in the first embodiment will be used in the eleventh embodiment to identify the corresponding element. Only the elements characteristic of the eleventh embodiment will be described.

Figure 35:
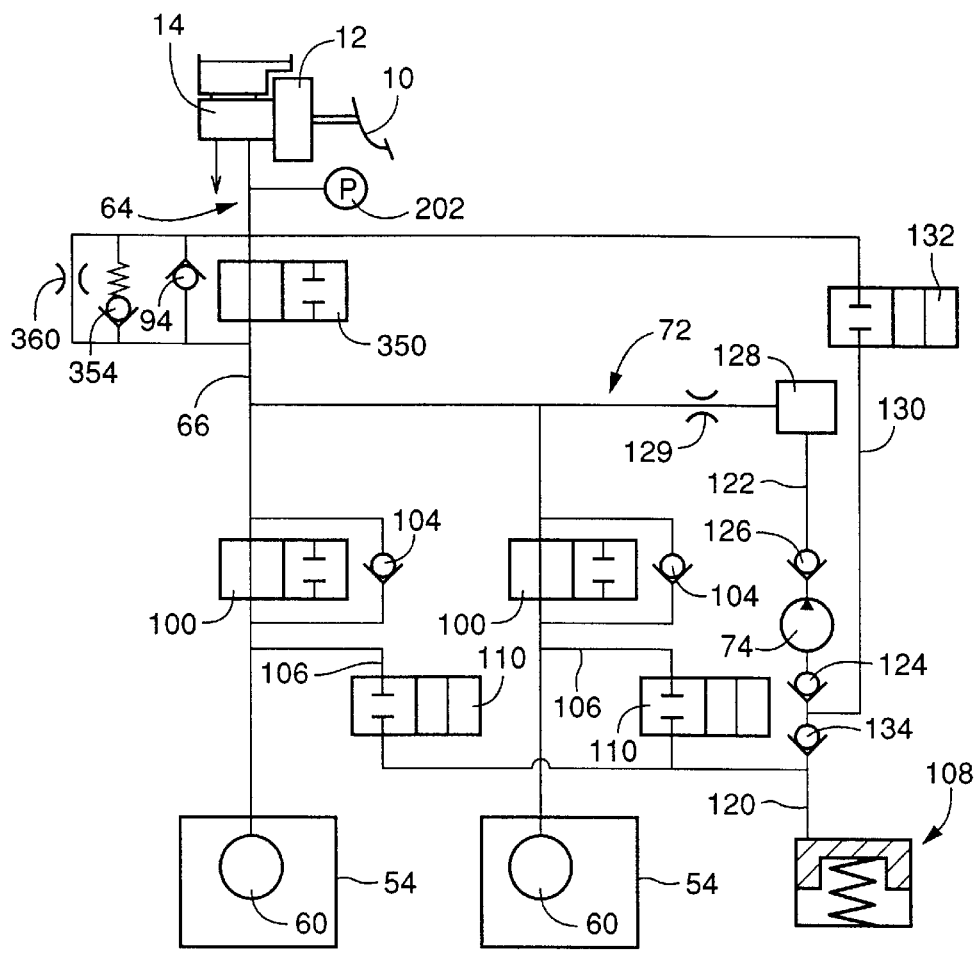
FIG. 35 is a schematic view showing a hardware arrangement of a braking system according to an eleventh embodiment of this invention.
Figure 36:
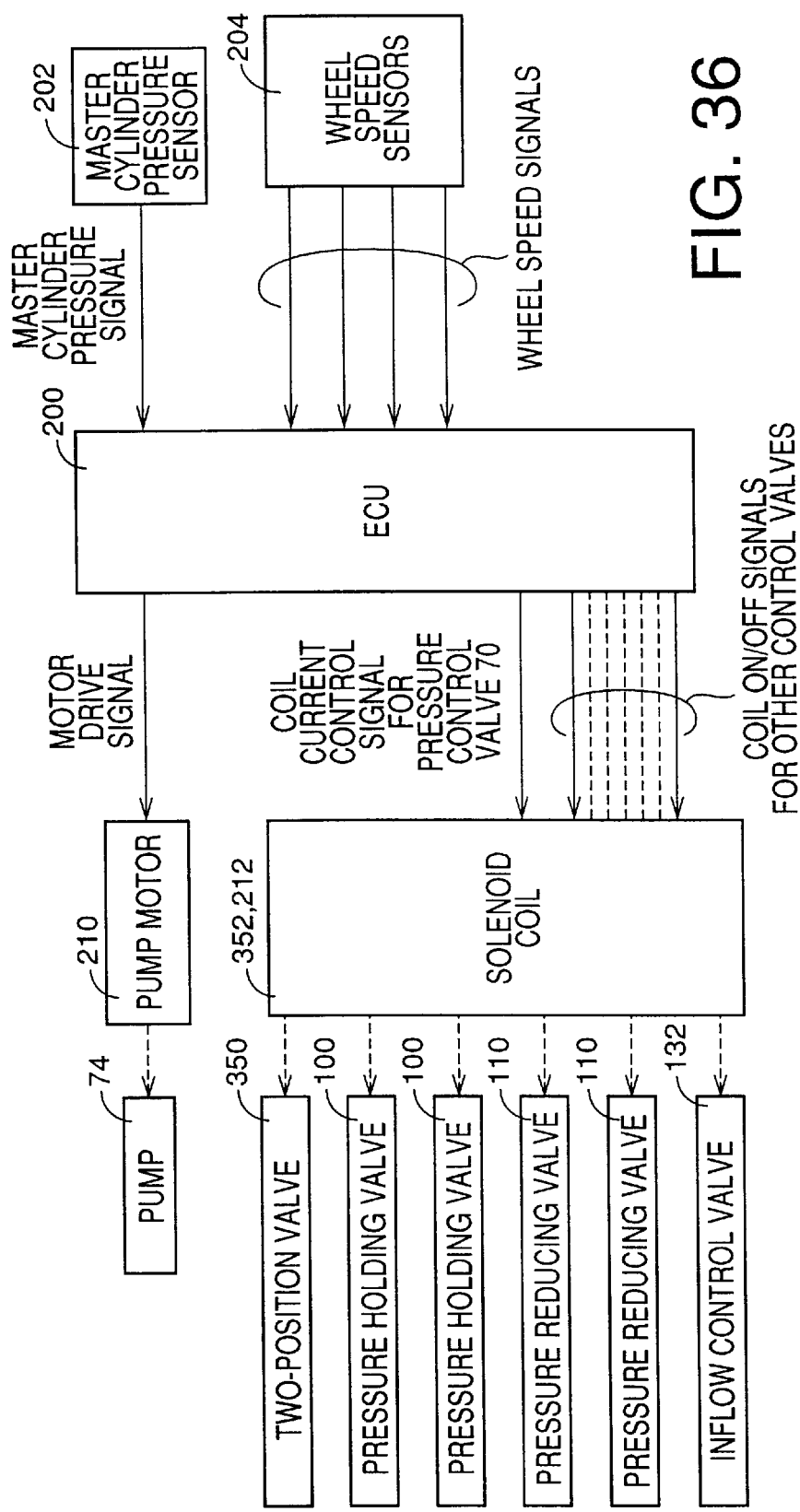
FIG. 36 is a block diagram showing a software arrangement of the braking system of FIG. 35.

Unlike the first embodiment, the present braking system uses the two-position valve 350 in place of the pressure control valve 70, as shown in FIGS. 35 and 36. The two-position valve 350 has a solenoid coil 352 (FIG. 36), and is placed in a first or open position when the coil 352 is energized, and in a second or closed position when the coil 352 is de-energized. A pressure relief valve 354 is provided by-passing the two-position valve 350, so as to prevent an excessive rise of the delivery pressure of the pump 74 as compared with the master cylinder pressure $P_M$.

In the present eleventh embodiment, an orifice 360 by-passing the two-position 350 is also provided. When the two-position valve 350 is closed, the orifice 360 functions to produce a difference between the pressure in the master cylinder 14 and the pressures in the wheel brake cylinders 60, which difference depends upon the delivery pressure of the pump 74. The orifice 360 has another function of maintaining some degree of fluid communication between the master cylinder 14 and the wheel brake cylinders 60.

When the braking effect characteristic control has become unnecessary due to a decrease in the brake operating force f, the pump 74 is turned off and the two-position valve 350 is opened, to terminate the braking effect characteristic control. Since the two-position valve 350 is theoretically opened when the pressures in the wheel brake cylinders 60 have become equal to the pressure in the master cylinder 14, the brake pedal 10 does not vibrate due to the pressure difference between the master cylinder pressure and the wheel brake cylinder pressures, upon opening of the two-position valve 350. Actually, however, the two-position valve 350 is opened while the pressure difference still exists. If the orifice 360 was not provided, the brake pedal would possibly vibrate when the two-position valve 350 is suddenly switched from the closed position to the open position. The vibration of the brake pedal 10 upon termination of the braking effect characteristic control may be restrained, by slowing opening the two-position valve with its duty ratio being gradually changed. However, the duty ratio control of the two-position valve 350 may result in prolonging the vibration of the brake pedal 10. At any rate, the brake pedal 10 is likely to vibrate upon termination of the braking effect characteristic control, namely, upon opening of the two-position valve 350, if the orifice 360 is not provided.

In the braking system of the eleventh embodiment wherein the orifice 360 is provided by-passing the two-position valve 350, the pump 74 is controlled so as to reduce the difference between the master cylinder pressure and the wheel brake cylinder pressures, immediately before the braking effect characteristic control is terminated, that is, when the delivery amount of the pump 74 is not so large. Accordingly, a sudden switching of the two-position valve 350 from the closed position to the open position will not cause a significant pressure difference between the master cylinder 14 and the wheel brake cylinders 60, when the two-position valve 350 has been brought to its open position. Thus, the vibration of the brake pedal 10 can be effectively avoided. Further, the present arrangement is effective to reduce a kick-back distance of the brake pedal 10 due to the pressure difference and an amount of reduction of the vehicle deceleration due to sudden reduction of the wheel brake cylinder pressures.

Figure 37:
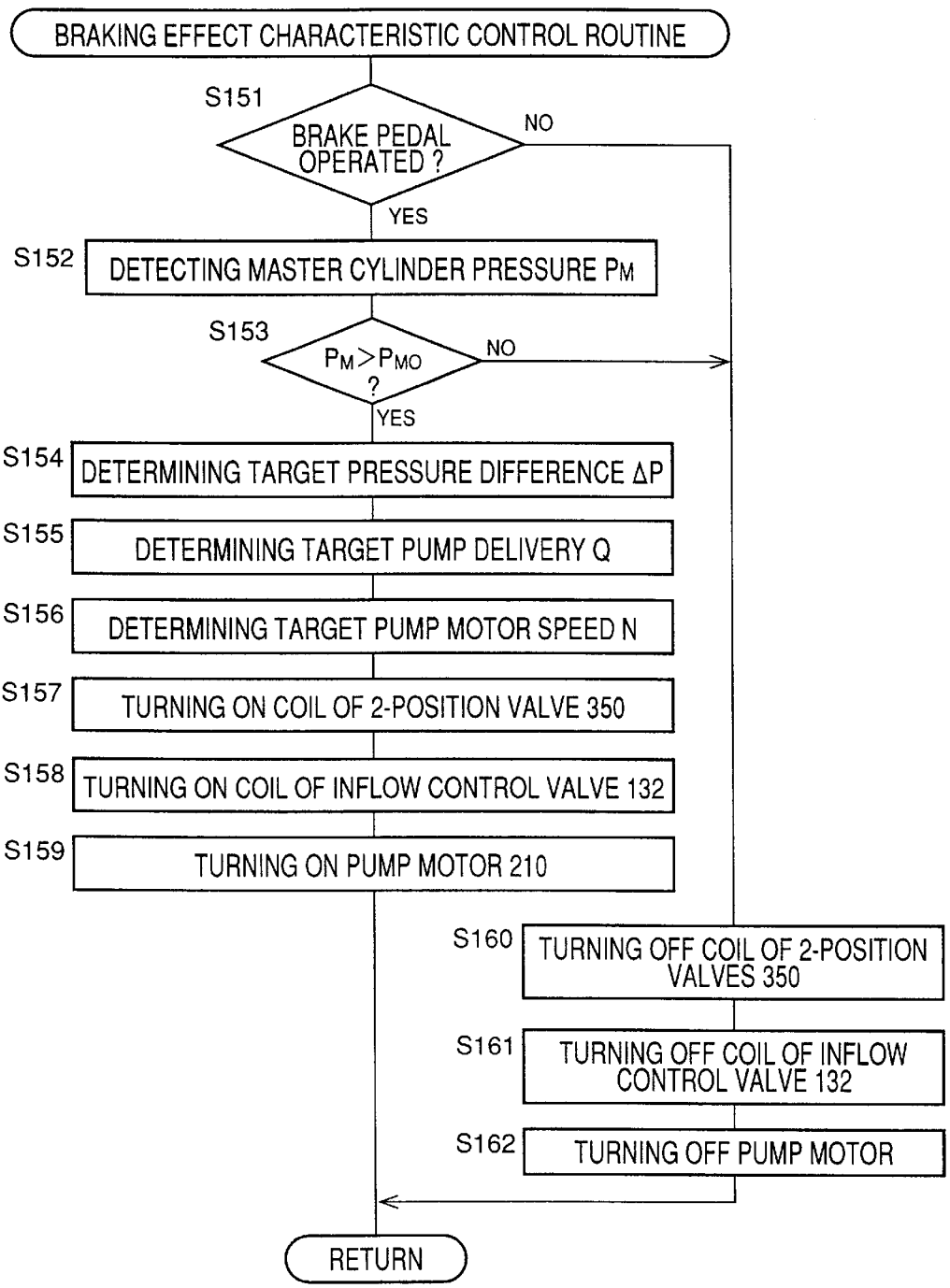
FIG. 37 is a flow chart illustrating a braking effect characteristic control routine in the braking system of FIG. 35.

The braking effect characteristic control routine according to the present eleventh embodiment is illustrated in the flow chart of FIG. 37.

Figure 38:
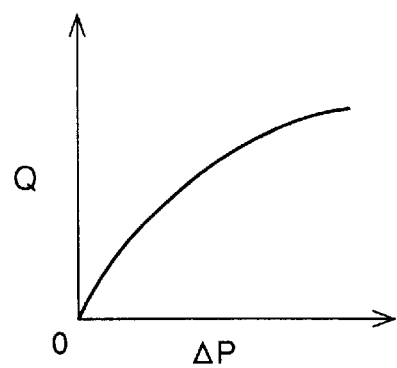
FIG. 38 is a graph for explaining a relationship between a target pressure difference $\Delta P$ and a target pump delivery Q in the braking effect characteristic control routine of FIG. 37.

The routine is initiated with step S151 to determine whether the brake pedal 10 has been depressed. If an affirmative decision (YES) is obtained in step S151, the control flow goes to step S152 to detect the master cylinder pressure $P_M$ on the basis of the output signal of the master cylinder pressure sensor 202. Then, step S153 is implemented to determine whether the detected master cylinder pressure $P_M$ is higher than the reference value $P_{M0}$ indicated above with respect to step S2 of FIG. 8. If an affirmative decision (YES) is obtained in step S153, the control flow goes to step S154 to determine a target pressure difference $\Delta P$ between $P_M$ and $P_B$ on the basis of the detected master cylinder pressure $P_M$. Step S154 is followed by step S155 to determine a target delivery amount Q of the pump 74 for establishing the target pressure difference $\Delta P$. This determination of the target delivery amount Q is effected on the basis of the determined target pressure difference $\Delta P$ and according to a predetermined relationship between the target pressure difference $\Delta P$ and the target delivery amount Q, which relationship is stored in the ROM of the electronic control unit 200, as indicated in the graph of FIG. 38 by way of example. Then, the control flow goes to step S156 to determine a target operating speed N of the pump motor 210 for establishing the determined target delivery amount Q. This determination of the target operating speed N is effected on the basis of the target delivery amount Q and according to a predetermined relationship between the target delivery amount W and the target operating speed N, which relationship is stored in the ROM. Step S156 is followed by step S157 to turn ON the solenoid coil of the two-position valve 350 for thereby opening the valve 350. Step S157 is followed by step S158 to turn ON the solenoid coil of the inflow control valve 132 for thereby opening the valve 132. Then, the control flow goes to step S159 to turn ON the pump motor 210 such that the actual operating speed N of the pump motor 210 coincides with the target value. Thus, one cycle of execution of the routine of FIG. 37 is terminated.

If a negative decision (NO) is obtained in step S151 or in step S153, the control flow goes to step S160 to turn OFF the coil 352 of the two-position valve 250 for thereby closing the valve 350, and then to step S161 to turn OFF the coil of the inflow control valve 132 for thereby closing the valve 132. Then, step S162 is implemented to turn OFF the pump motor 210.

It will be understood that the provision of the orifice 360 for communication between the wheel brake cylinders 60 and the master cylinder 14 prevents a significantly large vibration of the brake pedal 10 upon switching of the two-position valve 350 from its closed position to its open position for terminating the braking effect characteristic control, which is effected using the two-position valve 350 which, when placed in the closed position, completely disconnects the master cylinder 14 from the wheel brake cylinders 60.

If the two-position valve 350 is closed for some reason or other when it should not be closed, the pressures in the wheel brake cylinders 60 during brake application can be reduced, and the brake application can be terminated, in the presence of the orifice 360 permitting the flows of the fluid in the opposite directions between the master cylinder 14 and the wheel brake cylinders 60. Thus, the orifice 360 provides a fail safe in the event of some malfunction of the two-position valve 350, and improves the operating reliability of the braking system.

In the present braking system, the difference between the pressure in the master cylinder 14 and the pressures in the wheel brake cylinders 60 is continuously controlled with the two-position valve 350 held in the closed position, during the braking effect characteristic control. This arrangement is effective to prevent frequent ON-OFF operations of the two-position valve 350, and reduce the load of this valve 350, while simplifying the software arrangement for controlling the valve 350.

It will be understood from the above description that the pump 220 serves as a pump type pressure increasing device, and the two-position valve 350 serves as a fluid flow control valve, while the orifice 360 serves as a flow restrictor.

Then, a twelfth embodiment of this invention will be described. This embodiment is identical in the hardware arrangement with the first embodiment, and is different from the first embodiment only in the software arrangement. Only the software arrangement of this twelfth embodiment will be described in detail.

Figure 39:
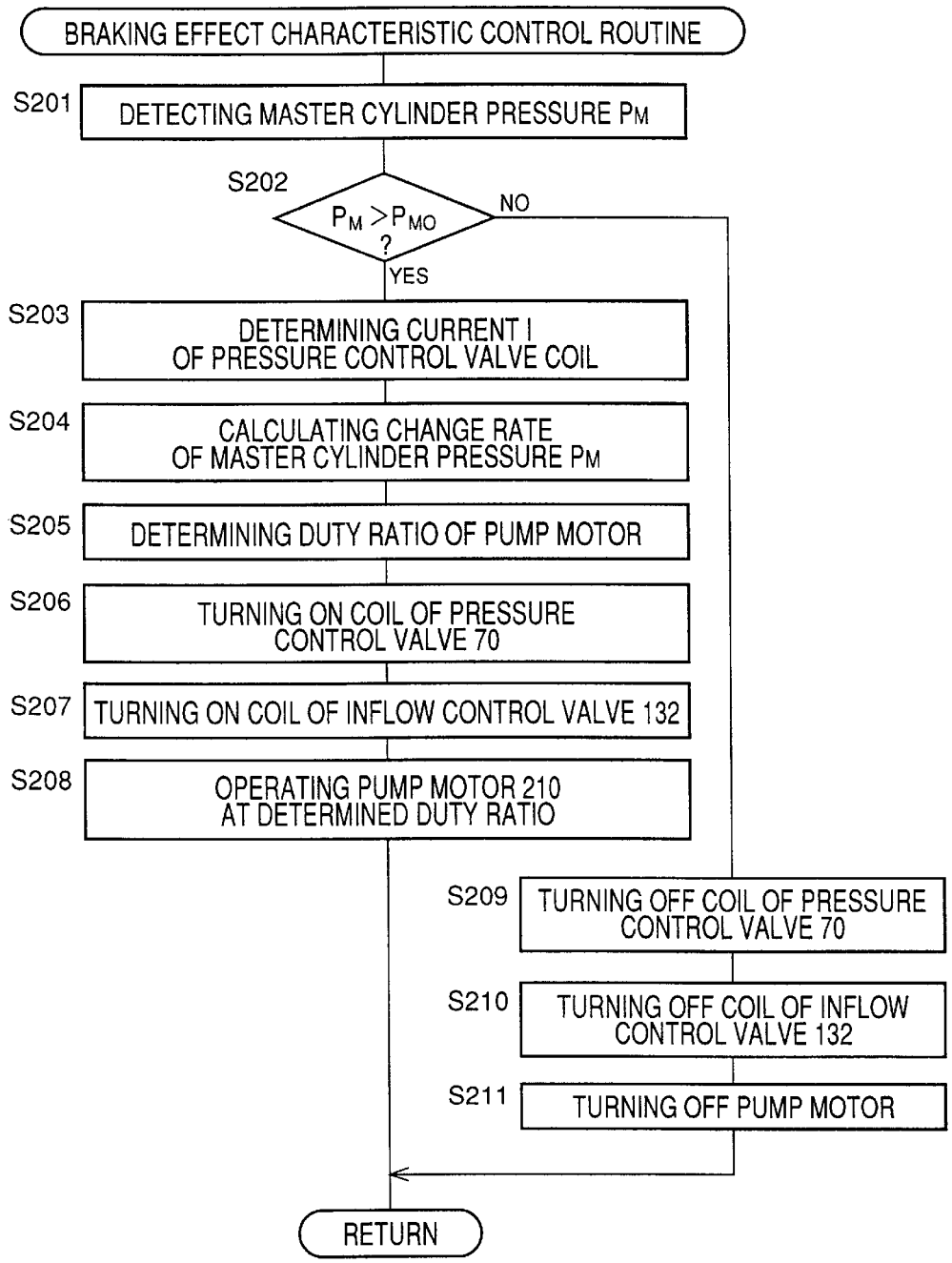
FIG. 39 is a flow chart illustrating a braking effect characteristic control routine in a braking system according to a twelfth embodiment of the present invention.

The braking effect characteristic control routine according to the present twelfth embodiment is illustrated in the flow chart of FIG. 39.

The routine of FIG. 39 is initiated with step S201 to detect the master cylinder pressure $P_M$ (representing the operator's desired braking effect or force) on the basis of the output signal of the master cylinder pressure sensor 202. Then, the control flow goes to step S202 to determine whether the detected master cylinder pressure $P_M$ is higher than the reference value $P_{M0}$, which corresponds to the transition point PC of the boosting ratio of the vacuum booster 12. However, the reference value $P_{M0}$ may correspond to the boosting limit point PL. If an affirmative decision (YES) is obtained in step S202, the control flow goes to step S203 to determine the electric current I to be applied to the coil 84 of the pressure control valve 70, on the basis of the detected master cylinder pressure $P_M$ and according to a predetermined relationship between the master cylinder pressure $P_M$ and the electric current I. This relationship, which is stored in the ROM, is determined such that the wheel brake cylinder pressure $P_B$ changes linearly with the brake operating force f, irrespective of the operating characteristic of the vacuum booster 12.

Then, step S204 is implemented to calculate a rate of change of the master cylinder pressure $P_M$ (a rate of change of the operator's desired braking force). Described in detail, this change rate can be obtained by subtracting a value $P_{M(n-1)}$ of the master cylinder pressure $P_M$ which was detected in the last control cycle, from a value $P_{M(n)}$ detected in step S201 in the present control cycle, and dividing the obtained difference $P_{M(n)}-P_{M(n-1)}$ by a cycle time $\Delta t$ of the present routine. The absolute value of the obtained quotient represents the rate of change of the master cylinder pressure $P_M$. Step S204 is followed by step S205 to determine the duty ratio of the drive voltage applied to the pump motor 210, on the basis of the calculated rate of change of the master cylinder pressure $P_M$ and according to a predetermined relationship between the rate of change and the duty ratio, which relationship is stored in the ROM. This relationship is determined such that the duty ratio increases with an increase in the rate of change of the master cylinder pressure $P_M$.

Then, the control flow goes to step S206 to apply the determined electric current I to the coil 84 of the pressure control valve 70, and to step S207 to turn on the coil of the inflow control valve 132. Step S207 is followed by step S208 to operate the pump motor 210 at the determined duty ratio. As a result, the rate of increase of the delivery amount of the pump 74, that is, the rate of increase of the wheel brake cylinder pressure $P_B$ increases with an increase in the rate of change of the master cylinder pressure $P_M$. Thus, one cycle of execution of the routine of FIG. 39 is terminated.

If a negative decision (NO) is obtained in step S202, the control flow goes to step S209 to turn OFF the coil 84 of the pressure control valve 70, and then to step S210 to turn OFF the coil of the inflow control valve 132. Step S210 is followed by step S211 to turn OFF the pump motor 210. Thus, one cycle of execution of the routine is terminated.

While the presently preferred embodiments of this invention have been described above in detail by reference to the accompanying drawings, it is to be understood that the present invention may be embodied with various changes and improvements, which may occur to those skilled in the art, without departing from the scope of the invention defined in the following claims:

What is claimed is:

1. A braking system for braking a wheel of an automotive vehicle, comprising:

a brake operating member; a master cylinder functioning as a first hydraulic pressure source for generating a hydraulic pressure based on an input force;

a vacuum booster having a negative-pressure chamber connected to a negative pressure source, and a variable-pressure chamber selectively connected to said negative-pressure chamber and an atmosphere, said vacuum booster boosting an operating force of said brake operating member on the basis of a difference between pressures in said negative-pressure and variable-pressure chambers, and transmitting the boosted operating force to said master cylinder, said vacuum booster having a transition point at which a boosting ratio of said vacuum booster is reduced during an increase of said brake operating force before a boosting limit point at which said vacuum booster has become inoperable to perform its boosting function is reached, said transition point being kept unchanged irrespective of a change in the pressure in said negative-pressure chamber and being reached at a predetermined value of said brake operating force while said vacuum booster is operating in a normal state;

a brake including a wheel brake cylinder which is connected to said master cylinder through a fluid passage and which is activated by a hydraulic pressure supplied thereto through said fluid passage, for braking said wheel; and a pressure increasing device including a second hydraulic pressure source connected to said fluid passage, said pressure increasing device performing a pressure increasing operation of increasing a hydraulic pressure in said wheel brake cylinder, by using said second hydraulic pressure source, such that the increased hydraulic pressure in said wheel brake cylinder is higher than that generated by said master cylinder, said pressure increasing device initiating said pressure increasing operation when said brake operating force has increased to said transition point.

2. A braking system according to claim 1, wherein said vacuum booster is constructed such that an output of said vacuum booster corresponding to said transition point is smaller than that corresponding to said boosting limit point when the pressure in said negative-pressure chamber is equal to a lower limit of an expected range of variation of the pressure in said negative-pressure chamber.

3. A braking system according to claim 1, which is arranged so as to brake the automotive vehicle at a deceleration value not lower than a maximum deceleration value during a normal operation of said brake operating member, if said boosting limit point of said vacuum booster is reached during said pressure increasing operation when the pressure in said negative-pressure chamber is equal to a lower limit of an expected range of variation of the pressure in said negative-pressure chamber.

4. A braking system according to claim 1, wherein said pressure increasing device includes (a) an operating-force-related-quantity sensor for detecting an operating-force-related quantity relating to said brake operating force, and (b) pressure increase initiating means for commanding said pressure increasing device to initiate said pressure increasing operation when said operating-force-related quantity detected by said operating-force-related-quantity sensor has increased to a value corresponding to said transition point of said vacuum booster.

5. A braking system according to claim 1, wherein said vacuum booster has a first boosting ratio at which said operating force is boosted until said operating force of said brake operating member has increased to said transition point, and a second boosting ratio which is lower than said first boosting ratio and at which said operating force is boosted while said operating force increases from said transition point up to said boosting limit point.

6. A braking system according to claim 5, wherein said vacuum booster includes:
   a housing;
   an input rod operatively connected to said brake operating member;
   a power piston axially movably disposed within said housing and cooperating with said housing to device said negative-pressure chamber and said variable-pressure chamber, said power piston being axially moved by said pressure difference between the pressures in said negative-pressure and variable-pressure chambers;
   a valve mechanism for selectively connecting said variable-pressure chamber to said negative-pressure chamber and said atmosphere, on the basis of a relative axial movement of said power piston and said input rod;
   an output rod for transmitting an operating force of said power piston to a pressurizing piston of said master cylinder; and
   an elastic reaction disc disposed such that said power piston and said input rod contact said reaction disc in one of opposite axial directions of the vacuum booster while said output rod contacts said reaction disc in the other axial direction,
   and wherein one of opposite end portions of said input rod which at which said input rod contacts said reaction disc consists of two sections one of which is located adjacent to said reaction disc and has a first transverse cross sectional area, and the other of which is remote from said reaction disc and has a second transverse cross sectional area larger than said first transverse cross sectional area.

7. A braking system according to claim 1, wherein the boosting ratio of said vacuum booster is continuously reduced as said operating force of said brake operating member increases, and said transition point is reached when said boosting ratio has been reduced to a value which is not zero.

8. A braking system according to claim 7, wherein said vacuum booster includes:
   a housing;
   an input rod operatively connected to said brake operating member;
   a power piston axially movably disposed within said housing and cooperating with said housing to device said negative-pressure chamber and said variable-pressure chamber, said power piston being axially moved by said difference between the pressures in said negative-pressure and variable-pressure chambers;
   a valve mechanism for selectively connecting said variable-pressure chamber to said negative-pressure chamber and said atmosphere, on the basis of a relative axial movement of said power piston and said input rod;
   an output rod for transmitting an operating force of said power piston to a pressurizing piston of said master cylinder; and
   an elastic reaction disc disposed such that said power piston and said input rod contact said reaction disc in one of opposite axial directions of the vacuum booster while said output rod contacts said reaction disc in the other axial direction,
   and wherein one of opposite end portions of said input rod at which said input rod contacts said reaction disc has a transverse cross sectional area which continuously increases in an axial direction of said input rod from said one of said opposite end portions toward the other end portion.

9. A braking system according to claim 1, wherein said pressure increasing device is a pressure increasing device including a fluid flow control valve provided in said fluid passage, and a pump functioning as said second hydraulic pressure source and having a delivery end connected to a portion of said fluid passage between said fluid flow control valve and said wheel brake cylinder, said pump being operated to increase the pressure in said wheel brake cylinder to a level higher than the pressure in said master cylinder, while said fluid flow control valve inhibits a flow of a working fluid at least in a direction from said wheel brake cylinder toward said master cylinder.

10. A braking system according to claim 9, further comprising a flow restrictor which by-passes said fluid flow control valve.

11. A braking system according to claim 10, wherein said fluid flow control valve includes a solenoid-operated two-position valve having an open position and a closed position.

12. A braking system according to claim 11, wherein said pressure increasing device further includes two-position valve control means for normally holding said two-position valve in said open position, switching said two-position valve from said open position to said closed position when said pressure increasing operation is initiated by said pressure increasing device, and switching said two-position valve from said closed position to said open position when said pressure increasing operation is terminated.

13. A braking system according to claim 10, wherein said fluid flow control valve includes a solenoid-operated two-position valve having an open position and a closed position, and said pressure including device includes (a) two-position valve control means for normally holding said two-position valve in said open position, switching said two-position valve from said open position to said closed position when said pressure increasing operation is initiated by said pressure increasing device, and switching said two-position valve from said closed position to said open position when said pressure increasing operation is terminated; and (b) pump delivery control means for controlling a delivery amount of said pump to control a rate of flow of the working fluid through said flow restrictor, for thereby variably controlling a difference between the pressures in said master cylinder and said wheel brake cylinder.

14. A braking system according to claim 1, wherein said pressure increasing device is a pressure increasing device comprising a pressure control valve which is provided in said fluid passage and which includes (a) a valve member and a valve seat which are spaced apart from each other, so as to permit a flow of a working fluid from said wheel brake cylinder toward said master cylinder, when a pressure difference which is the pressure in said wheel brake cylinder minus the pressure in said master cylinder is larger than a predetermined threshold, said valve member and said valve seat fluid-tightly contacting each other, so as to inhibit said flow of the working fluid, when said difference is not larger than said predetermined threshold, and (b) a pressure difference controlling device for generating a magnetic force for biasing said valve member and said valve seat toward each other, and continuously controlling said magnetic force to continuously change said pressure difference which is established when said valve member and said valve seat initiates a fluid-tight contact therebetween, and wherein said pressure increasing device further comprises a pump functioning as said second hydraulic pressure source and having a delivery end connected to a portion of said fluid passage between said pressure control device and said wheel brake cylinder.

15. A braking system according to claim 14, wherein said pressure control valve further includes a disabling device for preventing said valve member and said valve seat from fluid-tightly contacting each other to thereby disable said pressure control device, when said pump type pressure increasing device is not required to be operated to perform said pressure increasing operation.

16. A braking system according to claim 15, wherein said pressure difference controlling device includes a solenoid coil, and said disabling device includes an elastic member for biasing said valve member and said valve seat away from each other.

17. A braking system according to claim 1, wherein said pressure increasing device comprises (a) electrically operated pressure control device for controlling the pressure in said wheel brake cylinder, and (b) a pseudo pressure holding means operated when the pressure in said wheel brake cylinder is required to be held at a presently established level, for electrically controlling said electrically operated pressure control device, so as to hold the pressure in said wheel brake cylinder, without using a pressure holding valve which disconnects said wheel brake cylinder from said master cylinder and said electrically operated pressure control device.

18. A braking system according to claim 17, wherein said pressure increasing device is a pressure increasing device including a fluid flow control valve provided in said fluid passage, and a pump functioning as said second hydraulic pressure source arid having a delivery end connected to a portion of said fluid passage between said fluid flow control valve and said wheel brake cylinder, said pump being operated to increase the pressure in said wheel brake cylinder to a level higher than the pressure in said master cylinder, while said fluid flow control valve inhibits a flow of a working fluid at least in a direction from said wheel brake cylinder toward said master cylinder, and wherein said electrically operated pressure control device includes said fluid flow control valve and said pump, and said pseudo pressure holding means controls at least one of said fluid flow control valve and said pump, to hold the pressure in said wheel brake cylinder.

19. A braking system according to claim 18, wherein said pseudo pressure holding means holds the pressure in said wheel brake cylinder, by controlling said fluid flow control valve so as to disconnect said wheel brake cylinder from said master cylinder, and by holding said pump in a non-operated state.

20. A braking system according to claim 18, wherein said pseudo pressure holding means holds the pressure in said wheel brake cylinder, by holding said pump in an operated state and controlling said fluid flow control valve such that the working fluid delivered from said pump leaks into said master cylinder through said fluid flow control valve.

21. A braking system according to claim 17, wherein said pressure increasing device is a pressure increasing device including a fluid flow control valve provided in said fluid passage, and a pump functioning as said second hydraulic pressure source and having a delivery end connected to a portion of said fluid passage between said fluid flow control valve and said wheel brake cylinder, said pump being operated to increase the pressure in said wheel brake cylinder to a level higher than the pressure in said master cylinder, while said fluid flow control valve inhibits a flow of a working fluid at least in a direction from said wheel brake cylinder toward said master cylinder, said braking system further comprising:

a reservoir connected to said wheel brake cylinder;

a pressure reducing valve disposed between said reservoir and said wheel brake cylinder, and having a closed state inhibiting a flow of the working fluid from said wheel brake cylinder toward said reservoir, and an open state for permitting said flow of the working fluid, and wherein said electrically operated pressure control device includes said pressure reducing valve, said fluid flow control valve and said pump, and said pseudo pressure holding means holds the pressure in said wheel brake cylinder, by electrically controlling at least one of said pressure reducing valve, said fluid flow control valve and said pump.

22. A braking system according to claim 21, wherein said pseudo pressure holding means includes means for controlling said fluid flow control valve so as to disconnect said wheel brake cylinder from said master cylinder, for holding said pump in an operated state thereof, and for opening said pressure reducing valve.

23. A braking system according to claim 17, wherein said pressure increasing device is a pressure increasing device including a fluid flow control valve provided in said fluid passage, and a pump functioning as said second hydraulic pressure source and having a delivery end connected to a portion of said fluid passage between said fluid flow control valve and said wheel brake cylinder, said pump being operated to increase the pressure in said wheel brake cylinder to a level higher than the pressure in said master cylinder, while said fluid flow control valve inhibits a flow of a working fluid at least in a direction from said wheel brake cylinder toward said master cylinder, said braking system further comprising:

an inflow control valve connected to a suction side of said pump, and having a closed state for inhibiting a flow of the working fluid toward said suction side of said pump, and an open state for permitting said flow of the working fluid toward said suction side to thereby permit said pump to deliver the working fluid, and wherein said electrically operated pressure control device includes said inflow control valve, said fluid flow control valve and said pump, and said pseudo pressure holding means holds the pressure in said wheel brake cylinder, by electrically controlling at least one of said inflow control valve, said fluid flow control valve and said pump.

24. A braking system according to claim 23, wherein said pseudo pressure holding means includes means for controlling said fluid flow control valve so as to disconnect said wheel brake cylinder from said master cylinder, for holding said pump in an operated state thereof, and for closing said inflow control valve.

25. A braking system according to claim 17, further comprising an anti-lock braking pressure control device for controlling the pressure in said wheel brake cylinder so as to prevent an excessive locking tendency of said wheel during an operation of said brake operating member, and wherein said anti-lock braking pressure control device commands said pseudo pressure holding means for holding the pressure in said wheel brake cylinder, during an operation of said anti-lock braking pressure control device.

26. A braking system according to claim 1, wherein said pressure increasing device is a pressure increasing device including a fluid flow control valve provided in said fluid passage, and a pump functioning as said second hydraulic pressure source and having a delivery end connected to a portion of said fluid passage between said fluid flow control valve and said wheel brake cylinder, said pump being operated to increase the pressure in said wheel brake cylinder to a level higher than the pressure in said master cylinder, while said fluid flow control valve inhibits a flow of a working fluid at least in a direction from said wheel brake cylinder toward said master cylinder, and wherein a plurality of wheel brake cylinders are connected through said fluid passage to a pressurizing chamber of said master cylinder, and said fluid flow control valve and said pump are provided for each of said plurality of wheel brake cylinders, such that said fluid flow control valve and said pump for each one of said plurality of wheel brake cylinders are controllable independently of the fluid flow control valve and said pump for another of said plurality of wheel brake cylinders.

27. A braking system according to claim 1, wherein said pressure increasing device is a pressure increasing device including a fluid flow control valve provided in said fluid passage, and a pump functioning as said second hydraulic pressure source and having a delivery end connected to a portion of said fluid passage between said fluid flow control valve and said wheel brake cylinder, said pump being operated to increase the pressure in said wheel brake cylinder to a level higher than the pressure in said master cylinder, while said fluid flow control valve inhibits a flow of a working fluid at least in a direction from said wheel brake cylinder toward said master cylinder, and wherein said automotive vehicle has a front wheel and a rear wheel, and a front wheel brake cylinder and a rear wheel brake cylinder are provided for braking said front and rear wheels, respectively, said front wheel brake cylinder having a larger volume than said rear wheel brake cylinder, said fluid flow control valve and said pump are provided for each of said front and rear wheel brake cylinders, such that said fluid flow control valve and said pump for each of the front and rear wheel brake cylinders are controllable independently of said fluid flow control valve and said pump for the other of said front and rear wheel brake cylinders, said pressure increasing device including pressure increasing rate control means for controlling a rate of increase of the pressure in said each of said front and rear wheel brake cylinders such that the rates of increase of the pressures in said front and rear wheel brake cylinders are equal to each other, irrespective of a difference between the volumes of said front and rear wheel brake cylinders.

28. A braking system according to claim 27, wherein a plurality of solenoid-operated flow control valve are connected to suction sides of said pumps for said respective front and rear wheel brake cylinders, and said pressure increasing rate control means electrically controls said plurality of solenoid-operated flow control valves such that a rate of flow of the working fluid into said pump for said front wheel brake cylinder is higher than a rate of flow of the working fluid into said pump for said rear wheel brake cylinder.

29. A braking system according to claim 27, wherein said pressure increasing rate control means electrically controls said pumps for said respective front and rear wheel brake cylinders such that a delivery amount of said pump for said front wheel brake cylinder is larger than a delivery amount of said pump for said rear wheel brake cylinder.

30. A braking system according to claim 27, wherein said pressure increasing rate control means electrically controls said fluid flow control valves for said front and rear wheel brake cylinders, such that a rate of flow of the working fluid from said pump for said front wheel brake cylinder into said master cylinder through said fluid flow control valve for said front wheel brake cylinder is lower than a rate of flow of the working fluid from said pump for said rear wheel brake cylinder into said master cylinder through said fluid flow control valve for said rear wheel brake cylinder.

31. A braking system according to claim 27, wherein said pressure increasing rate control means includes said pumps for said front and rear wheel brake cylinders, said pump for said front wheel brake cylinder having a larger delivery amount than said pump for said rear wheel brake cylinder when said pumps are held operated at a same speed.

* * * * *